(12) United States Patent
Shimizu et al.

(10) Patent No.: US 7,710,668 B2
(45) Date of Patent: May 4, 2010

(54) LENS BARREL AND IMAGING APPARATUS

(75) Inventors: Hironori Shimizu, Tokyo (JP); Naoyuki Ohno, Tokyo (JP); Hiroshi Mashima, Tokyo (JP); Kazuhiko Takatsuka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/232,992

(22) Filed: Sep. 26, 2008

(65) Prior Publication Data

US 2009/0109556 A1 Apr. 30, 2009

(30) Foreign Application Priority Data

Oct. 31, 2007 (JP) ............................. 2007-284171

(51) Int. Cl.
*G02B 7/02* (2006.01)
(52) U.S. Cl. .................. 359/819; 359/822; 359/829
(58) Field of Classification Search ................ 359/819, 359/822, 829
See application file for complete search history.

(56) References Cited

U.S. PATENT DOCUMENTS

2006/0016280 A1* 1/2006 Hasegawa et al. .......... 74/89.23
2006/0209437 A1* 9/2006 Miyamoto ................. 359/824

FOREIGN PATENT DOCUMENTS

| JP | 08-095143 | 4/1996 |
| JP | 2003-295032 A | 10/2003 |
| JP | 2005-024650 A | 1/2005 |
| JP | 2007-156068 A | 6/2007 |
| WO | WO-2006/035580 A1 | 4/2006 |

OTHER PUBLICATIONS

Japanese Office Action issued Sep. 3, 2009 for corresponding Japanese Application No. 2007-284171.

* cited by examiner

*Primary Examiner*—Jessica T Stultz
*Assistant Examiner*—Mahidere S Sahle
(74) *Attorney, Agent, or Firm*—Rader, Fishman & Grauer PLLC

(57) ABSTRACT

A lens barrel includes: a plurality of lenses disposed in an outer enclosure; an imaging device that converts image light introduced through the plurality of lenses into an image signal; a movable unit including a movable lens and a lens holder that holds the movable lens; a lead screw rotated by a drive motor; a nut member made of a metal material threadably engaging the lead screw and connected to the lens holder, the nut member moved by the rotation of the lead screw in the optical axis direction moving the movable unit in the optical axis direction; a guide shaft that guides the movable unit in the optical axis direction, both axial ends of the guide shaft held by the outer enclosure; and an urging spring that presses part of the lens holder against the nut member when the movable unit moves in the optical axis direction.

4 Claims, 43 Drawing Sheets

LENS BARREL AND IMAGING APPARATUS

CROSS REFERENCES TO RELATED APPLICATIONS

The present invention contains subject matter related to Japanese Patent Application JP 2007-284171 filed in the Japanese Patent Office on Oct. 31, 2007, the entire contents of which being incorporated herein by reference.

BACKGROUND OF THE INVENTION

1. Field of the Invention

The present invention relates to a technical field of a lens barrel and an imaging apparatus, and particularly to a technical field in which a nut member made of a metal material is separated from a lens holder in a non-drive mode to improve resistance to impact.

2. Description of the Related Art

Any imaging apparatus, such as a video camera and a still camera, includes a lens barrel having an imaging capability. In recent years, a variety of electronic apparatus, such as mobile phones, personal computers, and PDAs (Personal Digital Assistants), have been used in an increasing number of applications, and some of such electronic apparatus include a built-in lens barrel. Therefore, mobile phones, personal computers, PDAs, and other electronic apparatus including such a built-in lens barrel are also used as imaging apparatus for capturing images.

Some of such lens barrels have a configuration in which an outer enclosure houses a fixed lens, such as an objective lens, a movable unit including movable lenses, such as a focus lens and a zoom lens, an imaging device that converts an image light acquired through the fixed lens and the movable lenses into an image signal, and other components.

Some of such lens barrels have a configuration in which a movable unit can be moved in the optical axis direction by a driving mechanism having a lead screw (see JP-A-08-95143, for example). The drive mechanism includes a drive motor and a lead screw rotated by the drive motor.

Some of the lens barrels described above use a rigid nut member made of a metal material as a nut in order to prevent so-called tooth chipping, which results in a shift in the position of the nut that threadably engages the lead screw, or so-called tooth scraping, in which the threaded groove of the nut is scraped, when an impact is applied.

In particular, since a mobile imaging apparatus is prone to receive an external impact, the tooth chipping and tooth scraping described above may degrade the reliability of the operation of the movable unit. To address the problem, it is desirable to use a nut member made of a metal material.

In the movable unit, a lens holder is supported by a guide shaft in such a way that the lens holder can slide in the optical axis direction, and a nut member threadably engages a lead screw. The nut member is then connected to the lens holder. An urging spring applies an urging force to the lens holder in the direction in which the lend holder is pressed against the nut member in order to reduce backlash between the nut member and the lead screw in the axial direction of the lead screw.

Therefore, the lens holder in the movable unit is typically pressed against the nut member by the urging spring.

The reduction in backlash between the nut member and the lead screw is necessary to ensure good positional accuracy when the movable unit moves in the optical axis direction in a drive mode in which an image is ready to be captured when a power supply is turned on.

SUMMARY OF THE INVENTION

However, in the lens barrel of related art described above, the lens holder in the movable unit is typically pressed against the nut member by the urging spring. Therefore, when an external impact is applied causes an impact force to be applied to the movable unit, the impact force is transferred from the lens holder to the nut member, and then transferred from the nut member through the lead screw to the drive motor.

Therefore, depending on the frequency of an impact and the magnitude of the impact force, the drive motor may malfunction and the reliability of operation of the lens barrel may be degraded.

It is desirable to provide a lens barrel and an imaging apparatus that solve the above problems and allow improvement in resistance to impact.

According to an embodiment of the invention, there is provided a lens barrel including a movable unit including a movable lens and a lens holder that holds the movable lens, a lead screw rotated by a drive motor, a nut member made of a metal material threadably engaging the lead screw and connected to the lens holder, the nut member moved by the rotation of the lead screw in the optical axis direction moving the movable unit in the optical axis direction, a guide shaft that guides the movable unit in the optical axis direction, both axial ends of the guide shaft held by the outer enclosure, and an urging spring that presses part of the lens holder against the nut member when the movable unit moves in the optical axis direction. The outer enclosure has a restricting portion that comes into contact with the lens holder and restricts the movement of the movable unit when the movable unit moves to the end of movement in the optical axis direction. When the non-drive mode is activated after the movable unit has moved to the end of movement and the lens holder has come into contact with the restricting portion, the nut member is held between the lens holder and the restricting portion with the nut member spaced apart from the lens holder and the restricting portion.

Therefore, in the lens barrel, when the non-drive mode is activated after the movable unit has moved to the end of movement, the nut member is separated from the lens holder and the restricting portion of the outer enclosure.

In the lens barrel described above, when the non-drive mode is activated after the movable unit has moved to the end of movement and the lens holder has come into contact with the restricting portion, the nut member is held between the lens holder and the restricting portion with the nut member spaced apart from the lens holder and the restricting portion by rotating the lead screw by a predetermined angle. In this way, the nut member can reliably disengage from the lens holder.

In the lens barrel described above, the position of the nut member when the movable unit starts moving in the drive mode is set to be close to the position of the nut member in the non-drive mode. In this way, when the non-drive mode is switched to the drive mode, it is possible to reduce the time necessary to start the operation of the movable unit when the non-drive mode is switched to the drive mode.

According to another embodiment of the invention, there is provided an imaging apparatus having a lens barrel incorporated therein, the lens barrel including a movable unit including a movable lens and a lens holder that holds the movable lens, a lead screw rotated by a drive motor, a nut member made of a metal material threadably engaging the lead screw and connected to the lens holder, the nut member moved by the rotation of the lead screw in the optical axis direction moving the movable unit in the optical axis direction, a guide shaft that guides the movable unit in the optical axis direction, both axial ends of the guide shaft held by the outer enclosure, and an urging spring that presses part of the lens holder against the nut member when the movable unit moves in the optical axis direction. The outer enclosure has a restricting portion that comes into contact with the lens holder and restricts the movement of the movable unit when the movable unit moves to the end of movement in the optical axis direction. When the non-drive mode is activated after the movable unit has moved to the end of movement and the lens holder has come into contact with the restricting portion, the nut member is held between the lens holder and the restricting portion with the nut member spaced apart from the lens holder and the restricting portion.

Therefore, in the imaging apparatus, when the non-drive mode is activated after the movable unit has moved to the end of movement, the nut member is separated from the lens holder and the restricting portion of the outer enclosure.

A lens barrel according to an embodiment of the invention is configured in such a way that energizing and deenergizing the lens barrel allow switching between a drive mode in which an image can be captured and a non-drive mode in which no image can be captured. The lens barrel include a plurality of lenses disposed in an outer enclosure, an imaging device that converts image light introduced through the plurality of lenses into an image signal, a movable unit including a movable lens and a lens holder that holds the movable lens, a lead screw rotated by a drive motor, a nut member made of a metal material threadably engaging the lead screw and connected to the lens holder, the nut member moved by the rotation of the lead screw in the optical axis direction moving the movable unit in the optical axis direction, a guide shaft that guides the movable unit in the optical axis direction, both axial ends of the guide shaft held by the outer enclosure, and an urging spring that presses part of the lens holder against the nut member when the movable unit moves in the optical axis direction. The outer enclosure has a restricting portion that comes into contact with the lens holder and restricts the movement of the movable unit when the movable unit moves to the end of movement in the optical axis direction. When the non-drive mode is activated after the movable unit has moved to the end of movement and the lens holder has come into contact with the restricting portion, the nut member is held between the lens holder and the restricting portion with the nut member spaced apart from the lens holder and the restricting portion.

Therefore, in the non-drive mode, when a large impact force is applied to the movable unit, the impact force is unlikely transmitted from the lens holder to the nut member, and hence the impact force is unlikely applied to the drive motor. It is therefore possible to prevent the drive motor from malfunctioning.

In a lens barrel according to an embodiment of the invention, when the non-drive mode is activated after the movable unit has moved to the end of movement and the lens holder has come into contact with the restricting portion, the nut member is held between the lens holder and the restricting portion with the nut member spaced apart from the lens holder and the restricting portion by rotating the lead screw by a predetermined angle. In this way, the nut member can reliably disengage from the lens holder.

In a lens barrel according to an embodiment of the invention, the position of the nut member when the movable unit starts moving in the drive mode is set to be close to the position of the nut member in the non-drive mode. Therefore, since the amount of movement of the movable unit is small when the non-drive mode is switched to the drive mode, it is possible to reduce the time necessary to start operation when the non-drive mode is switched to the drive mode.

An imaging apparatus according to an embodiment of the invention includes a lens barrel incorporated in a housing, the lens barrel configured in such a way that energizing and deenergizing the lens barrel allow switching between a drive mode in which an image can be captured and a non-drive mode in which no image can be captured. The lens barrel includes a plurality of lenses disposed in an outer enclosure, an imaging device that converts image light introduced through the plurality of lenses into an image signal, a movable unit including a movable lens and a lens holder that holds the movable lens, a lead screw rotated by a drive motor, a nut member made of a metal material threadably engaging the lead screw and connected to the lens holder, the nut member moved by the rotation of the lead screw in the optical axis direction moving the movable unit in the optical axis direction, a guide shaft that guides the movable unit in the optical axis direction, both axial ends of the guide shaft held by the outer enclosure, and an urging spring that presses part of the lens holder against the nut member when the movable unit moves in the optical axis direction. The outer enclosure has a restricting portion that comes into contact with the lens holder and restricts the movement of the movable unit when the movable unit moves to the end of movement in the optical axis direction. When the non-drive mode is activated after the movable unit has moved to the end of movement and the lens holder has come into contact with the restricting portion, the nut member is held between the lens holder and the restricting portion with the nut member spaced apart from the lens holder and the restricting portion.

Therefore, in the non-drive mode, when a large impact force is applied to the movable unit, the impact force is unlikely transmitted from the lens holder to the nut member, and hence the impact force is unlikely applied to the drive motor. It is therefore possible to prevent the drive motor from malfunctioning.

DESCRIPTION OF THE PREFERRED EMBODIMENTS

The best mode for implementing a lens barrel and an imaging apparatus according to an embodiment of the invention will be described below with reference to the accompanying drawings.

In the best mode described below, an imaging apparatus according to an embodiment of the invention is applied to a mobile phone as an imaging apparatus, and a lens barrel according to an embodiment of the invention is applied to a lens barrel incorporated in the mobile phone. The coverage of the invention is not limited to a mobile phone or a lens barrel incorporated therein, but the invention is widely applicable to a variety of apparatus used as imaging apparatus, such as still cameras, video cameras, personal computers, PDAs (Personal Digital Assistants), and a variety of lens barrels incorporated in such a variety of apparatus.

In the following description, the forward, backward, upward, downward, rightward, and leftward directions are those viewed by an operator of the imaging apparatus when the operator captures images. Therefore, the front side becomes the subject side, and the back side becomes the operator side.

The forward, backward, upward, downward, rightward, and leftward directions used in the following description are defined for ease of description. The invention is not limited to these directions, but can be implemented with any other definition.

Figure 1:
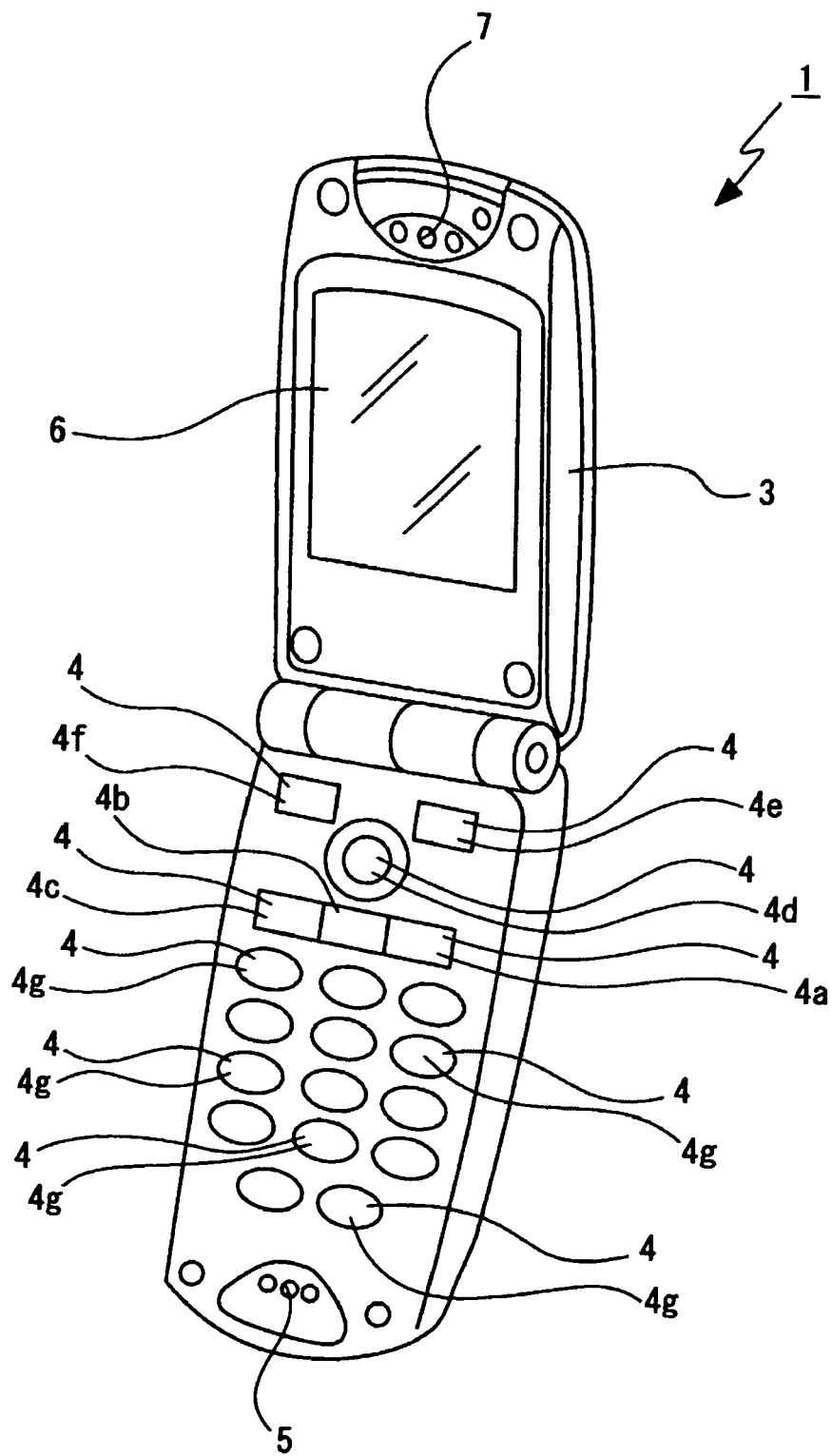
FIG. 1, along with FIGS. 2 to 43, shows an embodiment of the invention and is a perspective view of an imaging apparatus.
Figure 2:
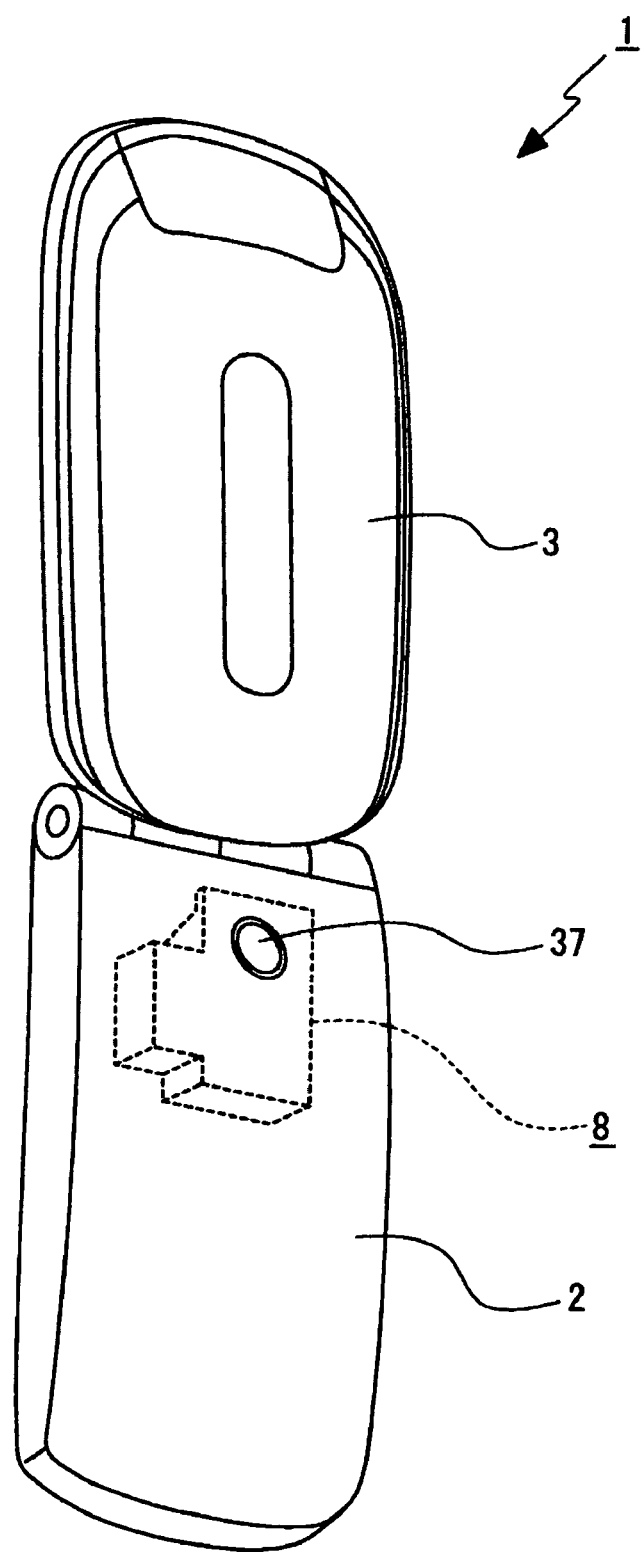
FIG. 2 is a perspective view showing the imaging apparatus viewed from a direction different from the viewing direction in FIG. 1.

An imaging apparatus (mobile phone) 1 includes, as shown in FIGS. 1 and 2, a first housing 2 and a second housing 3 foldably connected to each other via a hinge mechanism (not shown).

Operation keys 4, 4, . . . are arranged on one surface of the first housing 2. A microphone 5 is provided in the lower end portion of the one surface of the first housing 2, and audio from a user or other sources is inputted through the microphone 5.

The operation keys 4, 4, . . . include a variety of keys, such as a power on/off key 4a for turning on and off the entire imaging apparatus 1, a clear key 4b for initializing the operation, a calling key 4c for initiating or terminating a calling, a mode switching key 4d for switching among a variety of modes, a start key 4e for starting desired application software, an imaging key 4f for initiating or terminating imaging, input keys for 4g, 4g . . . for inputting numerals and characters, such as telephone numbers.

The first housing 2 is equipped with an interface connector, an earphone jack, and other terminals (not shown) as well as the operation keys 4, 4, . . . and the microphone 5. The first housing 2 is further equipped with a card slot into which a memory card, which will be described later, is inserted.

A display (liquid crystal display panel) 6 is disposed in one surface of the second housing 3. The display 6 displays a variety of information, such as a radio wave reception status, the amount of remaining battery power, the telephone number of the other party, contents registered in a telephone book (telephone numbers, names, and other information on other registered parties), outgoing call histories, incoming call histories, and a variety of other registered contents.

A loudspeaker 7 is provided in the upper end portion of the second housing 3. The speaker 7 outputs audio and other sounds from the other party during a call.

The imaging apparatus 1 has a lens barrel 8, for example, incorporated in the first housing 2 (see FIG. 2).

Figure 3:
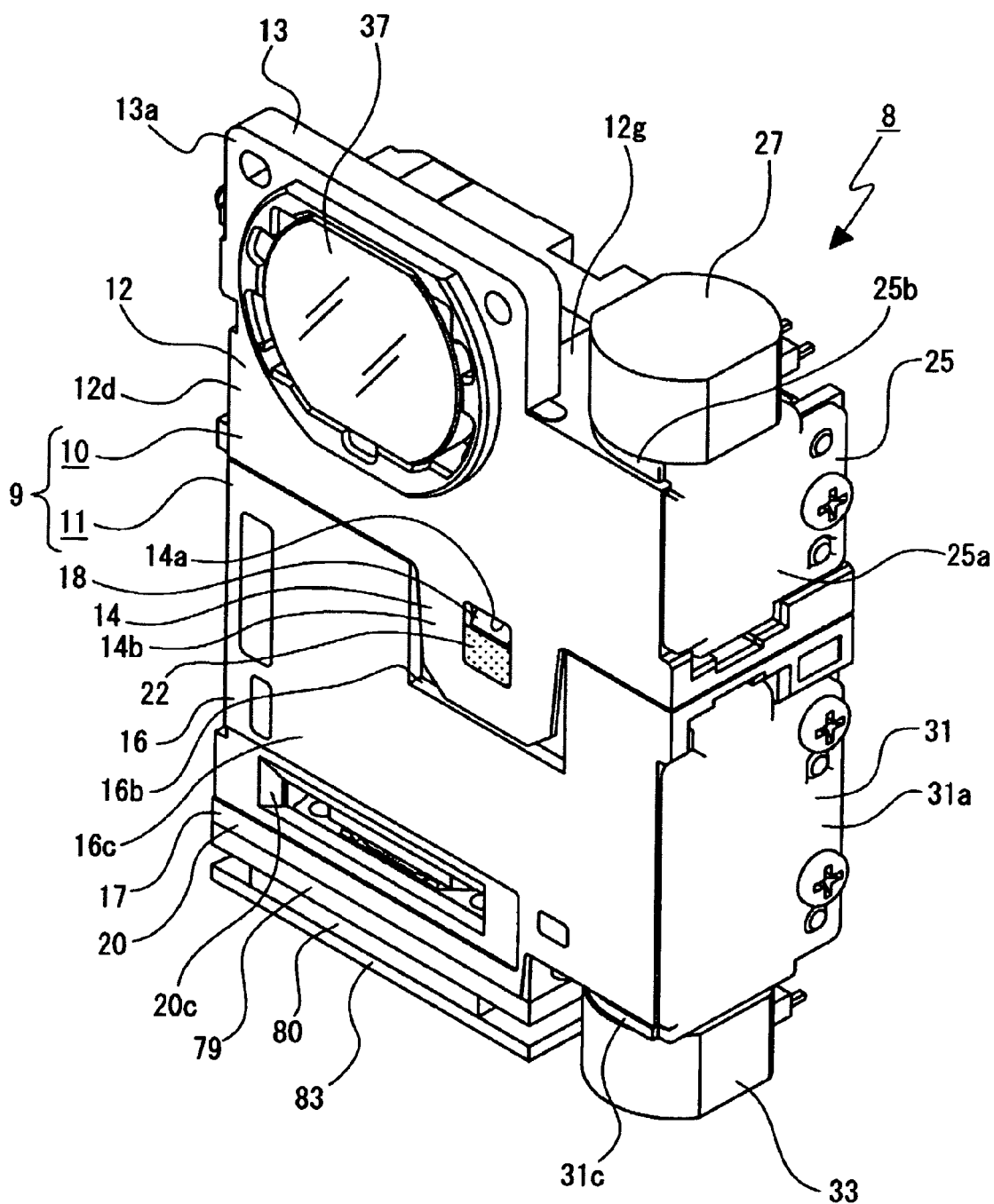
FIG. 3 is a perspective view of a lens barrel.
Figure 4:
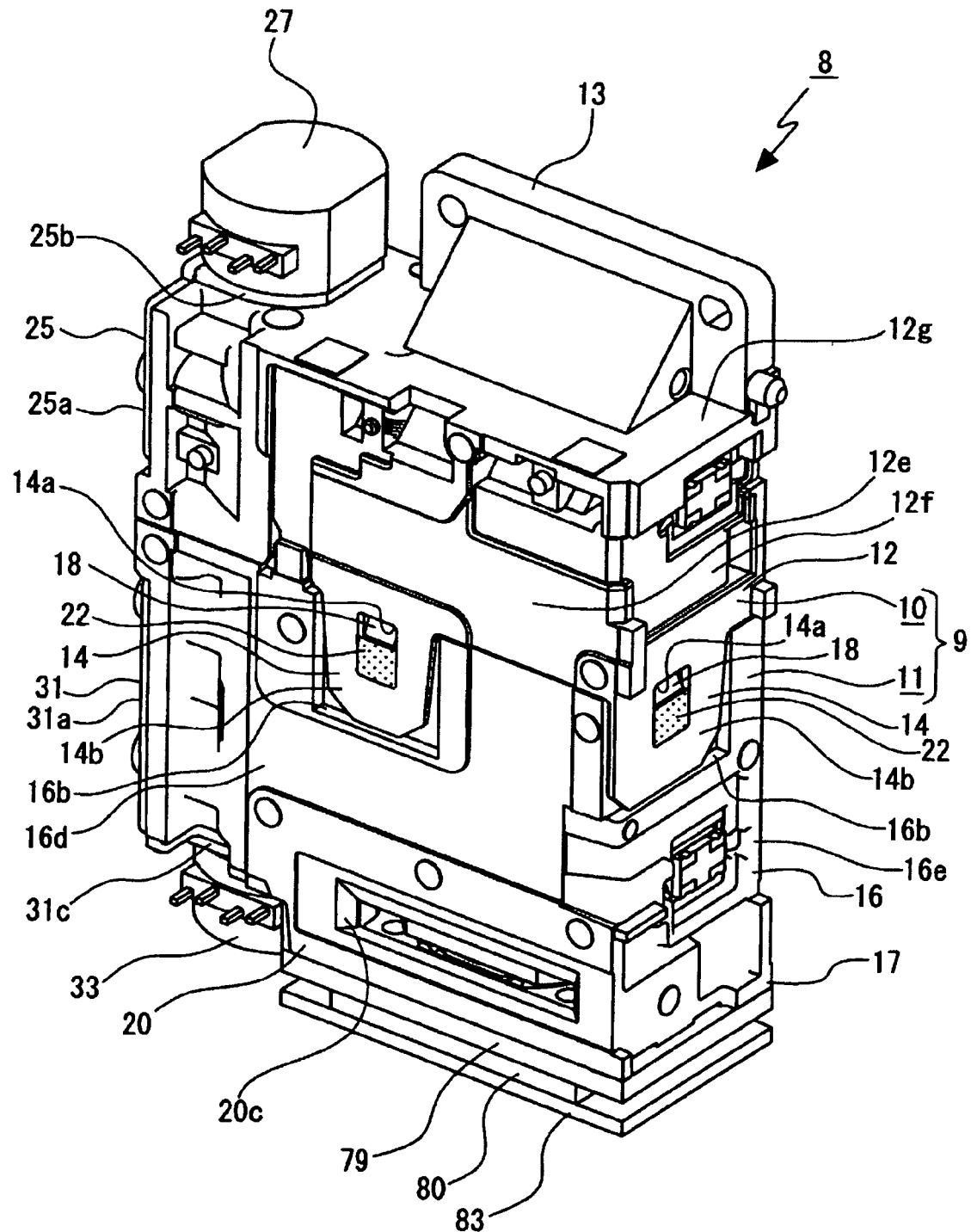
FIG. 4 is a perspective view showing the lens barrel viewed from a direction different from the viewing direction in FIG. 3.
Figure 5:
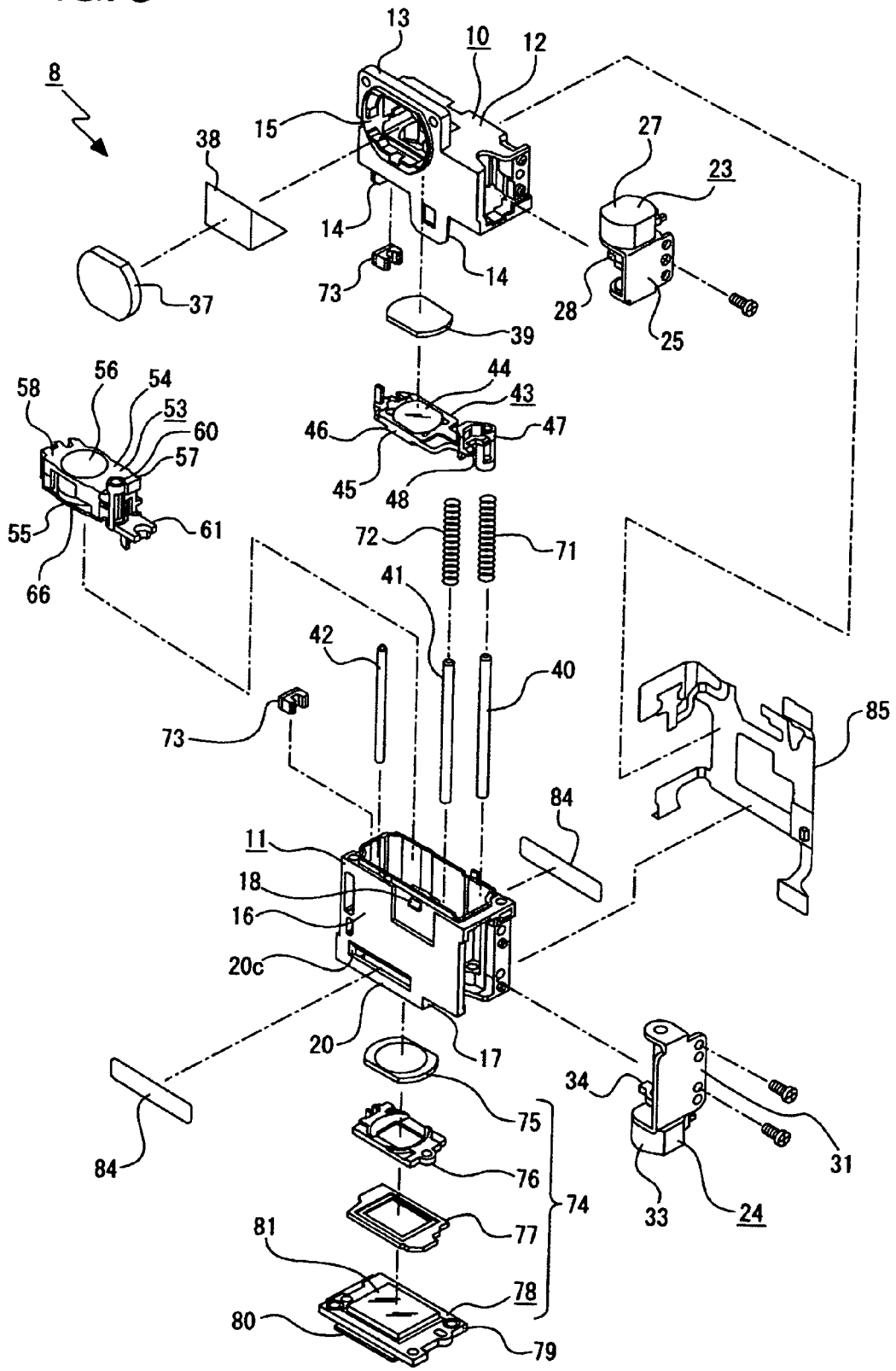
FIG. 5 is a perspective exploded view of the lens barrel.

The lens barrel 8 has an outer enclosure 9 made of a resin material and having necessary portions disposed therein (see FIGS. 3 to 5).

The outer enclosure 9 has an upper half portion 10 and a lower half portion 11 aligned in the up-down direction and connected to each other.

Figure 6:
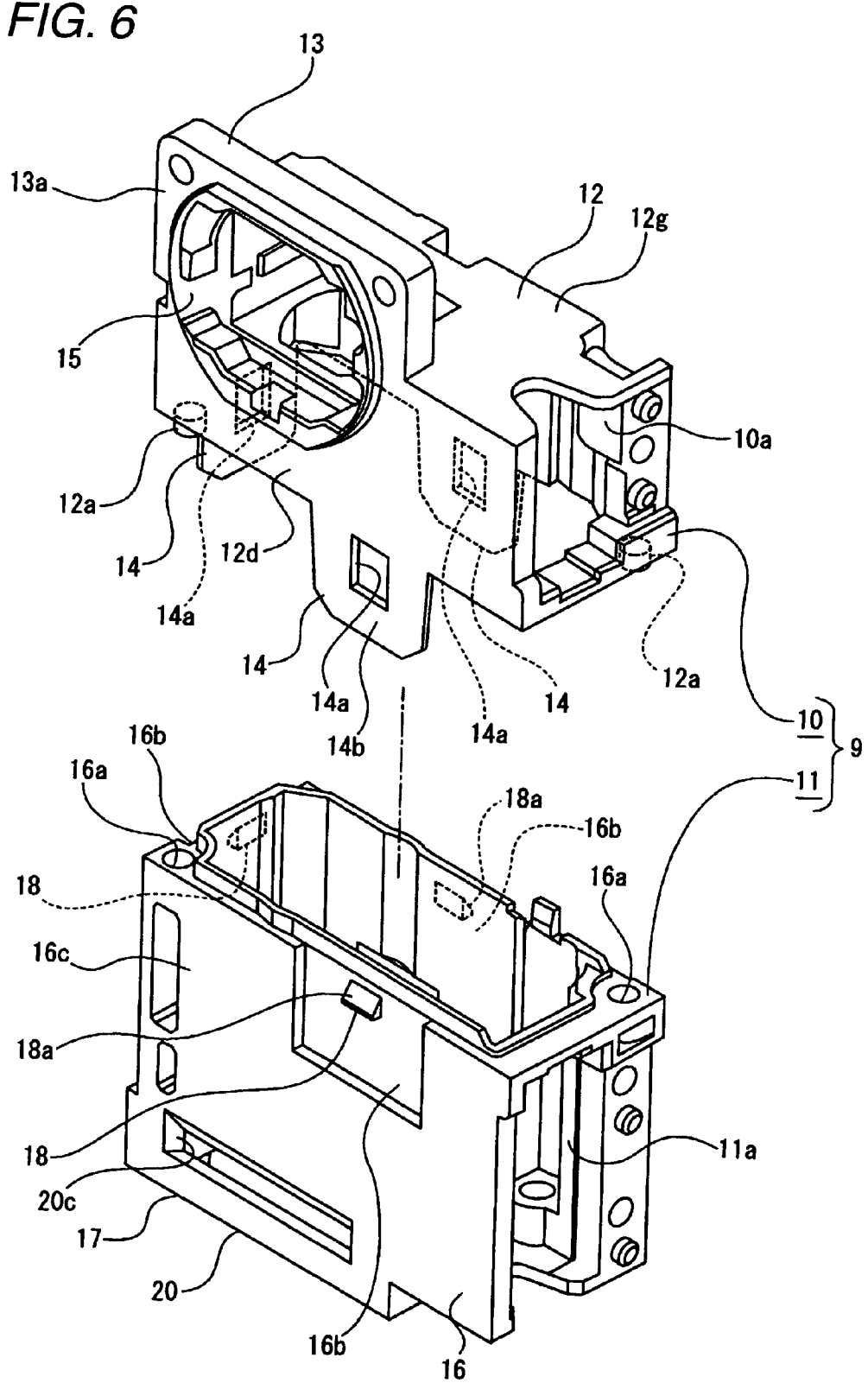
FIG. 6 is a perspective exploded, enlarged view showing an outer enclosure.

The upper half portion 10 has a body 12 and an assembling protrusion 13 integrally formed therewith, as shown in FIG. 6. The body 12 has a laterally-elongated box shape, the lower and left sides of which being open, and the assembling protrusion 13 protrudes upward from the upper surface of the body 12.

Figure 7:
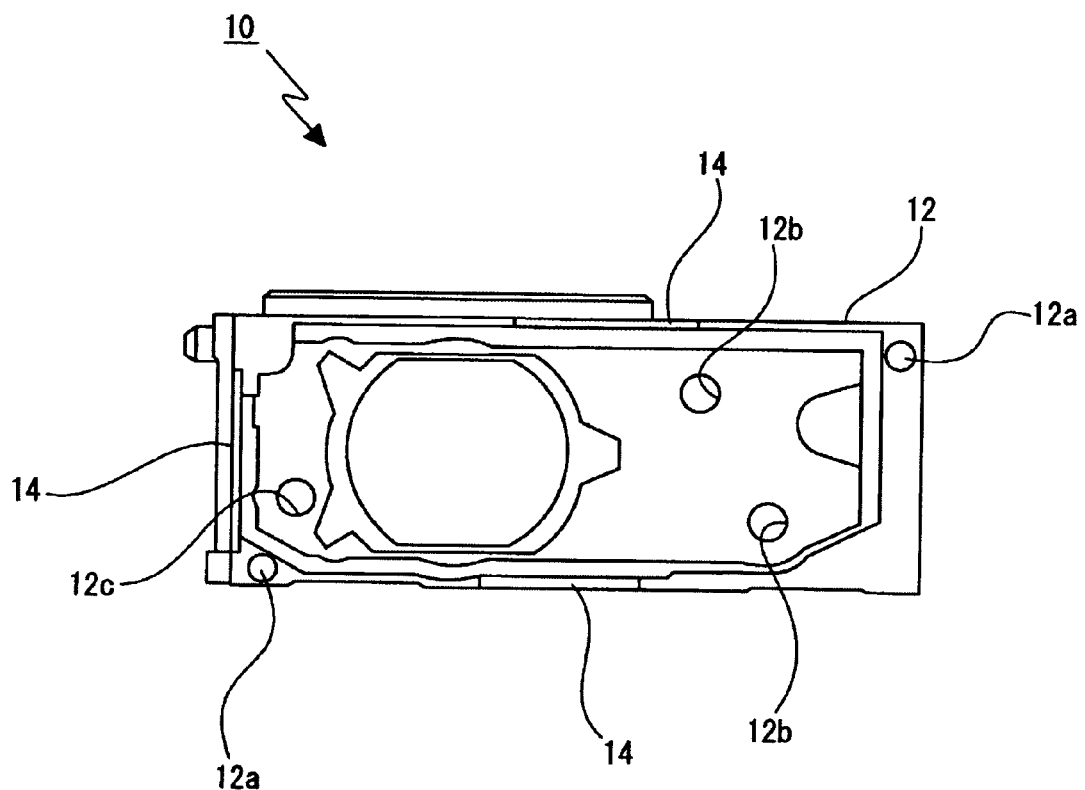
FIG. 7 is an enlarged bottom view showing an upper half portion of the outer enclosure.

Attachment bosses 12a, 12a protruding downward are provided at opposite diagonal corners of the lower surface of the body 12, as shown in FIGS. 6 and 7. Engaging pieces 14, 14, 14 protrude downward from the lower edges of the body 12. The engaging pieces 14, 14, 14, each of which being shaped into a substantially rectangular plate, are provided, for example, at central portions of the front edge, the rear edge, and the right edge of the body 12. The engaging pieces 14, 14, 14 have engaging holes 14a, 14a, 14a formed therein. Each of the engaging pieces 14, 14, 14 is elastically deformable.

The outer surfaces 14b, 14b, 14b of the engaging pieces 14, 14, 14 are flush with the respective outer surfaces of the body 12, that is, the front surface 12d, the rear surface 12e, and the right side surface 12f.

Guide shaft receivers 12b, 12b and a guiding shaft receiver 12c, each of which being open downward, are formed in the inner surface of the upper side portion of the body 12, as shown in FIG. 7. The guide shaft receivers 12b, 12b are positioned on the left end side of the upper side portion of the body 12 and spaced apart from each other in the front-rear direction. The guiding shaft receiver 12c is positioned on the right end side of the upper side portion of the body 12.

The assembling protrusion 13 is provided along the right end side of the upper side portion of the body 12, as shown in FIG. 6, and shaped into a triangular prism. The front surface 13a of the assembling protrusion 13 is seamlessly connected and flush with the front surface 12d of the body 12. A lens assembly hole 15 extending through the front-rear direction is formed in an area that spans the front surface 12d and the front surface 13a of the upper half portion 10.

The interior of the assembling protrusion 13 communicates with the interior of the body 12.

Figure 8:
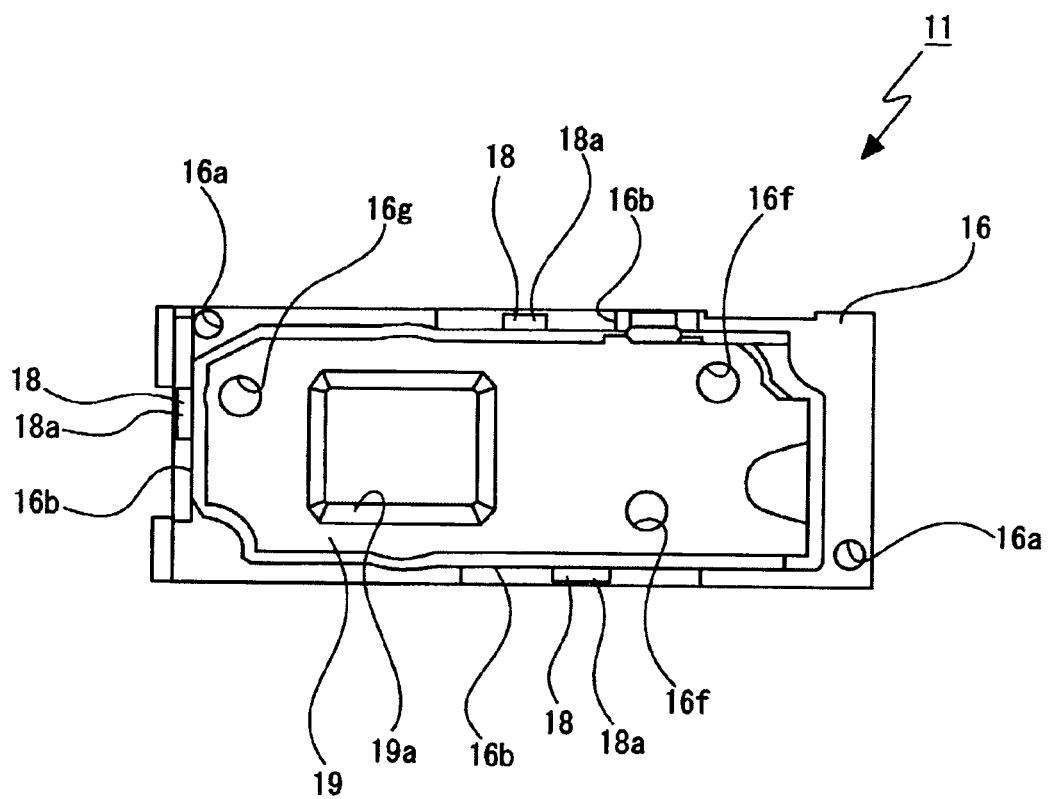
FIG. 8 is an enlarged plan view showing a lower half portion of the outer enclosure.

The lower half portion 11 includes, as shown in FIGS. 6 and 8, a laterally-elongated box-shaped body 16, the upper and left sides of which being open, and a unit assembling portion 17 provided in the portion other than the left end portion of the lower end portion of the body 16.

Attachment holes 16a, 16a that are open upward are formed at opposite diagonal corners of the upper surface of the body 16. Shallow insertion recesses 16b, 16b, 16b that are open outward and upward are formed in the upper end portion of the outer surface of the body 16. The insertion recesses 16b, 16b, 16b are formed, for example, at the central portions of the front surface 16c, the rear surface 16d, and the right side surface 16e.

Engaging protrusions 18, 18, 18 protruding outward are provided on the upper end portions of the insertion recesses 16b, 16b, 16b. The engaging protrusions 18, 18, 18, the amount of outward protrusion of which increasing in lower positions, have inclined surfaces 18a, 18a, 18a having larger outward displacement in lower positions.

Guide shaft receivers 16f, 16f and a guiding shaft receiver 16g, each of which being open upward, are formed in the inner surface of the lower side portion of the body 16, as shown in FIG. 8. The guide shaft receivers 16f, 16f are positioned on the left end side of the lower side portion of the body 16 and spaced apart from each other in the front-rear direction. The guiding shaft receiver 16g is positioned on the right end side of the lower side portion of the body 16.

Figure 9:
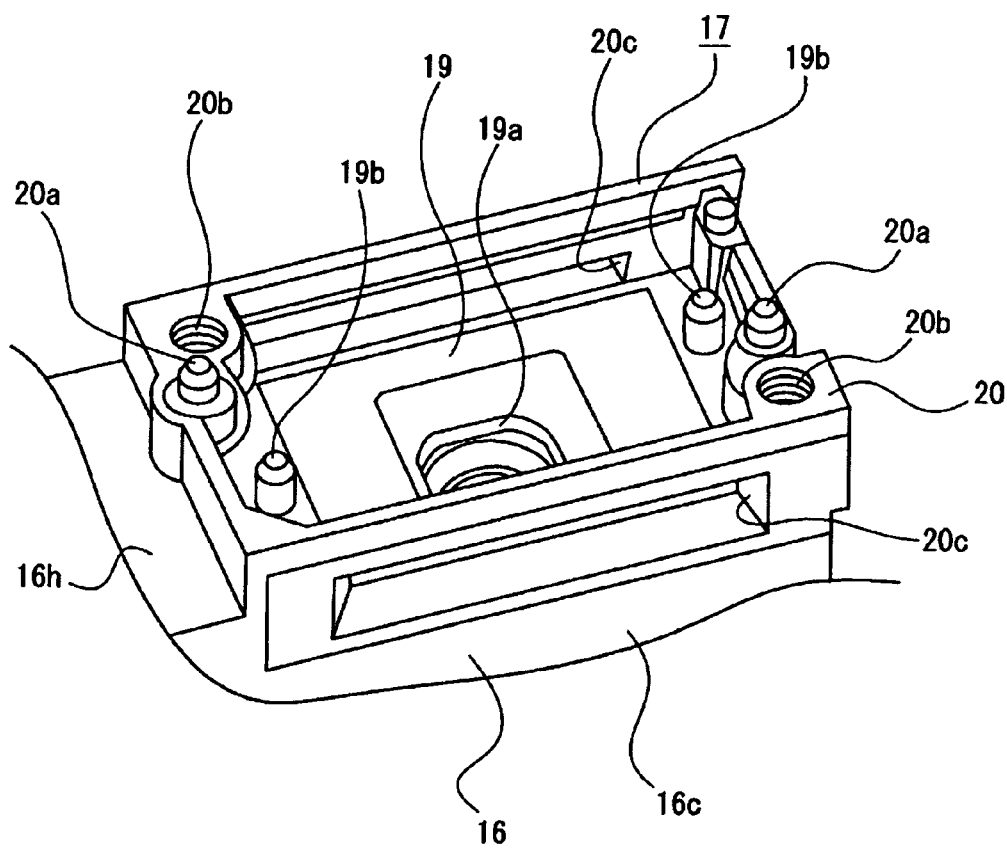
FIG. 9 is an enlarged perspective view showing a unit assembling portion provided in the lower half portion of the outer enclosure.

The unit assembling portion 17 has a rectangular bottom portion 19 positioned on the upper side of the unit assembling portion 17 and facing upward and downward, and a peripheral side portion 20 protruding downward from the periphery of the bottom portion 19, as shown in FIG. 9.

A light path opening 19a that communicates with the interior of the body 16 is formed in the bottom portion 19 of the unit assembling portion 17. Attachment pins 19b, 19b protruding downward are provided on the right and left end portions of the bottom portion 19, respectively.

Holding pins 20a, 20a protruding downward and spaced apart from each other in the right-left direction are provided on the peripheral side portion 20 of the unit assembling portion 17. Threaded holes 20b, 20b spaced apart from each other in the right-left direction are formed in the lower surface of the peripheral side portion 20. Laterally-elongated working holes 20c, 20c are formed in the front and rear surfaces of the peripheral side portion 20. The working holes 20c, 20c allow the interior of the unit assembling portion 17 to communicate with the exterior thereof.

A description will be made of how to connect the upper half portion 10 to the lower half portion 11. The connection of the upper half portion 10 and the lower half portion 11 is carried out after necessary portions, such as guide shafts and guiding shafts, which will be described later, have been disposed in the upper half portion 10 and the lower half portion 11.

First, the upper half portion 10 and the lower half portion 11 spaced apart in the up-down direction are brought closer to each other in the up-down direction. When the upper half portion 10 and the lower half portion 11 are brought closer to each other, the engaging pieces 14, 14, 14 of the upper half portion 10 are inserted into the insertion recesses 16b, 16b, 16b of the lower half portion 11, and the lower edges of the engaging pieces 14, 14, 14 come into contact with the engaging protrusions 18, 18, 18.

Figure 10:
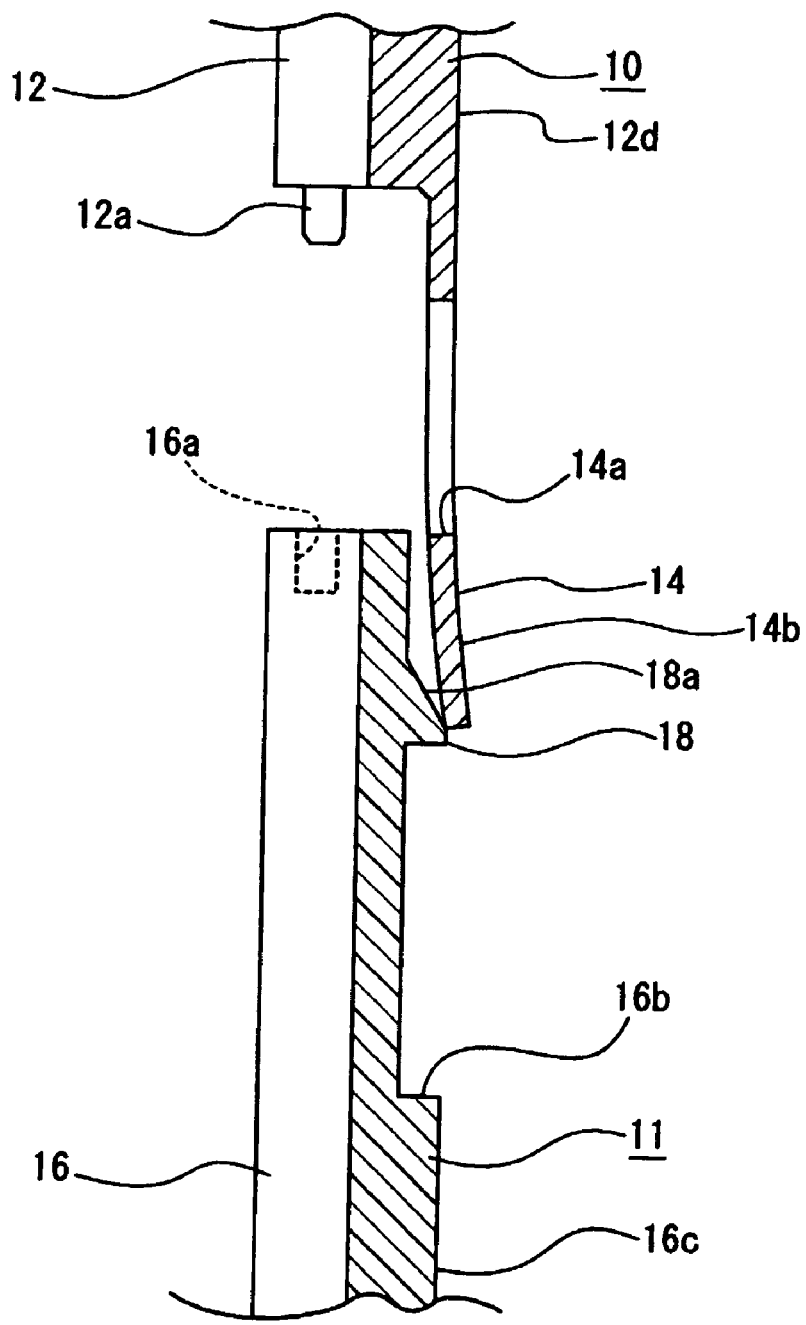
FIG. 10, along with FIGS. 11 to 13, shows how the upper half portion of the outer enclosure is connected to the lower half portion, and is an enlarged cross-sectional view showing a state in which engaging pieces of the upper half portion slide over engaging protrusions of the lower half portion and are elastically deformed.

When the upper half portion 10 and the lower half portion 11 are further brought closer to each other, the engaging pieces 14, 14, 14 slide over the inclined surfaces 18a, 18a, 18a of the engaging protrusions 18, 18, 18, respectively. In this process, the engaging pieces 14, 14, 14 are elastically deformed outward, and the lower end portions thereof are located outside the insertion recesses 16b, 16b, 16b (see FIG. 10).

Figure 11:
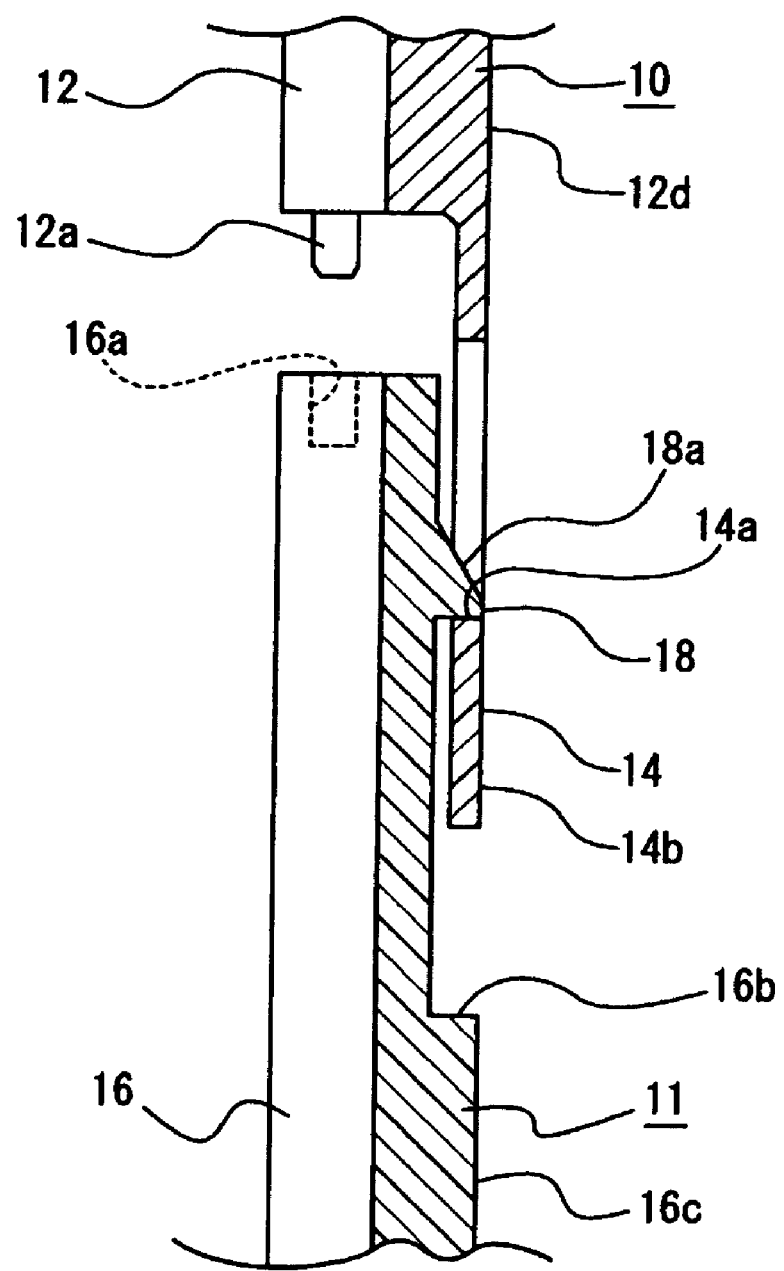
FIG. 11 is an enlarged cross-sectional view showing a state in which the engaging pieces elastically return to their initial shapes and the engaging protrusions are inserted into engaging holes.

When the upper half portion 10 and the lower half portion 11 are further brought closer to each other, the lower opening edges of the engaging holes 14a, 14a, 14a in the engaging pieces 14, 14, 14 are positioned to face the lower edges of the engaging protrusions 18, 18, 18, respectively. The engaging pieces 14, 14, 14 elastically return to their initial shapes, and the engaging protrusions 18, 18, 18 are inserted in the engaging holes 14a, 14a, 14a, respectively, as shown in FIG. 11. The attachment bosses 12a, 12a of the upper half portion 10 are not yet inserted into the attachment holes 16a, 16a in the lower half portion 11.

In the state in which the engaging pieces 14, 14, 14 elastically return to their initial shapes and the engaging protrusions 18, 18, 18 are inserted in the engaging holes 14a, 14a, 14a, respectively, the engaging pieces 14, 14, 14 are again inserted in the insertion recesses 16b, 16b, 16b, respectively.

When the upper half portion 10 and the lower half portion 11 are further brought closer to each other, the lower opening edges of the engaging holes 14a, 14a, 14a in the engaging pieces 14, 14, 14 become downwardly apart from the lower edges of the engaging protrusions 18, 18, 18, respectively, and at the same time, the attachment bosses 12a, 12a are inserted into the attachment holes 16a, 16a.

Figure 12:
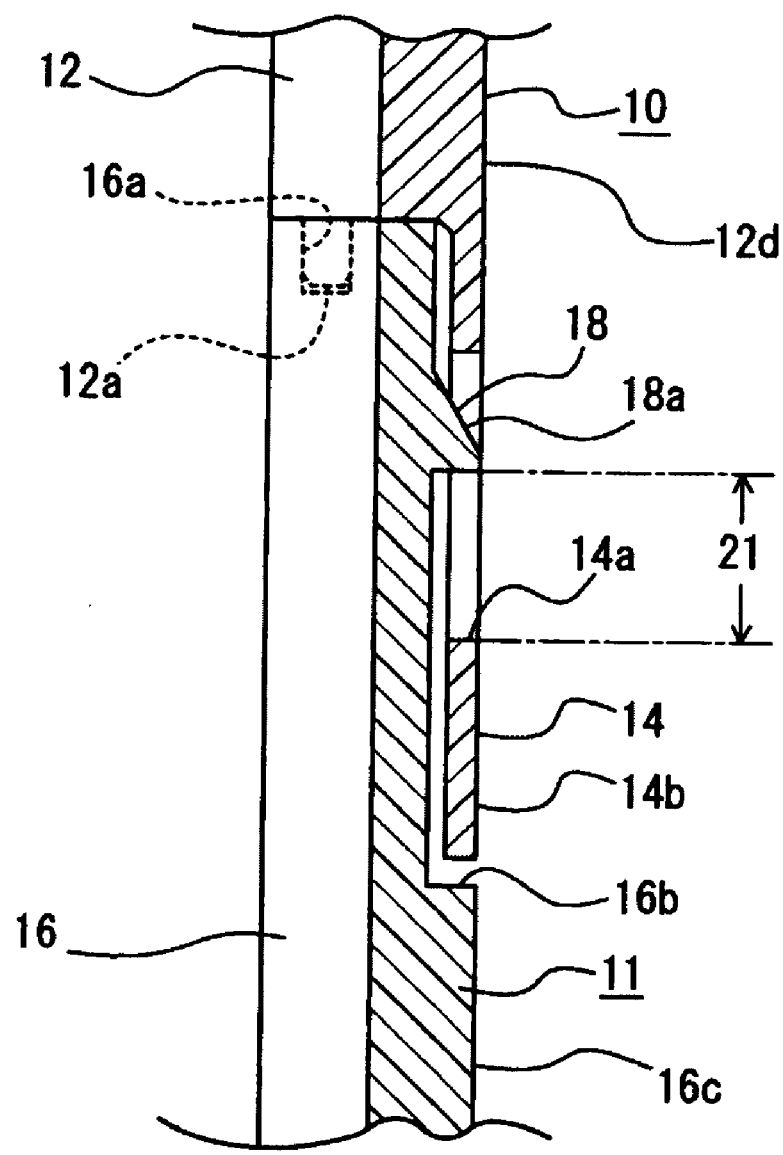
FIG. 12 is an enlarged cross-sectional view showing a state in which attachment bosses of the upper half portion are inserted into attachment holes in the lower half portion.

When the upper half portion 10 and the lower half portion 11 are further brought closer to each other, the lower surface of the upper half portion 10 comes into contact with the upper surface of the lower half portion 11 (see FIG. 12). With the lower surface of the upper half portion 10 in contact with the upper surface of the lower half portion 11, gaps 21, 21, 21 are formed between the lower opening edges of the engaging holes 14a, 14a, 14a in the engaging pieces 14, 14, 14 and the lower edges of the engaging protrusions 18, 18, 18.

Finally, adhesive 22, 22, 22 are applied to the gaps 21, 21, 21. The connection of the upper half portion 10 to the lower half portion 11 is thus completed (see FIG. 13). Applying the adhesive 22, 22, 22 to the gaps 21, 21, 21 is carried out by using a jig (not shown) to hold the outer enclosure 9.

Figure 13:
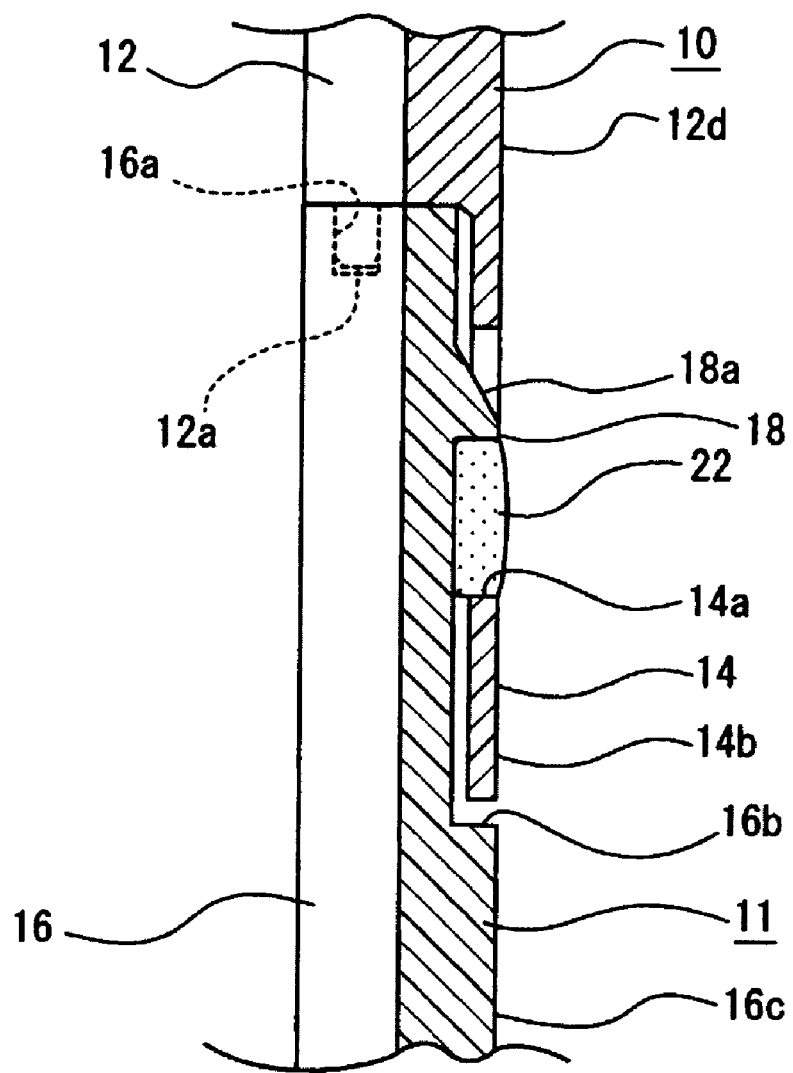
FIG. 13 is an enlarged cross-sectional view showing a state in which an adhesive is applied to gaps formed between the engaging pieces and the engaging protrusions so that the upper half portion is connected to the lower half portion.

With the upper half portion 10 connected to the lower half portion 11, the entire engaging pieces 14, 14, 14 are inserted in the insertion recesses 16b, 16b, 16b, and the outer surfaces of the engaging pieces 14, 14, 14 do not protrude outward from the outermost surface of the lower half portion 11 (see FIG. 13). The size of the lens barrel 8 can thus be reduced.

As described above, with the upper half portion 10 connected to the lower half portion 11, the adhesive 22, 22, 22 are applied to the gap 21, 21, 21 formed between the lower opening edges of the engaging holes 14a, 14a, 14a and the lower edges of the engaging protrusions 18, 18, 18, respectively. Therefore, when a force acts in such a way that the upper half portion 10 and the lower half portion 11 disengage from each other, that is, the upper half portion 10 is moved upward and the lower half portion 11 is moved downward, the adhesive 22, 22, 22 restrict the upward movement of the upper half portion 10 and the downward movement of the lower half portion 11.

Therefore, applying the adhesive 22, 22, 22 to the gap 21, 21, 21 ensures strong connection between the upper half portion 10 and the lower half portion 11. Even when an impact force is applied to the imaging apparatus 1, for example, when it falls, the upper half portion 10 and the lower half portion 11 will not disengage from each other but maintain their connected state.

An example of the adhesive 22, 22, 22 is an UV curable adhesive. To prevent the adhesive 22, 22, 22 from flowing inside the outer enclosure 9 when they are applied to the gap 21, 21, 21, it is preferable to select an adhesive having a viscosity that prevents the adhesive from flowing inside the outer enclosure 9.

It is however noted that in the lens barrel 8, the adhesive 22, 22, 22 are applied only to the gap 21, 21, 21 formed on the outer surface side of the lower half portion 11, and no adhesive is applied between the lower surface of the upper half portion 10 and the upper surface of the lower half portion 11. The adhesive therefore unlikely flows inside the outer enclosure 9.

The above description has been made with reference to the case where the upper half portion 10 has the elastically deformable engaging pieces 14, 14, 14 and the lower half portion 11 has the engaging protrusions 18, 18, 18. Conversely, the upper half portion may have engaging protrusions and the lower half portion may have elastically deformable engaging pieces for the connection between the upper half portion and the lower half portion.

Figure 14:
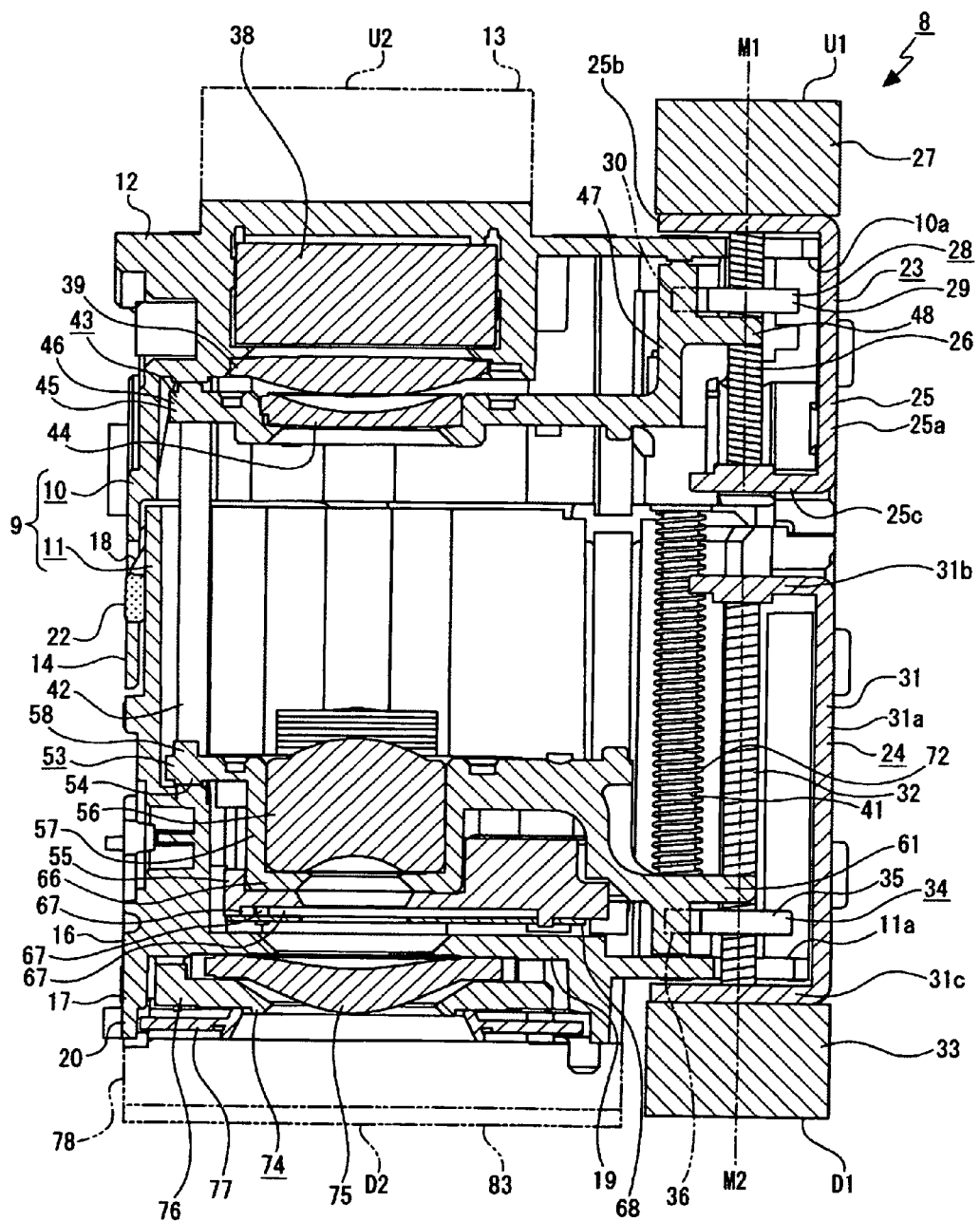
FIG. 14 is an enlarged cross-sectional view of the lens barrel.

A first drive unit 23 and a second drive unit 24, spaced apart from each other in the up-down direction, are attached to the left end portion of the outer enclosure 9 (see FIG. 14).

Figure 15:
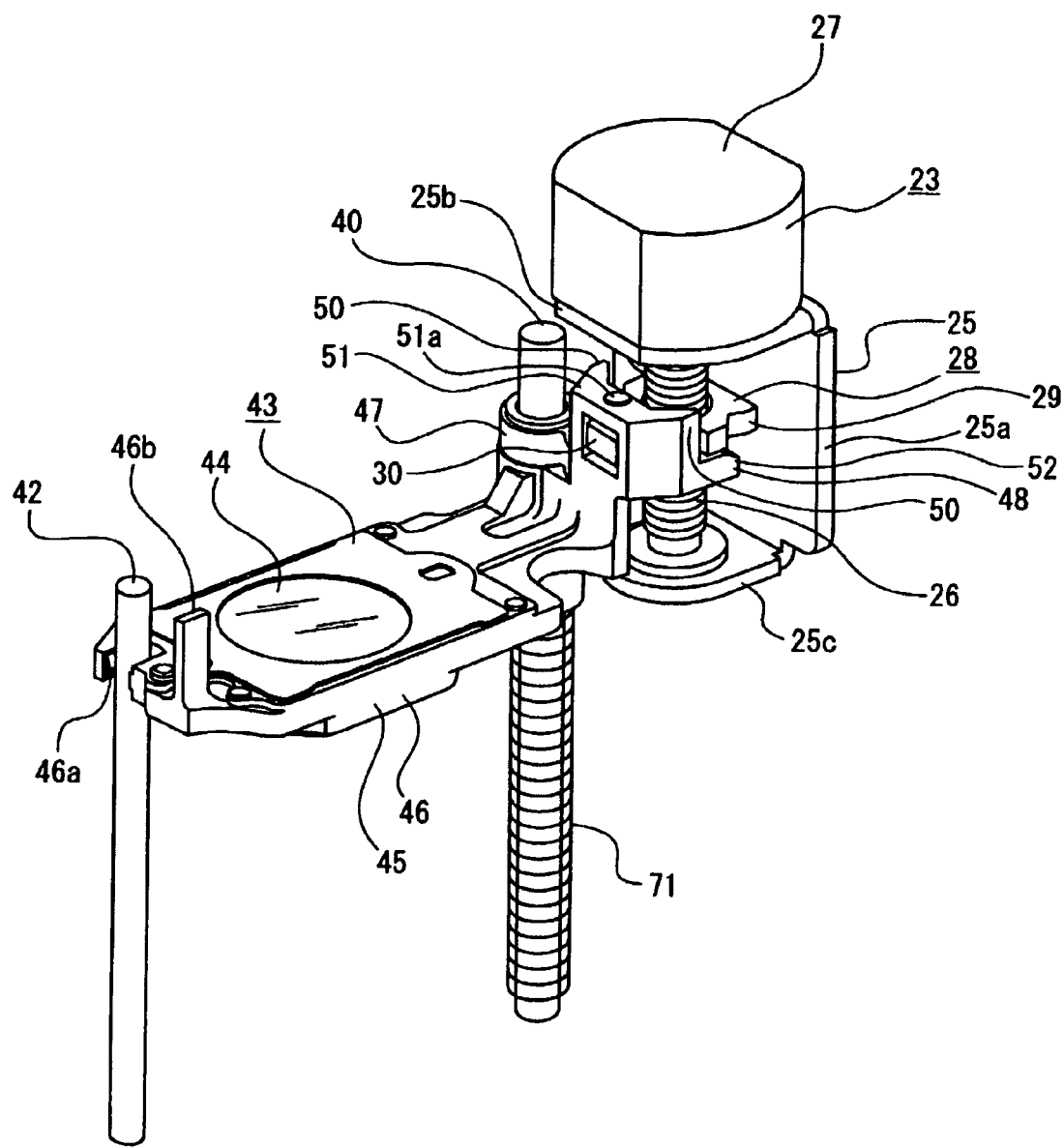
FIG. 15 is an enlarged perspective view showing a first drive unit and a first movable unit supported by a first guide shaft and a guiding shaft.

The first drive unit 23 is attached to the upper half portion 10 of the outer enclosure 9, as shown in FIGS. 14 and 15. The first drive unit 23 includes a first support sheet metal 25, a first lead screw 26 rotatably supported by the first support sheet metal 25, a first drive motor 27 attached to the first support sheet metal 25, and a first nut member 28 that threadably engages the first lead screw 26.

The first support sheet metal 25 is formed of a base portion 25a extending in the up-down direction and support portions 25b, 25c protruding rightward from the upper and lower ends of the base portion 25a.

The first lead screw 26, the axial direction of which is oriented in the up-down direction, is rotatably supported by the support portions 25b, 25c of the first support sheet metal 25.

Figure 16:
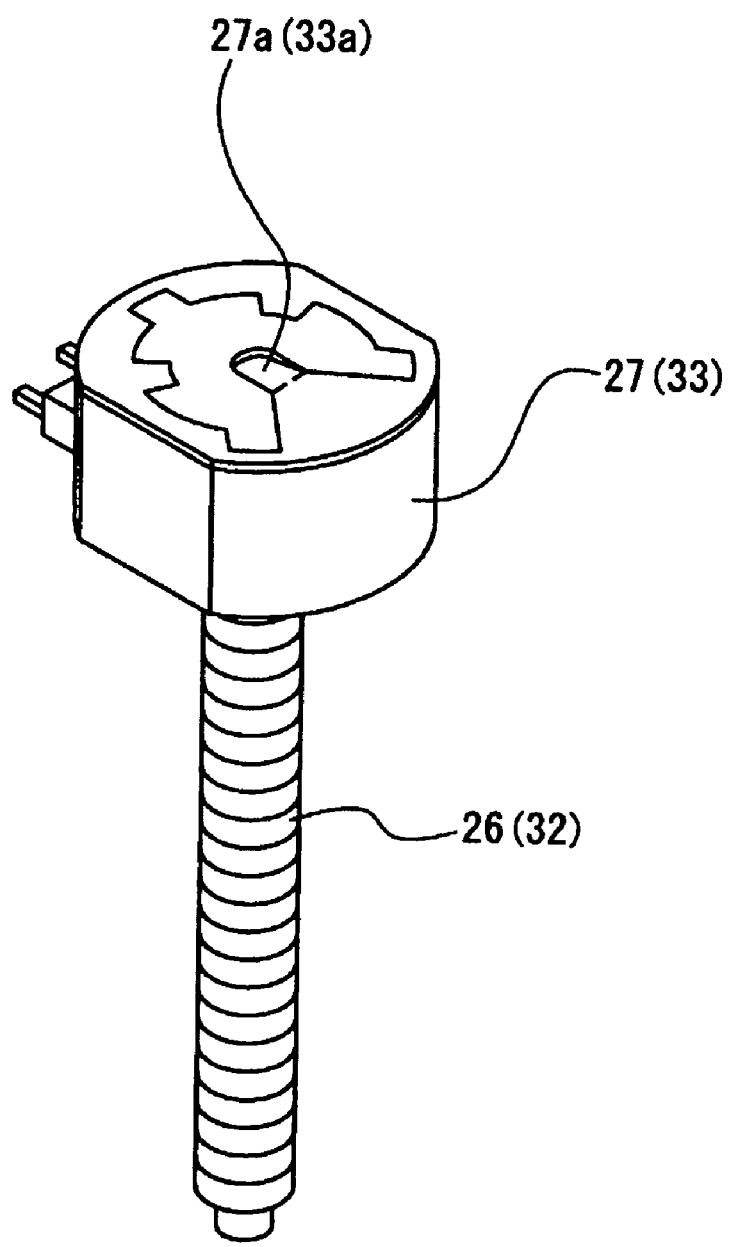
FIG. 16 is an enlarged perspective view of a drive motor.

The first drive motor 27 is attached to the upper surface of the upper support portion 25b. The first lead screw 26 is provided as the drive motor shaft of the first drive motor 27, and rotated when the first drive motor 27 is driven. A plate spring 27a that urges the first lead screw 26 from the rear side toward the front end side is provided on the rear side of the first drive motor 27, as shown in FIG. 16 (The plate spring 27a is only shown in FIG. 16 but not in the other drawings.)

Figure 17:
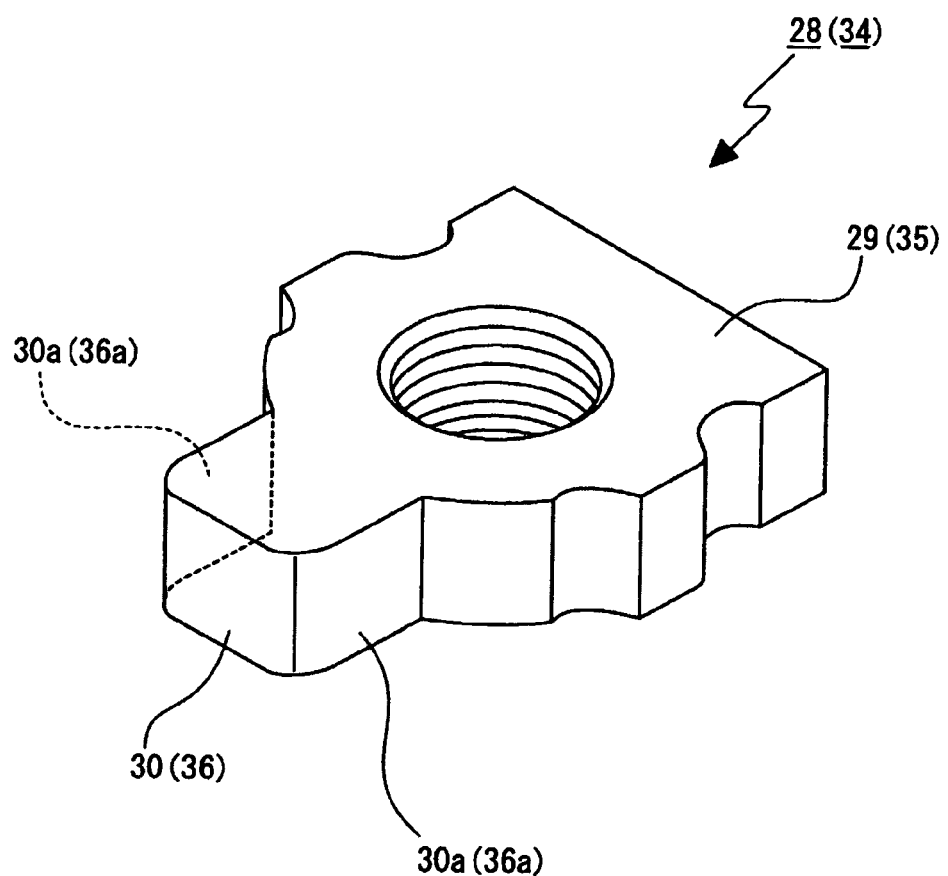
FIG. 17 is an enlarged perspective view of a nut member.

The first nut member 28 is made of a thick metal material, and includes an annular supported portion 29 and a restricted portion 30 radially protruding from the supported portion 29, as shown in FIG. 17. The two side surfaces of the restricted portion 30 are formed as restricted surfaces 30a, 30a parallel to each other. The first lead screw 26, when inserted into the supported portion 29, threadably engages the first nut member 28.

The first drive unit 23 is attached to the upper half portion 10 by inserting the first drive unit 23, excluding part thereof, into an opening 10a located on the left side of the upper half portion 10 and securing the base portion 25a of the first support sheet metal 25, for example, using screws, as shown in FIG. 14. With the first drive unit 23 attached to the upper half portion 10, the base portion 25a of the first support sheet metal 25 blocks the opening 10a located on the left side of the upper half portion 10, and the support portion 25b of the first support sheet metal 25 and the first drive motor 27 are disposed on an upper surface 12g of the body 12 of the upper half portion 10.

Figure 18:
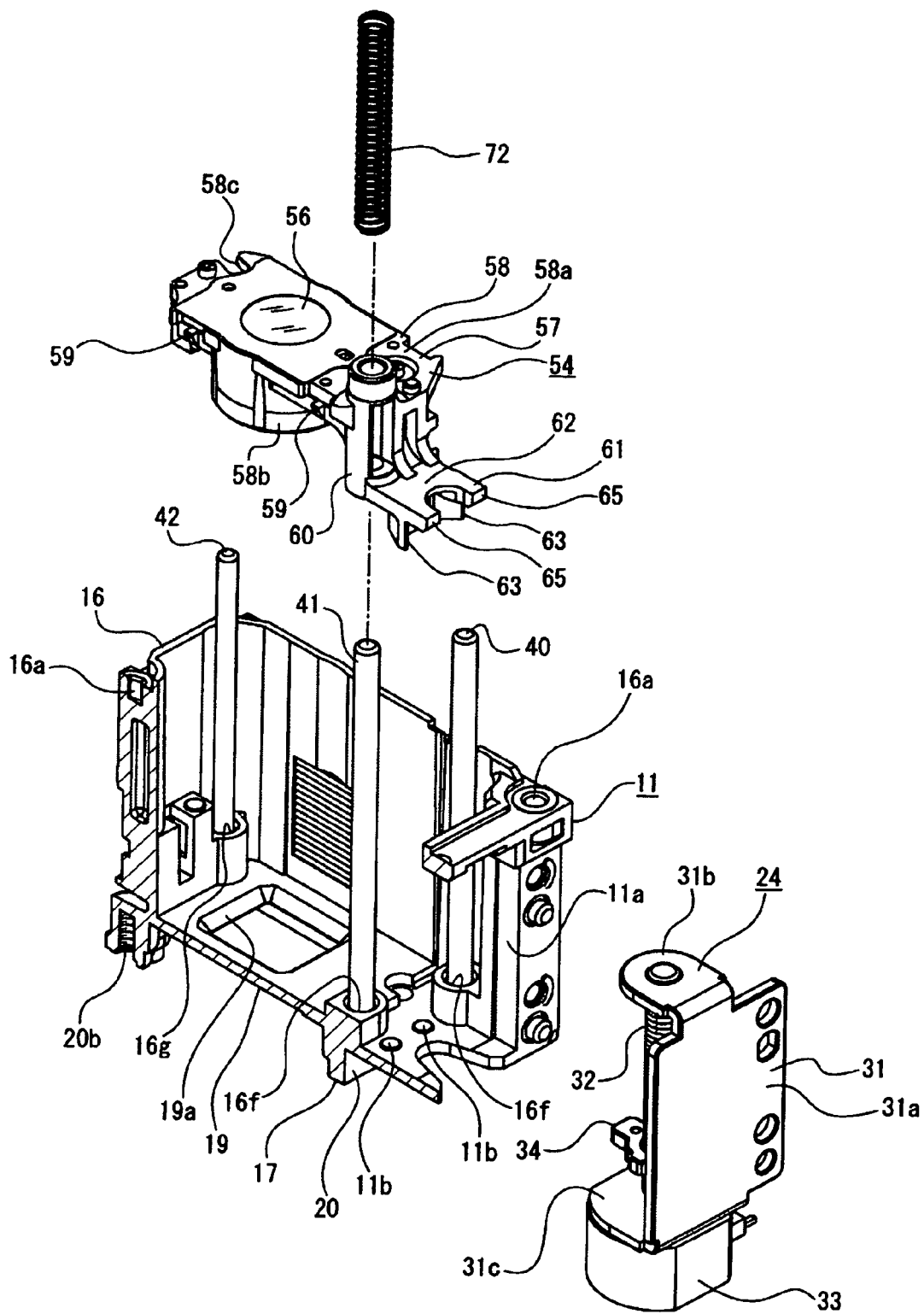
FIG. 18 is an enlarged perspective view showing the configuration of members disposed in the outer enclosure, part of which being cross-sectioned, along with the outer enclosure.

The second drive unit 24 is attached to the lower half portion 11 of the outer enclosure 9, as shown in FIGS. 14 and 18. The second drive unit 24 includes a second support sheet metal 31, a second lead screw 32 rotatably supported by the second support sheet metal 31, a second drive motor 33 attached to the second support sheet metal 31, and a second nut member 34 that threadably engages the second lead screw 32.

The second support sheet metal 31 is formed of a base portion 31a extending in the up-down direction and support portions 31b, 31c protruding rightward from the upper and lower ends of the base portion 31a.

The second lead screw 32, the axial direction of which is oriented in the up-down direction, is rotatably supported by the support portions 31b, 31c of the second support sheet metal 31.

The second drive motor 33 is attached to the lower surface of the lower support portion 31c. The second lead screw 32 is provided as the drive motor shaft of the second drive motor 33, and is rotated when the second drive motor 33 is driven. A plate spring 33a that urges the second lead screw 32 from the rear side toward the front end side is provided on the rear side of the second drive motor 33, as shown in FIG. 16 (The plate spring 33a is only shown in FIG. 16 but not in the other drawings.)

The second nut member 34 is made of a thick metal material, and includes an annular supported portion 35 and a restricted portion 36 radially protruding from the supported portion 35, as shown in FIG. 17. The two side surfaces of the restricted portion 36 are formed as restricted surfaces 36a, 36a parallel to each other. The second lead screw 32, when inserted into the supported portion 35, threadably engages the second nut member 34.

The second drive unit 24 is attached to the lower half portion 11 by inserting the second drive unit 24, excluding part thereof, into an opening 11a located on the left side of the lower half portion 11 and securing the base portion 31a of the second support sheet metal 31, for example, using screws, as shown in FIG. 14. With the second drive unit 24 attached to the lower half portion 11, the base portion 31a of the second support sheet metal 31 blocks the opening 11a located on the left side of the lower half portion 11, and the support portion 31b of the second support sheet metal 31 and the second drive motor 33 are disposed on the lower surface 16h of the body 16 of the lower half portion 11.

As described above, the first drive motor 27 is disposed on the upper surface 12g of the body 12 of the upper half portion 10, and the second drive motor 33 is disposed on the lower surface 16h of the body 16 of the lower half portion 11. In this state, as shown in FIG. 14, the upper surface U1 of the first drive motor 27 does not protrude upward from the upper surface U2 of the assembling protrusion 13 of the upper half portion 10, and the lower surface D1 of the second drive motor 33 does not protrude downward from the lower surface D2 of a circuit substrate, which will be described later, attached to the lower side of the unit assembling portion 17 of the lower half portion 11.

Therefore, the first drive motor 27 is disposed at a level lower than the upper surface U2 of the assembling protrusion 13 located at the uppermost level in the outer enclosure 9, and the second drive motor 33 is disposed at a level higher than the portion D2 located at the lowermost level among the members attached to the outer enclosure 9. Such a configuration allows reduction in size of the lens barrel 8.

In the state in which the first drive unit 23 is attached to the upper half portion 10 and the second drive unit 24 is attached to the lower half portion 11, and the upper half portion 10 is connected to the lower half portion 11 to form the outer enclosure 9, the central axis M1 of the first lead screw 26 is aligned with the central axis M2 of the second lead screw 32, as shown in FIG. 14.

Figure 19:
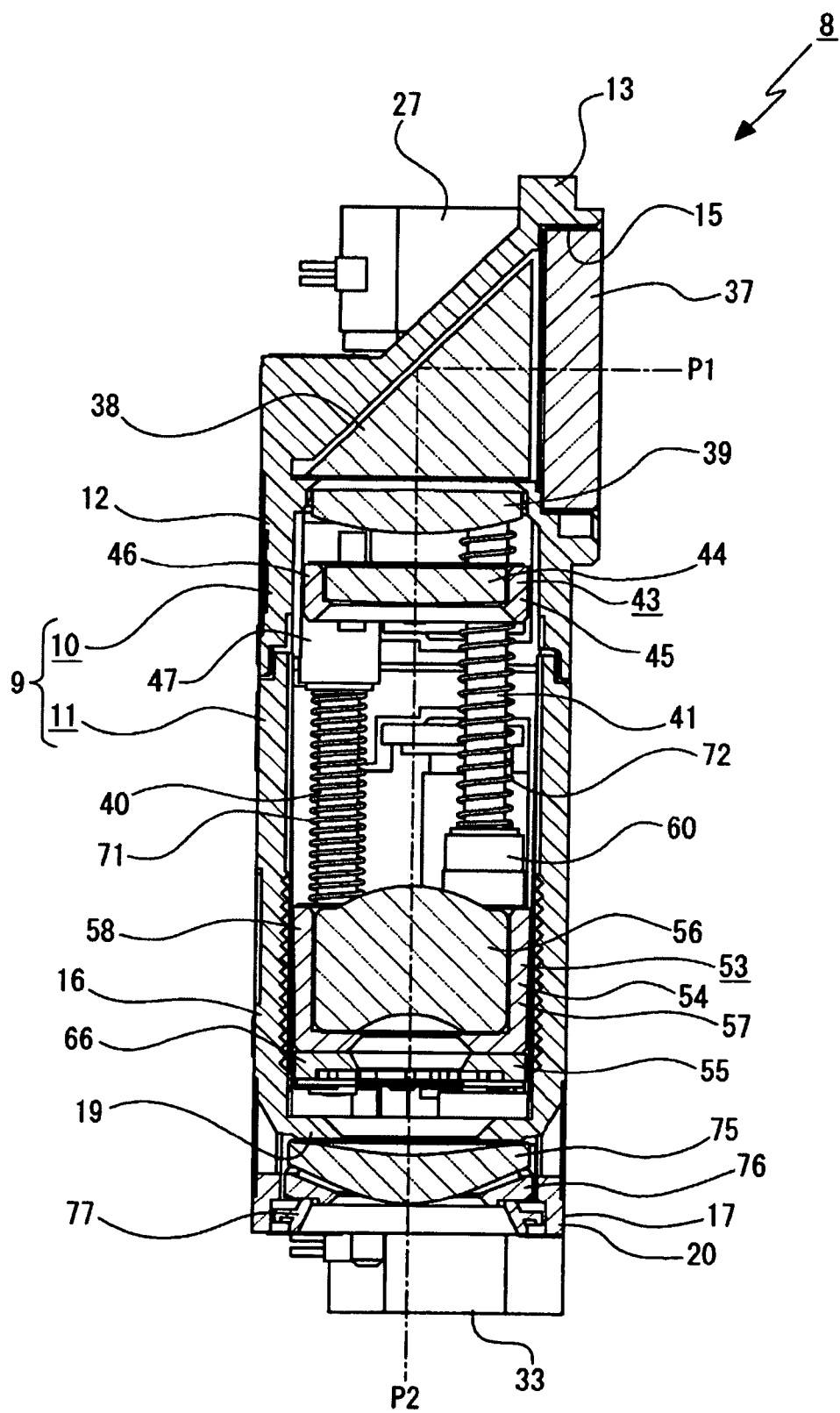
FIG. 19 is an enlarged cross-sectional view of the lens barrel viewed from a direction different from the viewing direction in FIG. 14.
Figure 20:
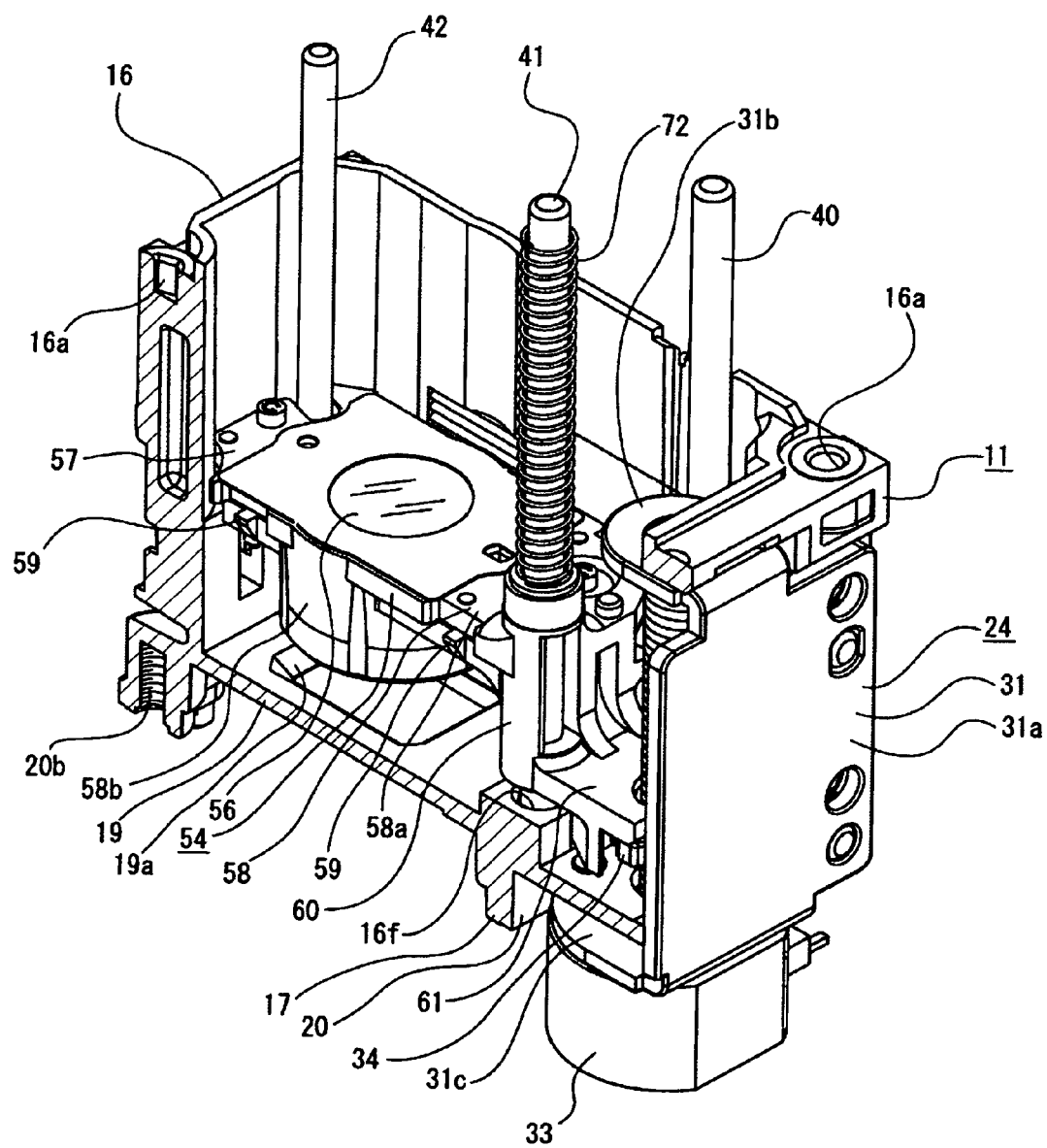
FIG. 20 is a perspective view showing the configuration of members disposed in the outer enclosure, part of which being cross-sectioned, along with the outer enclosure.

An objective lens 37 is disposed in the lens assembly hole 15 in the assembling protrusion 13 of the upper half portion 10 (see FIGS. 5 and 19). The objective lens 37, the optical axis P1 of which is oriented in the front-rear direction, serves to collect image capturing light introduced when a subject is imaged.

A prism 38 is disposed behind the objective lens 37 in the upper half portion 10. The prism 38 serves to bend the image capturing light introduced through the objective lens 37 and guide it downward.

A first fixed lens 39 is disposed under the prism 38 in the upper half portion 10.

A first guide shaft 40, a second guide shaft 41, and a guiding shaft 42, each of which extends in the up-down direction, are disposed in the outer enclosure 9 (see FIGS. 5, 14, 18, 19, and 20).

The first guide shaft 40 and the second guide shaft 41 are disposed in the left end portion of the outer enclosure 9, and both axial ends of these guide shafts are held in the guide shaft receivers 12b, 12b in the upper half portion 10 and the guide shaft receivers 16f, 16f in the lower half portion 11, respectively. The first guide shaft 40 and the second guide shaft 41 are therefore disposed in such a way that they are spaced apart from each other in the front-rear direction.

The guiding shaft 42 is disposed in the right end portion of the outer enclosure 9, and both axial ends are held in the guiding shaft receiver 12c in the upper half portion 10 and the guiding shaft receiver 16g in the lower half portion 11, respectively.

A first movable unit 43 is slidably supported by the first guide shaft 40 and the guiding shaft 42 (see FIGS. 14 and 15). The first movable unit 43 includes a focus lens 44 and a first lens holder 45 that holds the focus lens 44.

Figure 21:
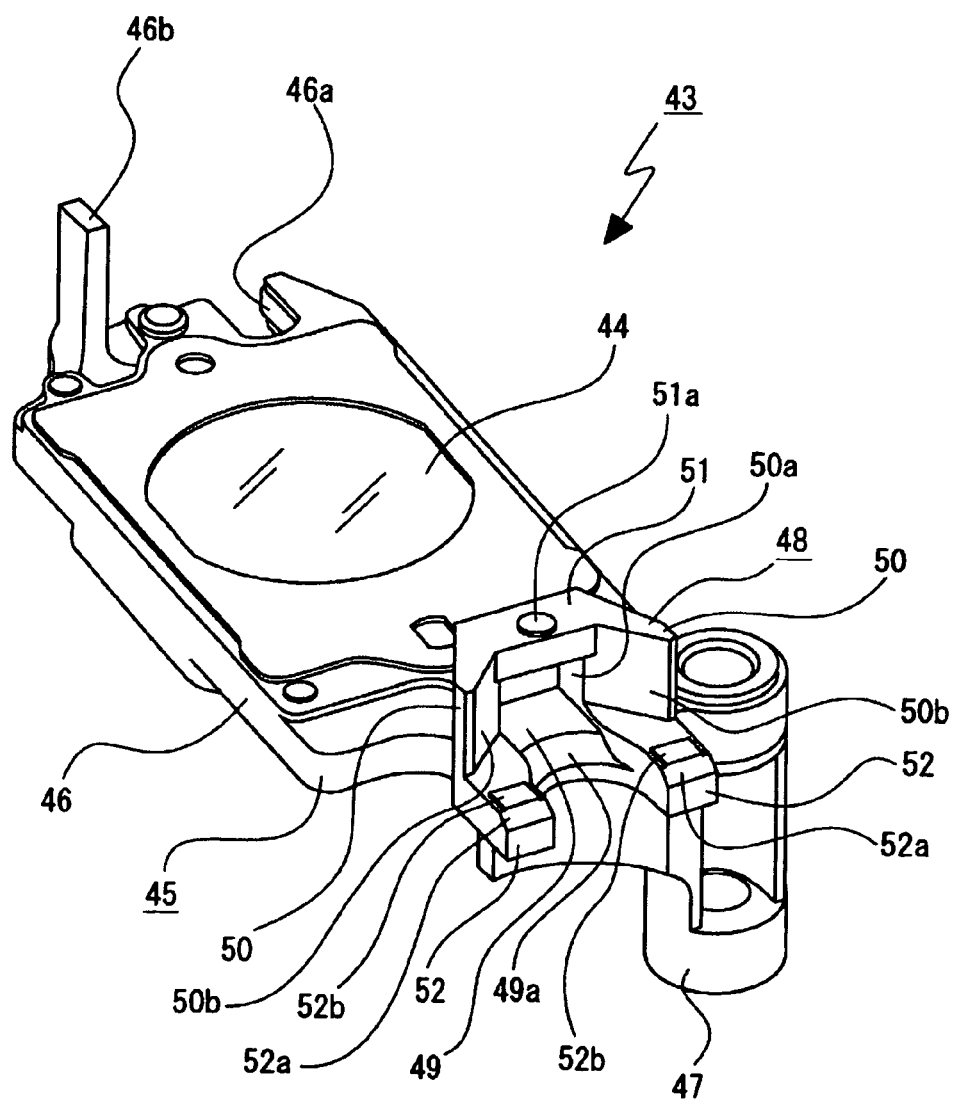
FIG. 21 is an enlarged perspective view of a first movable unit.
Figure 22:
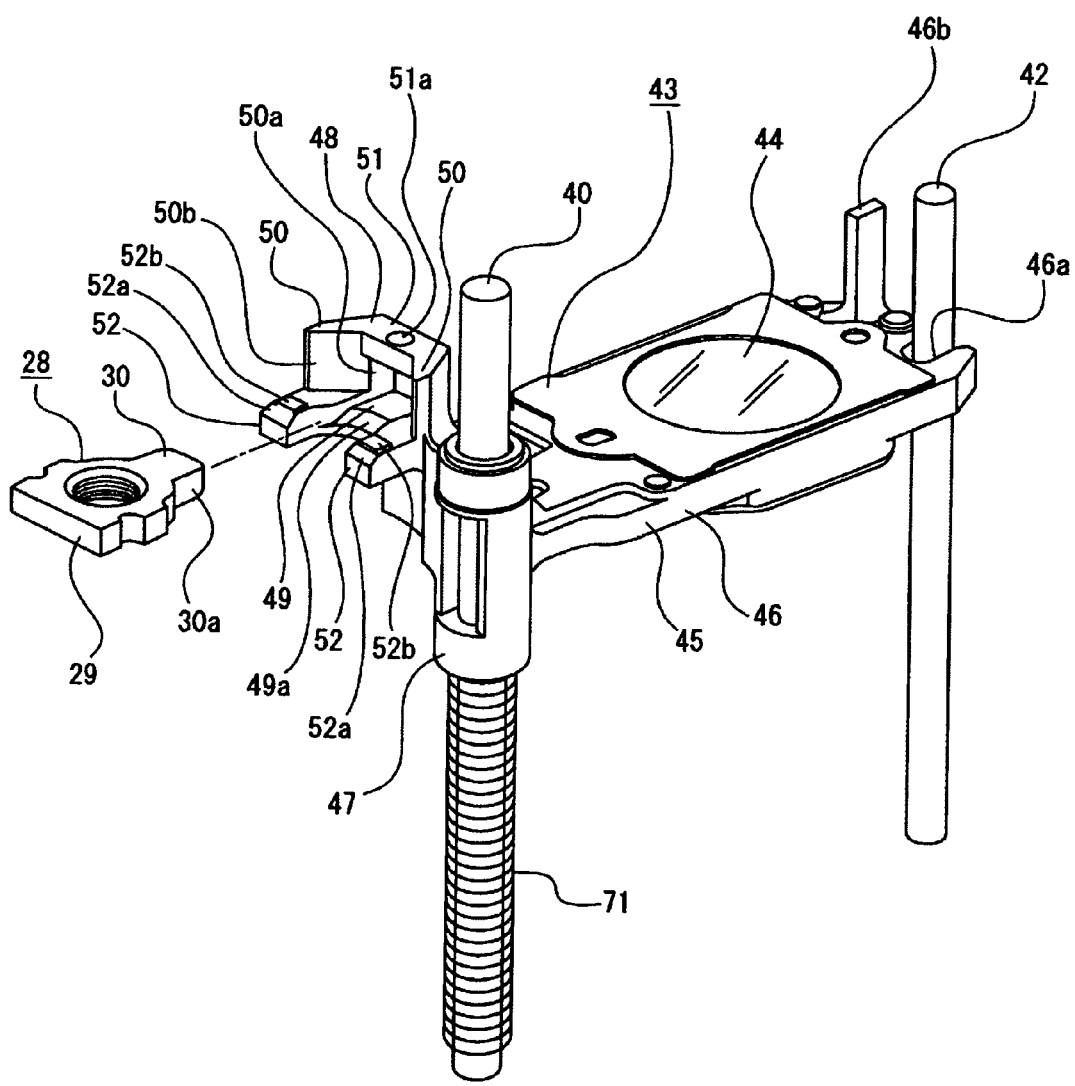
FIG. 22 is an enlarged perspective view showing the first movable unit along with the first nut member, the first movable unit supported by the first guide shaft and the guiding shaft.

The first lens holder 45 is obtained by molding a resin material to integrally form a lens holding portion 46 that holds the focus lens 44, a shaft receiver 47 provided to the left of the lens holding portion 46, and a nut holding portion 48 provided to the left of the lens holding portion 46 and in front of the shaft receiver 47, as shown in FIGS. 21 and 22.

The lens holding portion 46 is shaped into a substantially flat plate. A shaft receiving groove 46a that is open rightward is formed by cutting the right end of the lens holding portion 46. A detection protrusion 46b protruding upward is provided at the right end of the lens holding portion 46.

The shaft receiver 47 has a substantially tubular shape elongated in the up-down direction.

The nut holding portion 48 includes a base portion 49 facing upward and downward, standing walls 50, 50 protruding upward from the front and rear ends of the base portion 49, a connecting portion 51 that connects the upper surface of one of the standing walls 50 to the upper surface of the other standing wall 50, and protrusions 52, 52 protruding leftward from the front and rear ends of the base portion 49.

The base portion 49 becomes wider in the front-rear direction in positions closer to its left end. In the base portion 49, the upper surface of the left end portion in the central part in the front-rear direction is a first guiding surface 49a inclined downward in the leftward direction.

Facing surfaces in the right half of the standing walls 50, 50 are formed as restricting surfaces 50a, 50a parallel to each other. The standing walls 50, 50 have second guiding surfaces 50b, 50b connected to the left edges of the restricting surfaces 50a, 50a and inclined in directions the distance between the second guiding surfaces 50b, 50b increases.

A stopper protrusion 51a is provided on the upper surface of the connecting portion 51.

The upper surfaces of the left end portions of the protrusions 52, 52 are third guiding surfaces 52a, 52a inclined downward in the leftward direction. Receiving surfaces 52b, 52b slightly protruding upward are provided immediately to the right of the third guiding surfaces 52a, 52a of the protrusions 52, 52.

The shaft receiver 47 is supported by the first guide shaft 40, and the shaft receiving groove 46a formed in the lens holding portion 46 is supported by the guiding shaft 42, whereby the first lens holder 45 can be moved in the up-down direction.

Figure 23:
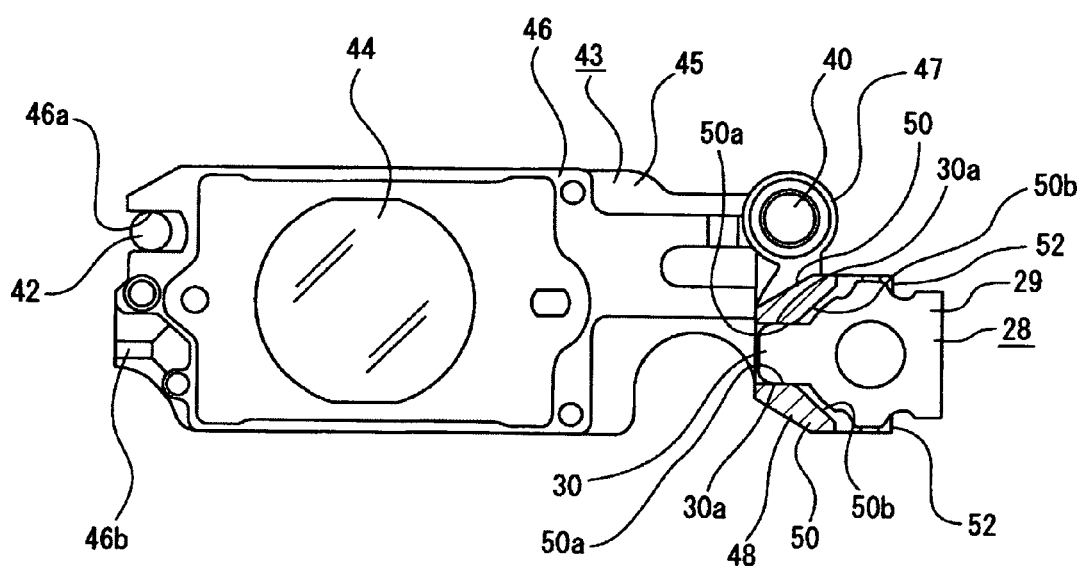
FIG. 23 is an enlarged plan view showing the first nut member held by a nut holding portion of the first movable unit, part of which being cross-sectioned.
Figure 24:
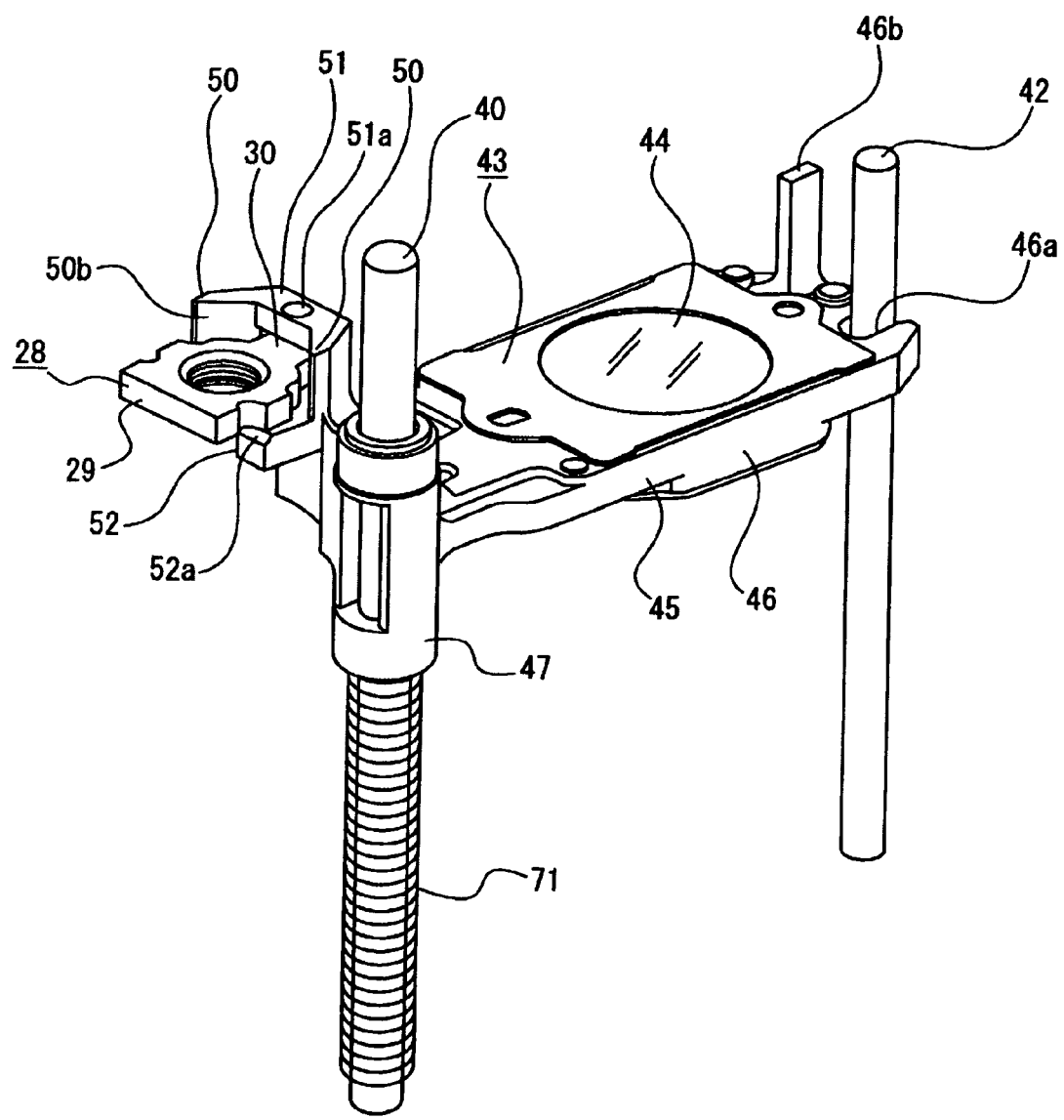
FIG. 24 is an enlarged perspective view showing the first movable unit supported by the first guide shaft and the guiding shaft with the first nut member connected to the first movable unit.

The first nut member 28 is inserted into the nut holding portion 48 and held therein (see FIGS. 22 to 24). The restricted portion 30 of the first nut member 28 is inserted from left between the standing walls 50, 50. The first nut member 28 is thus held by the nut holding portion 48.

To hold the first nut member 28 by the nut holding portion 48, the restricted portion 30 and the supported portion 29 are first guided in the up-down direction by the first guiding surface 49a of the base portion 49 and the third guiding surfaces 52a, 52a of the protrusions 52, 52, respectively, and then the restricted portion 30 is guided in the front-rear direction by the second guiding surfaces 50b, 50b of the standing walls 50, 50. The restricted portion 30 is thus inserted between the standing walls 50, 50.

Since the first nut member 28 is guided by the first guiding surface 49a, the second guiding surfaces 50b, 50b, and the third guiding surfaces 52a, 52a to insert the restricted portion 30 between the standing walls 50, 50 as described above, the restricted portion 30 can be reliably and readily inserted between the standing walls 50, 50.

Figure 25:
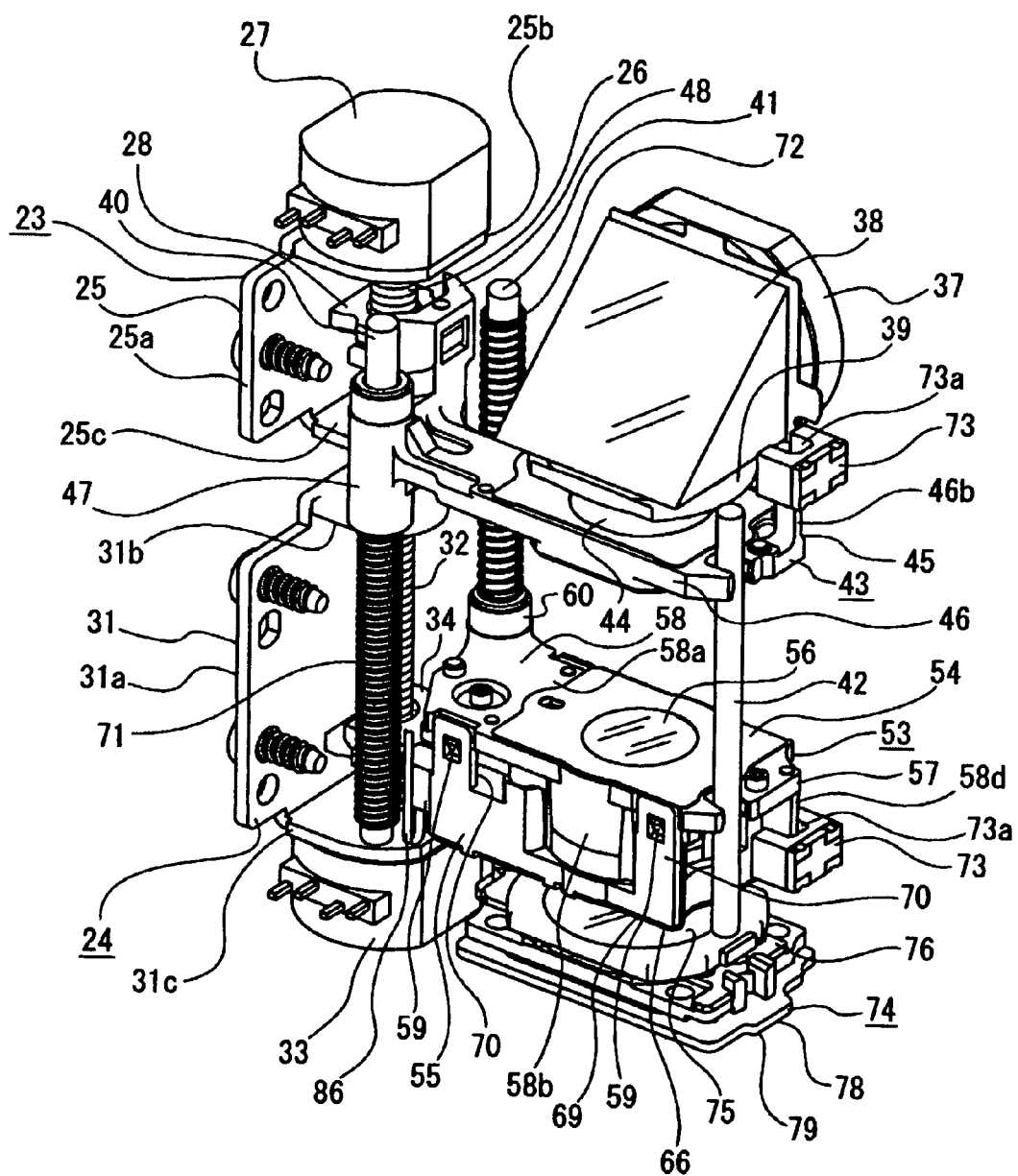
FIG. 25, along with FIG. 26, shows the internal configuration of the lens barrel, and is an enlarged perspective view showing the state for a wide-angle end.
Figure 26:
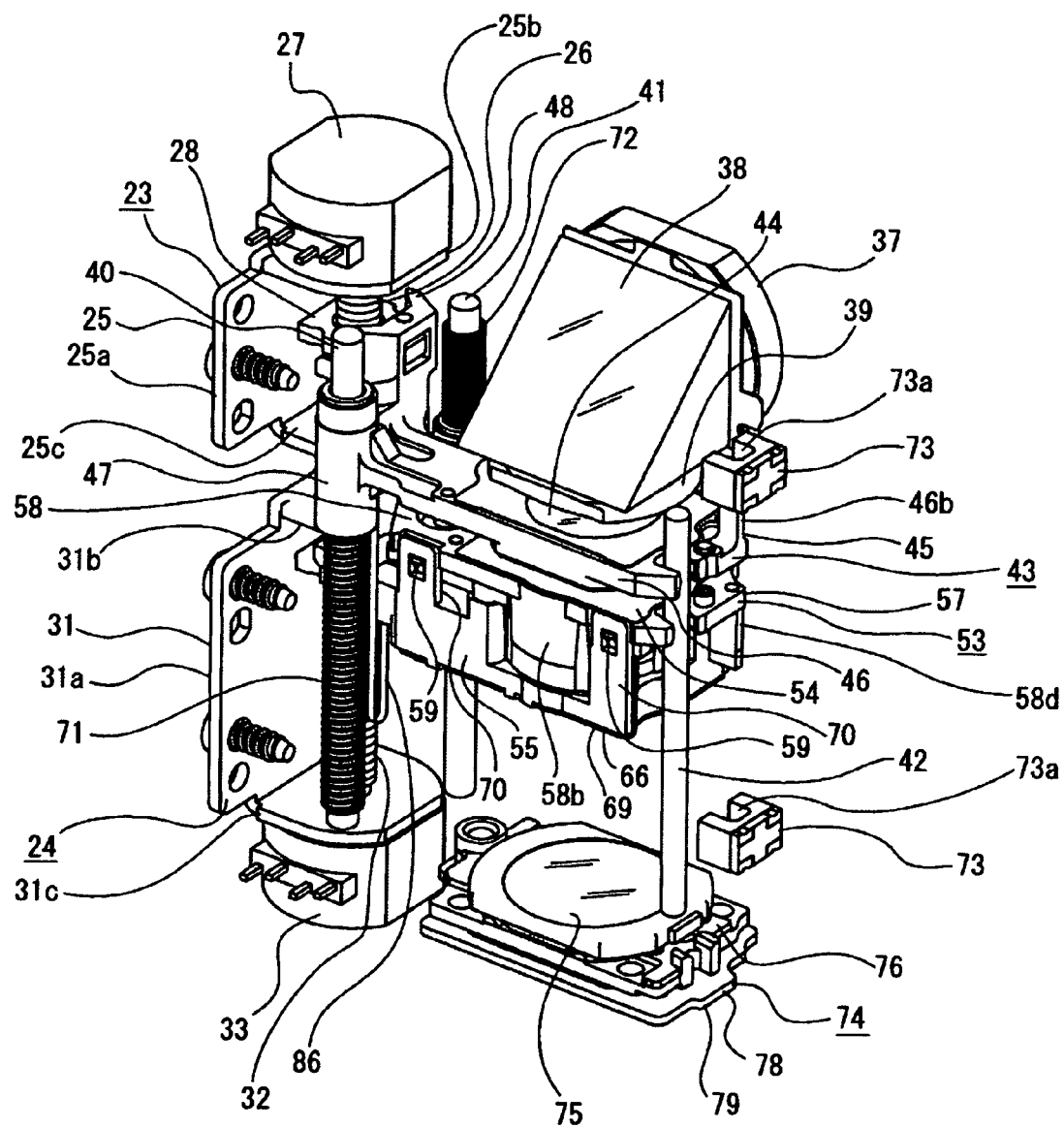
FIG. 26 is an enlarged perspective view showing the state for a telescopic end.

A second movable unit 53 is slidably supported by the second guide shaft 41 and the guiding shaft 42 (see FIGS. 14, 25, and 26). The second movable unit 53 includes a lens moving member 54 and a joining member 55 joined therewith.

Figure 27:
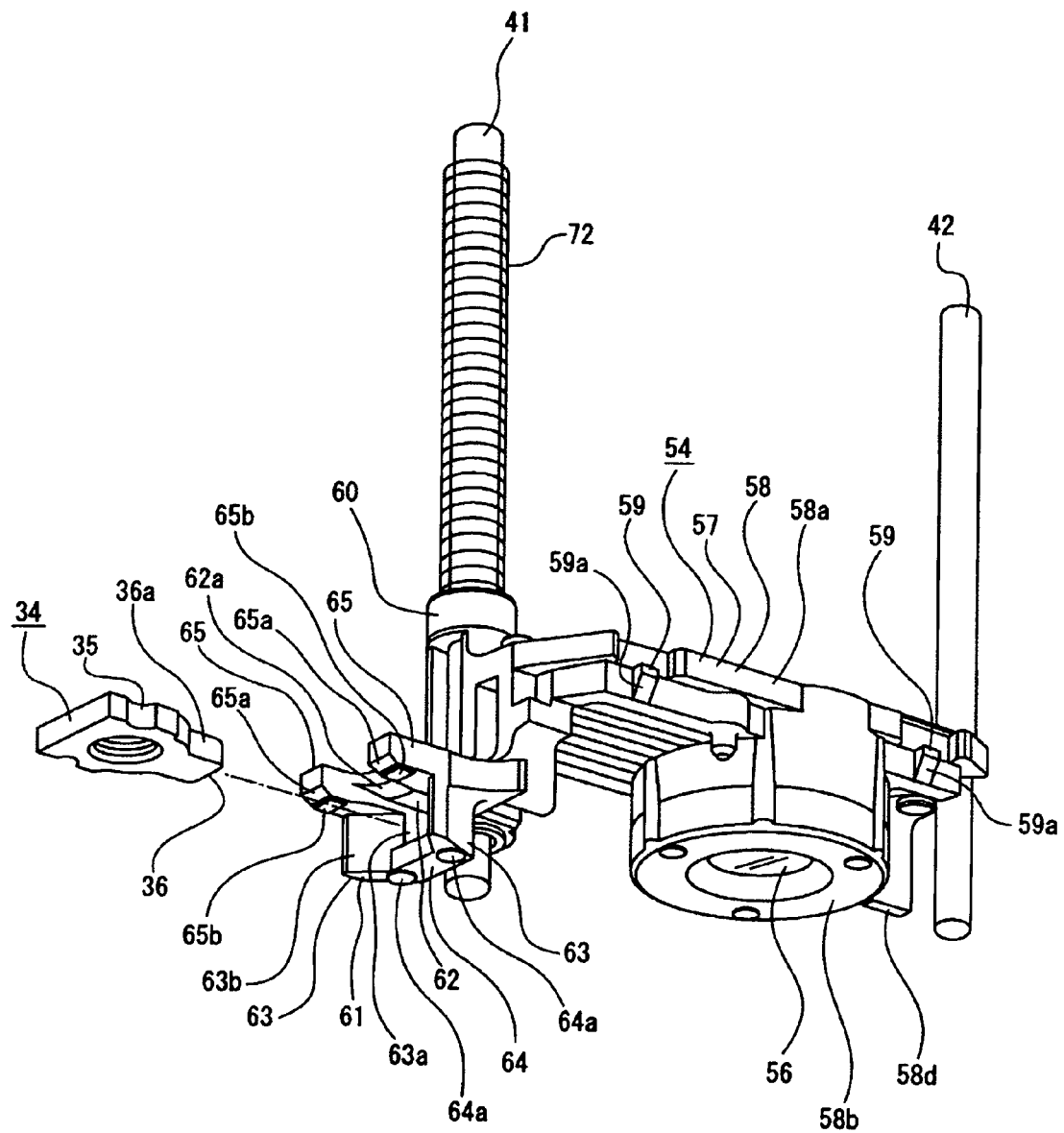
FIG. 27 is an enlarged perspective view showing a lens moving member of a second movable unit along with a second nut member, the lens moving member supported by a second guide shaft and the guiding shaft.

The lens moving member 54 includes a zoom lens 56 and a second lens holder 57 that holds the zoom lens 56 (see FIG. 27).

The second lens holder 57 is obtained by molding a resin material to integrally form a lens holding portion 58 that holds the zoom lens 56, a shaft receiver 60 provided to the left of the lens holding portion 58, and a nut holding portion 61 provided to the left of the lens holding portion 58.

The lens holding portion 58 is formed of a substantially flat plate-shaped holding plane portion 58a and a holding tubular portion 58b protruding downward from part of the holding plane portion 58a. A shaft receiving groove 58c that is open rightward is formed by cutting the right end of the holding plane portion 58a. A detection protrusion 58d protruding downward is provided at the right end of the lens holding portion 58.

Engaging portion 59, 59, . . . protruding outward are provided on the front and rear sides of the holding plane portion 58a of the lens holding portion 58. The engaging portion 59, 59, . . . , the amount of outward protrusion of which increasing in upper positions, have inclined surfaces 59a, 59a, . . . having larger outward displacement in upper positions. The upper surfaces of the engaging portion 59, 59, . . . are formed as locking surfaces 59b, 59b, . . . .

The shaft receiver 60 has a substantially tubular shape elongated in the up-down direction.

The nut holding portion 61 includes a base portion 62 facing upward and downward, standing walls 63, 63 protruding downward from the front and rear ends of the base portion 62, a connecting portion 64 that connects the lower surface of one of the standing walls 63 to the lower surface of the other standing wall 63, and protrusions 65, 65 protruding leftward from the front and rear ends of the base portion 62.

The base portion 62 becomes wider in the front-rear direction in positions closer to the left end. In the base portion 62, the lower surface of the left end portion in the central part in the front-rear direction is a first guiding surface 62a inclined upward in the leftward direction.

Facing surfaces in the right half of the standing walls 63, 63 are formed as restricting surfaces 63a, 63a parallel to each other. The standing walls 63, 63 have second guiding surfaces 63b, 63b connected to the left edges of the restricting surfaces 63a, 63a and inclined in directions the distance between the second guiding surfaces 63b, 63b increases.

Stopper protrusions 64a, 64a spaced apart from each other in the front-rear direction are provided on the lower surface of the connecting portion 64.

The lower surfaces of the left end portions of the protrusions 65, 65 are third guiding surfaces 64a, 64a inclined upward in the leftward direction. Receiving surfaces 65b, 65b slightly protruding downward are provided immediately to the right of the third guiding surfaces 65a, 65a of the protrusions 65, 65.

The shaft receiver 60 is supported by the second guide shaft 41, and the shaft receiving groove 58c formed in the lens holding portion 58 is supported by the guiding shaft 42, whereby the second lens holder 57 can be moved in the up-down direction.

Figure 28:
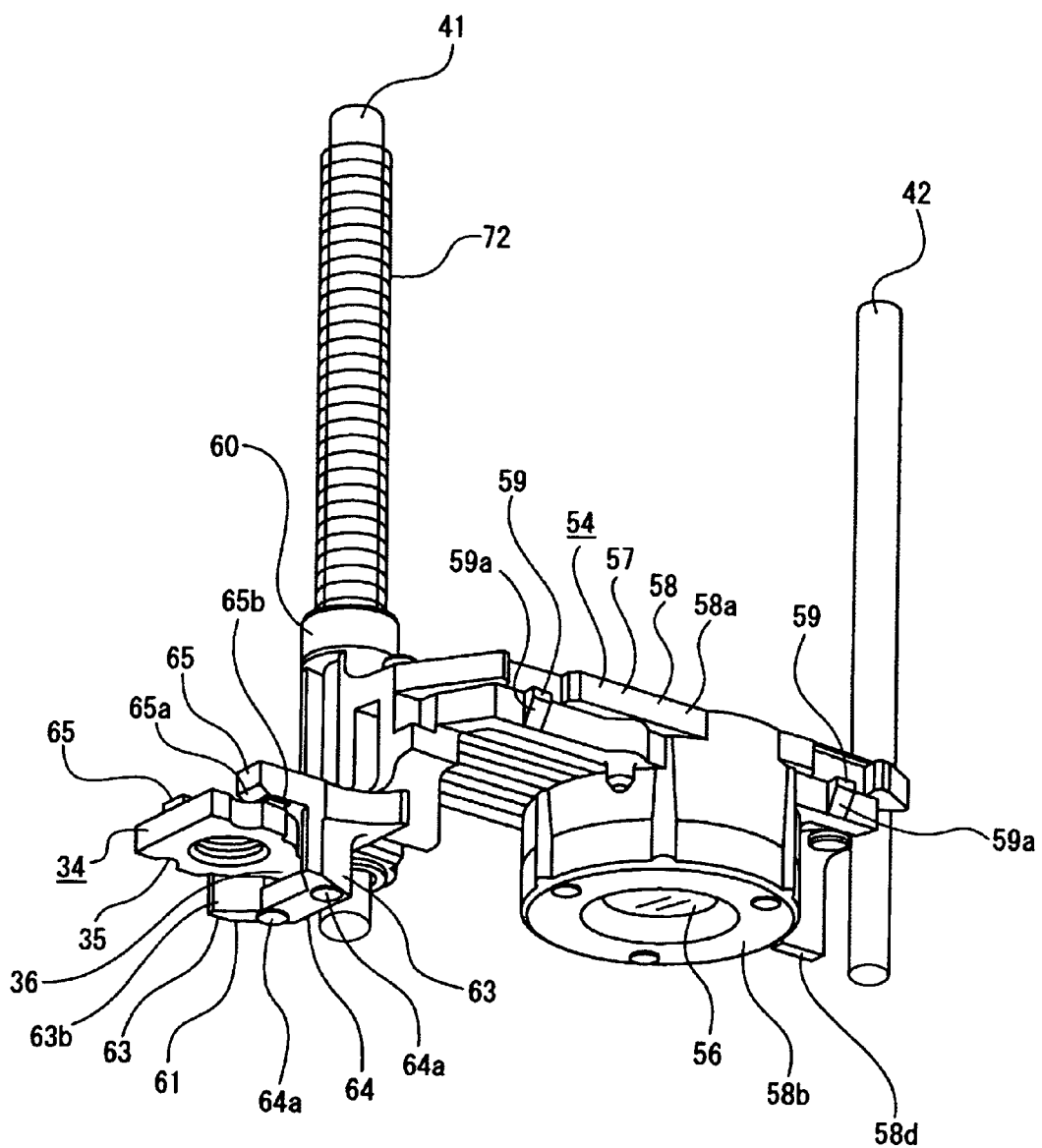
FIG. 28 is an enlarged perspective view showing the lens moving member of the second movable unit along with the second nut member joined therewith, the lens moving member supported by the second guide shaft and the guiding shaft.

The second nut member 34 is inserted into the nut holding portion 61 and held therein (see FIGS. 27 and 28). The restricted portion 36 of the second nut member 34 is inserted from left between the standing walls 63, 63. The second nut member 34 is thus held by the nut holding portion 61.

To hold the second nut member 34 by the nut holding portion 61, the restricted portion 36 and the supported portion 35 are first guided in the up-down direction by the first guiding surface 62a of the base portion 62 and the third guiding surfaces 65a, 65a of the protrusions 65, 65, respectively, and then the restricted portion 36 is guided in the front-rear direction by the second guiding surfaces 63b, 63b of the standing walls 63, 63. The restricted portion 36 is thus inserted between the standing walls 63, 63.

Since the second nut member 34 is guided by the first guiding surface 62a, the second guiding surfaces 63b, 63b, and the third guiding surfaces 65a, 65a to insert the restricted portion 36 between the standing walls 63, 63 as described above, the restricted portion 36 can be reliably and readily inserted between the standing walls 63, 63.

The joining member 55 is, for example, a shutter or diaphragm device that controls the amount of light.

The joining member 55 includes a support case 66, wing members 67, 67, 67 openably and closably supported by the lower surface of the support case 66, and a sheet member 68 that presses the wing members 67, 67, 67 from below, as shown in FIG. 14. The sheet member 68 has a diaphragm opening 68a having a predetermined size. Therefore, the sheet member 68 serves as a diaphragm member that controls the amount of light passing through the opening formed by the wing members 67, 67, 67 when the wing members 67, 67, 67 are fully open.

The support case 66 includes a lower wall 69 facing upward and downward and joining portions 70, 70, . . . protruding upward from the periphery of the lower wall 69, as shown in FIGS. 25 and 26. Each of the joining portions 70, 70, . . . is formed into a substantially rectangular plate, and has a locking hole 70a at a position close to the upper edge. The joining portions 70, 70, . . . are elastically deformable.

A description will be made of how to join the joining member 55 with the lens moving member 54.

First, the lens moving member 54 and the joining member 55 spaced apart in the up-down direction are brought closer to each other. When the joining member 55 is brought closer to the lens moving member 54, the upper edges of the joining portions 70, 70, . . . of the joining member 55 come into contact with the engaging portions 59, 59, . . . .

When the joining member 55 is further brought closer to the lens moving member 54, the joining portions 70, 70, . . . slide over the inclined surfaces 59a, 59a . . . of the engaging portions 59, 59, . . . , respectively. In this process, the joining portions 70, 70, . . . are elastically deformed outward.

When the joining member 55 is further brought closer to the lens moving member 54, the upper opening edges of the locking holes 70a, 70a . . . in the joining portions 70, 70, . . . are positioned to face the upper edges of the engaging portions 59, 59, . . . , respectively. The joining portions 70, 70, . . . elastically return to their initial shapes, and the engaging portions 59, 59, . . . are inserted in the locking holes 70a, 70a, . . . , respectively.

When the joining portions 70, 70, . . . elastically return to their initial shapes, and the engaging portions 59, 59, . . . are inserted in the locking holes 70a, 70a, . . . , respectively, the upper opening edges of the locking holes 70a, 70a . . . are locked on the locking surfaces 59b, 59b, . . . of the engaging portions 59, 59, . . . . The joining member 55 is thus joined with the lens moving member 54.

Figure 29:
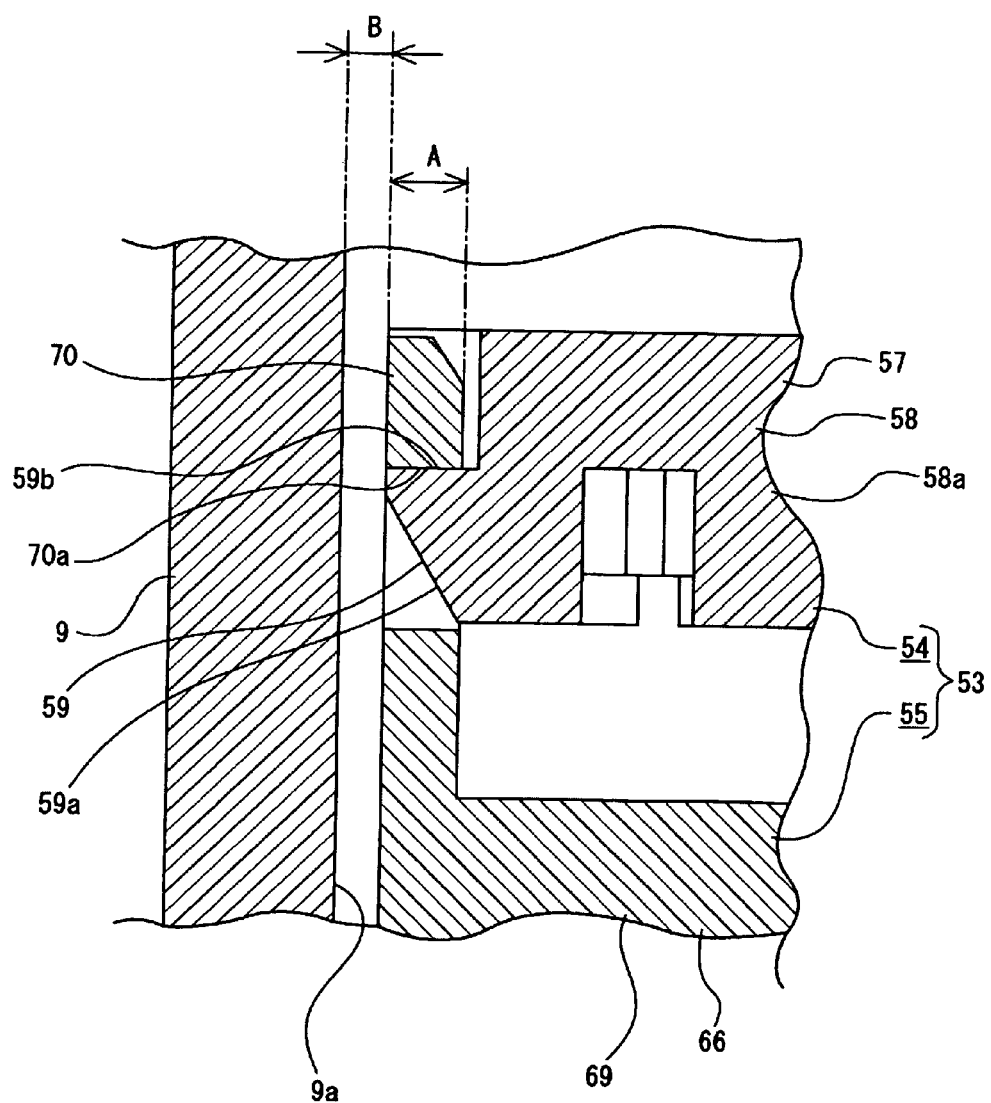
FIG. 29, along with FIG. 30, shows the positional relationship between the outer enclosure and the second movable unit, and is an enlarged cross-sectional view showing a state in which no impact force is applied to the second movable unit.

As described above, in the state in which the joining member 55 is joined with the lens moving member 54 to form the second movable unit 53, the amount of joint between the joining portion 70 and the engaging portion 59 is the amount of joint A in the thickness direction, as shown in FIG. 29.

The second movable unit 53 is movably supported in the up-down direction by the second guide shaft 41 and the guiding shaft 42 in the outer enclosure 9, and moved along the inner surface 9a of the outer enclosure 9 in the up-down direction. The distance between the inner surface 9a of the outer enclosure 9 and the engaging portions 59, 59, . . . or the joining portions 70, 70, . . . is a distance B (see FIG. 29), which is smaller than the amount of joint A described above.

Figure 30:
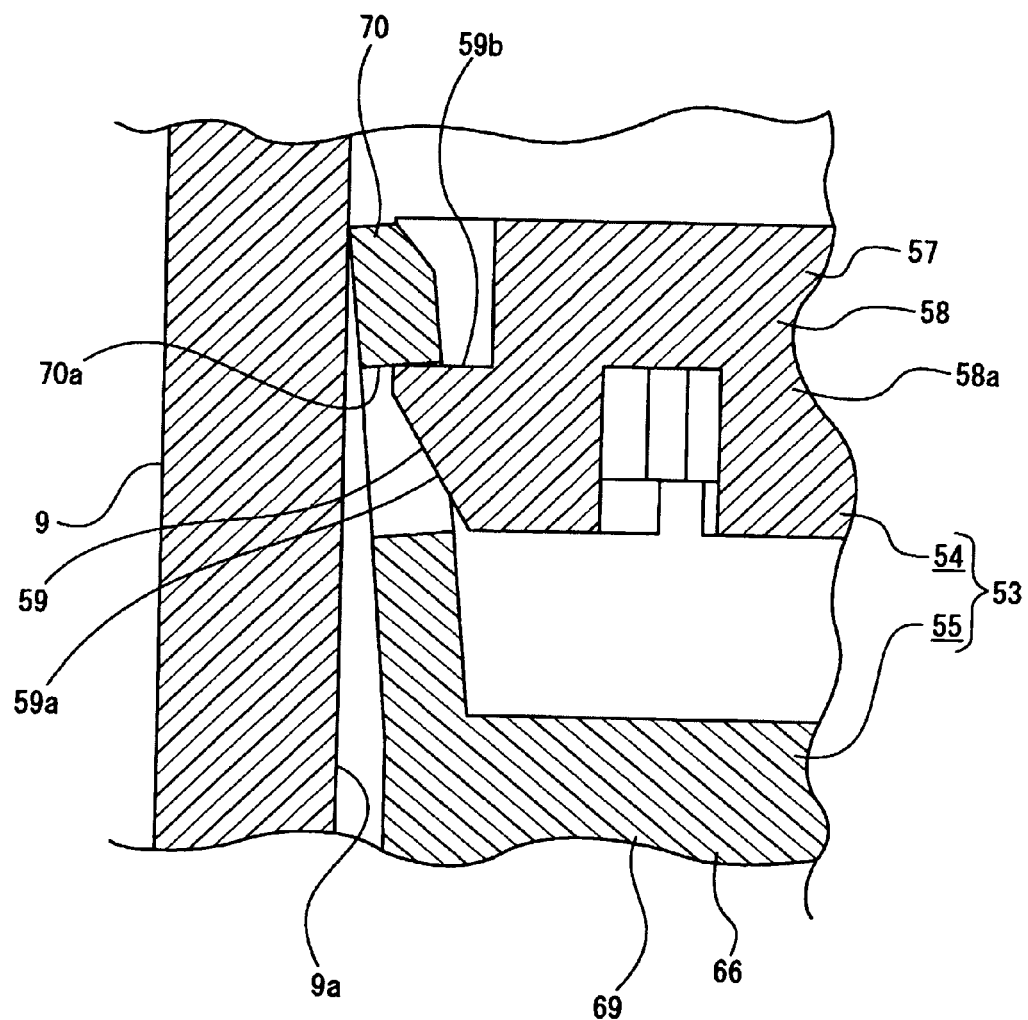
FIG. 30 is an enlarged cross-sectional view showing a state in which an impact force is applied to the second movable unit.

Therefore, when a large impact force is applied to the imaging apparatus 1, for example, when it falls, and the joining portions 70, 70, . . . are elastically deformed in the direction in which they disengage from the engaging portions 59, 59, . . . the deformation of the joining portions 70, 70, . . . is restricted by the inner surface 9a of the outer enclosure 9, as shown in FIG. 30, which prevents the joining portions 70, 70, . . . from disengaging from the engaging portions 59, 59, . . . .

Therefore, even when elastic deformation is used to join the joining member 55 with the lens moving member 54 so as to form the second movable unit 53, no impact will cause the joining member 55 to drop from the lens moving member 54. It is therefore possible to prevent the joining member 55, when an impact is applied, from dropping off the lens moving member 54 by using a simple, elastic deformation-based method for joining the joining member 55 with the lens moving member 54 without using a costly method, such as bonding, for joining the joining member 55 with the lens moving member 54.

Further, in the lens barrel 8, since the joining member 55 includes the wing members 67, 67, 67 that serve as a shutter or diaphragm device that controls the amount of introduced light, the shutter or diaphragm device is moved integrally with the lens moving member 54 that is moved in the optical axis direction, so that the positional relationship between the lens moving member 54 and the shutter or diaphragm device remains unchanged. The shutter or diaphragm device can thus readily control the amount of light.

Further, since the joining member 55 includes the sheet member 68 that serves as a diaphragm member, the diaphragm member can be disposed in the vicinity of the shutter or diaphragm device. It is thus possible to prevent mismatch in conversion characteristic between the inherent brightness of an image and the signal of the image (shading) resulting from the shutter or diaphragm device.

In addition, since the diaphragm member is disposed in the vicinity of the shutter device, so that the wing members 67, 67, 67 are located at a position where the diameter of the introduced image capturing light beam is small, the amount of movement of the wing members 67, 67, 67 can be small and the shutter can operate at a higher speed.

The above description has been made with reference to the case where the lens moving member 54 has the engaging portions 59, 59, . . . and the joining member 55 has the elastically deformable joining portions 70, 70, . . . . Conversely, the lens moving member may have elastically deformable joining portions and the joining member may have engaging portions to join the joining member with the lens moving member.

As described above, the first movable unit 43 is movably supported in the up-down direction by the first guide shaft 40 and the guiding shaft 42, and the second movable unit 53 is movably supported in the up-down direction by the second guide shaft 41 and the guiding shaft 42.

The first movable unit 43 and the second movable unit 53 are connected to the first nut member 28 and the second nut member 34, respectively. When the first drive motor 27 is driven to rotate the first lead screw 26, the first nut member 28 is moved in the direction according to the rotational direction of the first lead screw 26, and the first movable unit 43 is moved in the up-down direction. When the second drive motor 33 is driven to rotate the second lead screw 32, the second nut member 34 is moved in the direction according to the rotational direction of the second lead screw 32, and the second movable unit 53 is moved in the up-down direction.

The first guide shaft 40 supports an urging spring 71, which is a compression spring, and the second guide shaft 41 supports an urging spring 72, which is a compression spring (see FIGS. 25 and 26).

The urging spring 71 is compressed in such a way that one end is in contact with the lower surface of the shaft receiver 47 of the first lens holder 45 in the first movable unit 43 and the other end is in contact with the inner surface of the lower side portion of the lower half portion 11. The first movable unit 43 is thus urged upward.

Therefore, the urging force of the urging spring 71 urges the first lens holder 45 upward, and the receiving surfaces 52b, 52b provided on the protrusions 52, 52 of the nut holding portion 48 are pressed against the supported portion 29 of the first nut member 28 from below.

The urging spring 72 is compressed in such a way that one end is in contact with the upper surface of the shaft receiver 60 of the second lens holder 57 in the second movable unit 53 and the other end is in contact with the inner surface of the upper side portion of the upper half portion 10. The second movable unit 53 is thus urged downward.

Therefore, the urging force of the urging spring 72 urges the second lens holder 57 downward, and the receiving surfaces 65*b*, 65*b* provided on the protrusions 65, 65 of the nut holding portion 61 are pressed against the supported portion 35 of the second nut member 34 from above.

As described above, since the receiving surfaces 52*b*, 52*b* of the first lens holder 45 urged by the urging force of the urging spring 71 are pressed against the first nut member 28, and the receiving surfaces 65*b*, 65*b* of the second lens holder 57 urged by the urging force of the urging spring 72 are pressed against the second nut member 34, there will be no axial (up-down direction) backlash between the supported portion 29 of the first nut member 28 and the first lead screw 26 or no axial (up-down direction) backlash between the supported portion 35 of the second nut member 34 and the second lead screw 32.

Further, as described above, the first nut member 28 and the second nut member 34 are held by the nut holding portion 48 of the first lens holder 45 and the nut holding portion 61 of the second lens holder 57, respectively. As will be described below, there will be no backlash in the direction perpendicular to the axial direction between the supported portion 29 of the first nut member 28 and the first lead screw 26 or no backlash in the direction perpendicular to the axial direction between the supported portion 35 of the second nut member 34 and the second lead screw 32.

Preventing backlash for the first nut member 28 is carried out in the same manner as for the second nut member 34. Therefore, a description will be only made of how to prevent backlash for the first nut member 28 by way of example, and no description will be made of how to prevent backlash for the second nut member 34.

Figure 31:
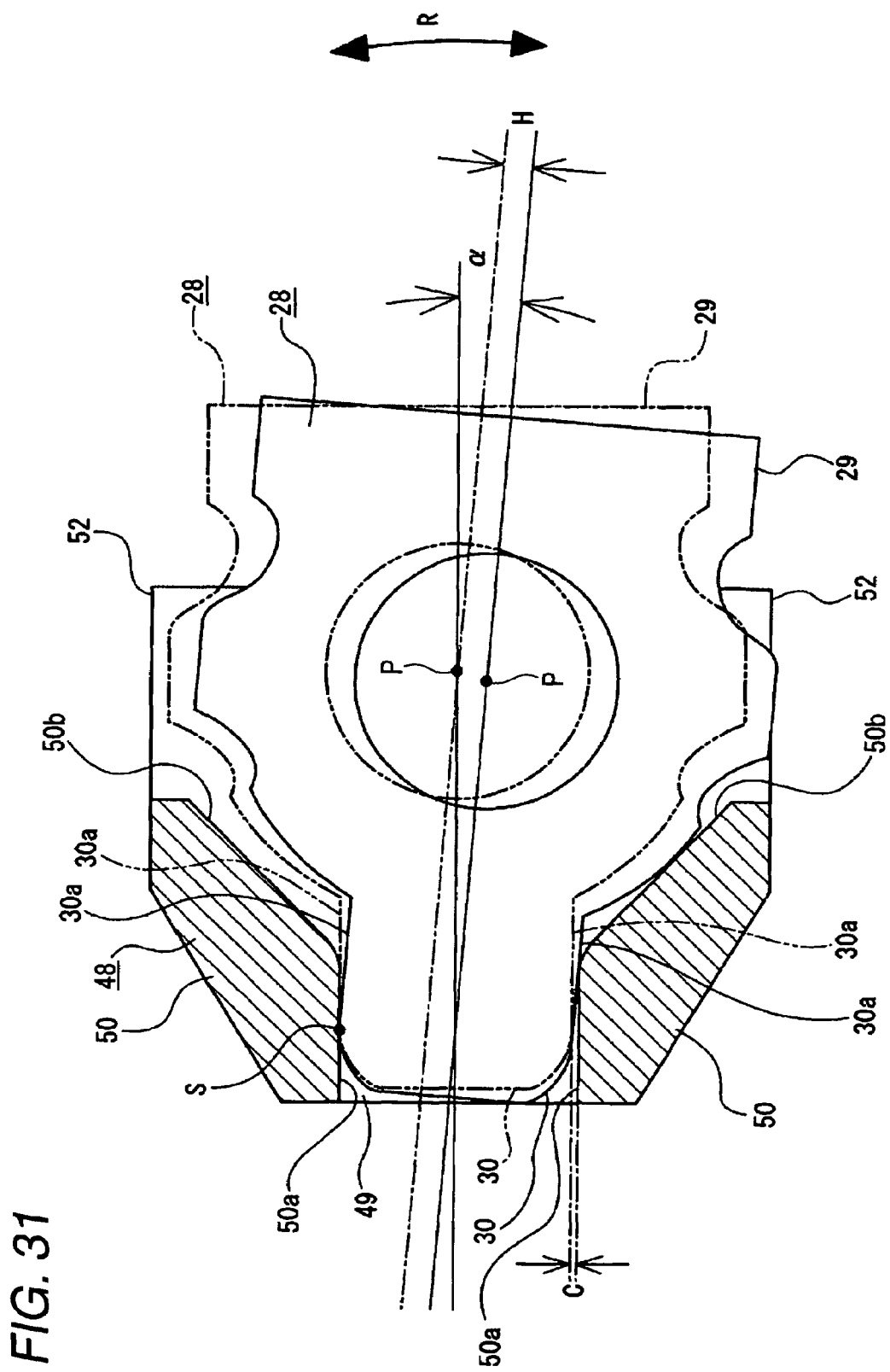
FIG. 31 is an enlarged plan view showing a state in which the nut member is held in the nut holding portion, part of which being cross-sectioned.

As shown in FIG. 31, the restricted portion 30 of the first nut member 28 is inserted between the standing walls 50, 50 of the nut holding portion 48, and the restricted surfaces 30*a*, 30*a* of the first nut member 28 come into contact with the restricting surfaces 50*a*, 50*a*, respectively, whereby the first nut member 28 is restricted from rotating in the direction R. A slight clearance C (the clearance C is exaggerated in FIG. 31) is present between the restricted surfaces 30*a*, 30*a* and the restricting surfaces 50*a*, 50*a* to tolerate machining error of the first nut member 28 and the standing walls 50, 50 and ensure smooth insertability of the first nut member 28 between the standing walls 50, 50. Therefore, the clearance C may cause the first nut member 28 to slightly rotate with reference to the contact point S where the restricted surface 30*a* come into contact with the restricting surface 50*a* in the direction R, that is, the direction substantially perpendicular to the axial direction of the first lead screw 26. In FIG. 31, the solid line indicates the state in which the first nut member 28 has been rotated in the direction R, and the broken line indicates the state in which the first nut member 28 is yet to rotate in the direction R.

When the first nut member 28 rotates in the direction R, the first nut member 28 is inclined by an angle α with reference to the contact point S in the direction substantially perpendicular to the axial direction of the first lead screw 26. The inclination does not occur with reference to the supported portion 29 that threadably engages the first lead screw 26 but occurs with reference to the contact point S on the restricted portion 30 radially protruding from the supported portion 29. Therefore, the inclination occurs with reference to the restricted portion 30 located far away from the supported portion 29 that threadably engages the first lead screw 26, and hence the amount of displacement H of the center P of the supported portion 29 is significantly small when the supported portion 29 is inclined by an angle α.

As described above, the first nut member 28 has the restricted portion 30 radially protruding from the supported portion 29 that threadably engages the first lead screw 26, and the restricted surfaces 30*a*, 30*a* of the restricted portion 30 radially protruding from the supported portion 29 are in contact with the restricting surfaces 50*a*, 50*a* of the standing walls 50, 50, so that the first nut member 28 is restricted from rotating in the direction R. The first nut member 28 is therefore displaced with respect to the first lead screw 26 only by a very small amount. It is thus possible to prevent backlash between the supported portion 29 of the first nut member 28 and the first lead screw 26 in the direction perpendicular to the axial direction of the first lead screw 26.

As described above, since the second nut member 34 has the same configuration as that of the first nut member 28, no backlash will occur, in the second nut member 34 as well, between the supported portion 35 and the second lead screw 32 in the direction perpendicular to the axial direction of the second lead screw 32.

Position detection sensors 73, 73 are disposed in the outer enclosure 9 and spaced apart from each other in the up-down direction (see FIGS. 25 and 26). An example of the position detection sensor 73 is a photo-interrupter. Each of the position detection sensors 73, 73 has a slit 73*a*.

When the first movable unit 43 or the second movable unit 53 moves and the detection protrusion 46*b* provided on the first lens holder 45 in the first movable unit 43 or the detection protrusion 58*d* provided on the second lens holder 57 in the second movable unit 53 passes through the corresponding slit 73*a*, the corresponding position detection sensor 73 detects the position of the first movable unit 43 or the second movable unit 53.

In the lens barrel 8, the first drive motor 27 and the second drive motor 33 are driven and controlled at the ends of movement of the first movable unit 43 and the second movable unit 53 in the following manner based on the result of the detection operation in which the position detection sensors 73, 73 detect the positions of the first movable unit 43 and the second movable unit 53.

Driving and controlling the first drive motor 27 is carried out in the same manner as driving and controlling the second drive motor 33. Therefore, a description will be only made of how to drive and control the second drive motor 33 by way of example (see FIGS. 32 to 34), and no description will be made of how to drive and control the first drive motor 27.

In the lens barrel 8, energizing and deenergizing the lens barrel 8 allows switching between a drive mode in which an image can be captured and a non-drive mode in which no image can be captured. The switching between the drive mode and the non-drive mode can be performed by operating the imaging key 4*f* disposed on the first housing 2 of the imaging apparatus 1.

In the non-drive mode, the first movable unit 43 is moved to the upper end of movement, and the second movable unit 53 is moved to the lower end of movement (see FIG. 14).

Figure 32:
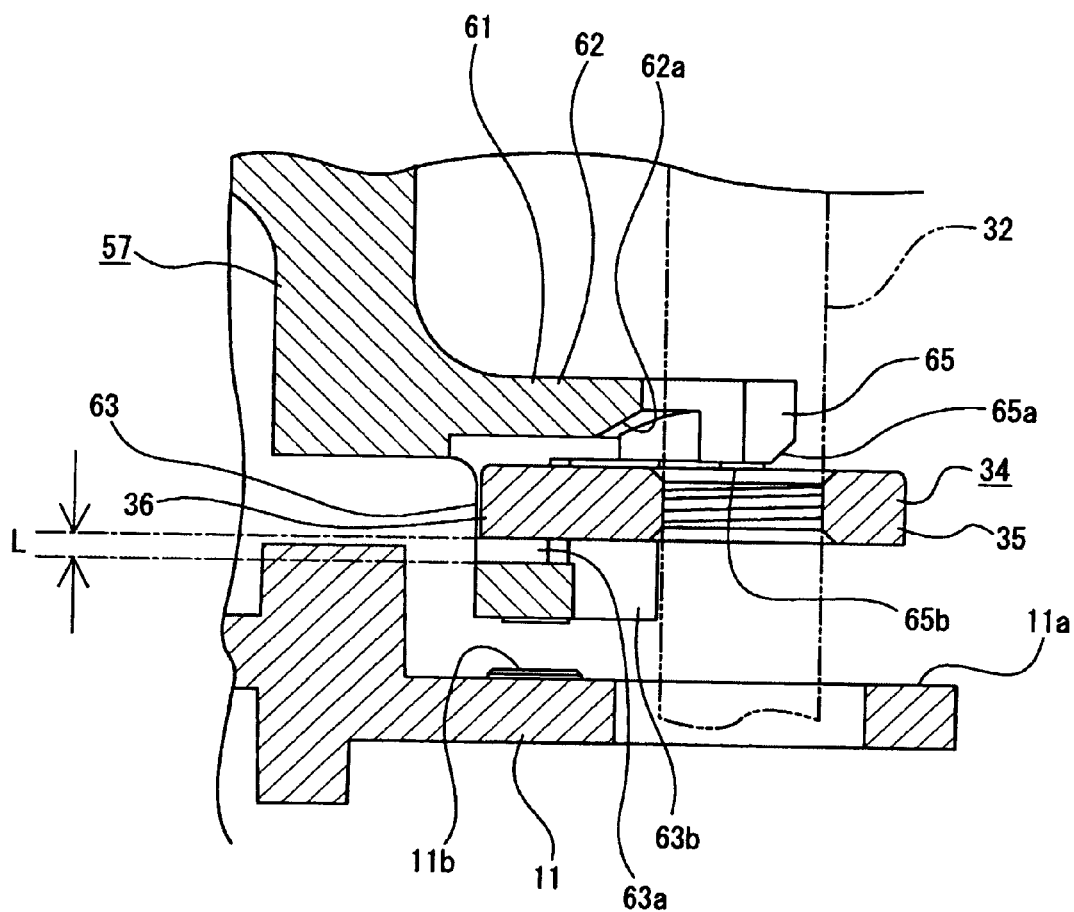
FIG. 32, along with FIGS. 33 and 34, explains how to drive and control a second drive motor at the end of movement of the second movable unit, and is an enlarged cross-sectional view showing the second movable unit in action.

Restricting portions 11*b*, 11*b* protruding upward are provided on the inner surface of the lower side portion of the lower half portion 11 of the outer enclosure 9 (see FIG. 32). Similarly, restricting portions protruding downward (not shown) are provided on the inner surface of the upper side portion of the upper half portion 10.

The second movable unit 53 stops moving at the lower end of movement when the stopper protrusions 64*a*, 64*a* provided on the connecting portion 64 of the second lens holder 57 come into contact with the restricting portions 11b, 11b (non-drive mode). The movement of the second movable unit 53 is stopped at the lower end of movement by using the position detection sensor 73 to detect the position of the second movable unit 53, and sending a stop signal to the second drive motor 33 based on the detection result to stop the rotation of the second drive motor 33.

As described above, the second movable unit 53 moves under the following conditions: The urging force of the urging spring 72 supported by the second guide shaft 41 urges the second lens holder 57 downward, so that the receiving surfaces 65b, 65b provided on the protrusions 65, 65 of the nut holding portion 61 are pressed against the supported portion 35 of the second nut member 34 from above (see FIG. 32).

In the state in which the second nut member 34 is held by the nut holding portion 61 and the receiving surfaces 65b, 65b are pressed against the supported portion 35 from above, a predetermined gap L is formed between the lower surface of the restricted portion 36 and the upper surface of the connecting portion 64 of the nut holding portion 61. The size of the gap L, for example, ranges from 0.3 to 0.4 mm.

Figure 33:
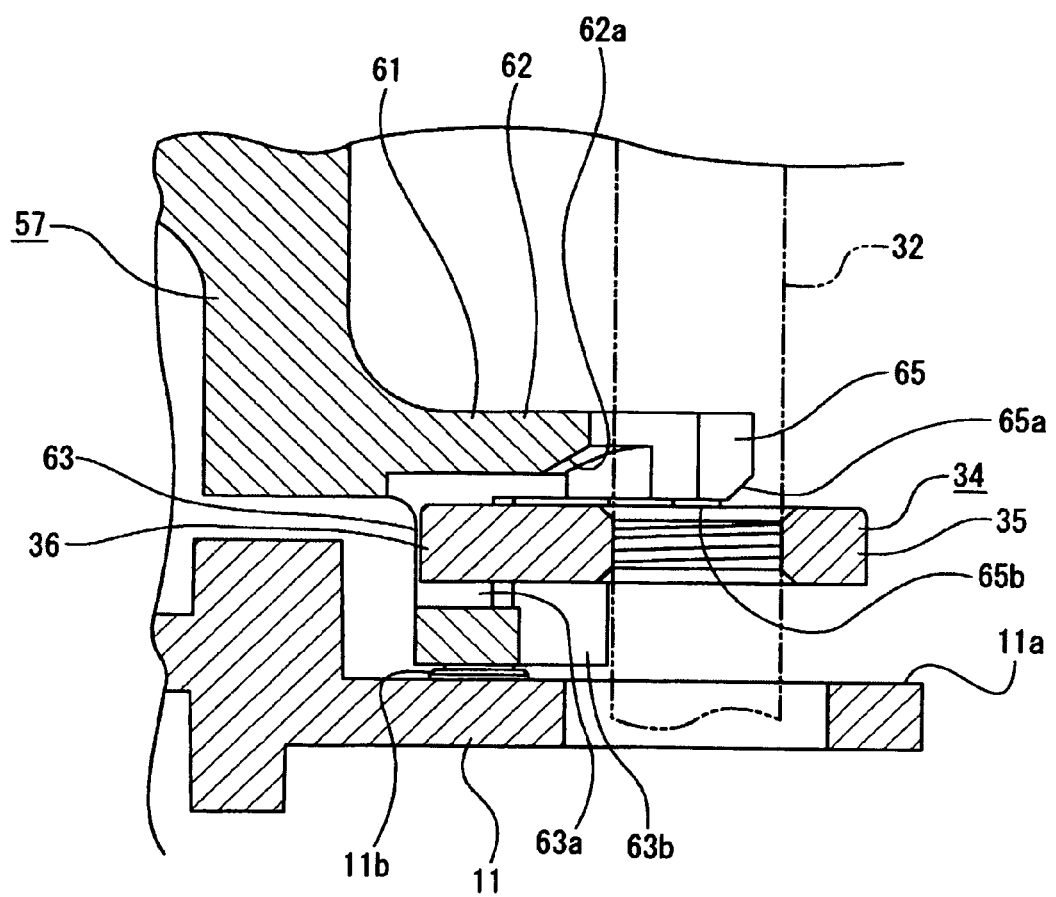
FIG. 33 is an enlarged cross-sectional view showing the second movable unit that has reached the end of movement.

When the second movable unit is moved downward and the position detection sensor 73 detects the position of the second movable unit 53, the second movable unit 53 stops moving at the lower end of movement when the stopper protrusions 64a, 64a provided on the connecting portion 64 of the second lens holder 57 come into contact with the restricting portions 11b, 11b (see FIG. 33).

A stop signal is then sent to the second drive motor 33. Specifically, the stop signal is still sent to the second drive motor 33 even after the second movable unit 53 stops at the end of movement until the second lead screw 32 rotates by a predetermined amount. Therefore, even after the stopper protrusions 64a, 64a come into contact with the restricting portions 11b, 11b and the second movable unit 53 stops at the lower end of movement, the second lead screw 32 rotates by a predetermined amount.

Figure 34:
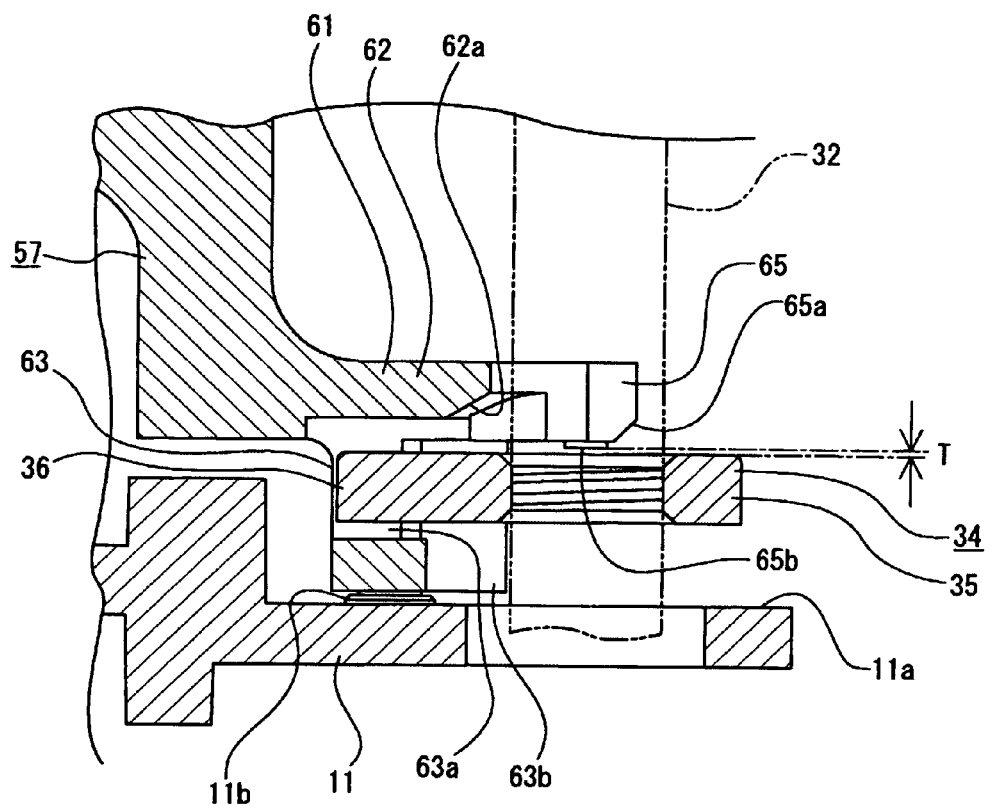
FIG. 34 is an enlarged cross-sectional view showing the second movable unit that had reached the end of movement and the second nut member that has then moved.

When the second movable unit 53 stops at the lower end of movement and then the second lead screw 32 rotates by a predetermined amount, the second movable unit 53 does not move downward anymore because it stops at the end of movement, whereas the second nut member 34 is moved downward by the rotation of the second lead screw 32 until the second lead screw 32 stops rotating and then held at the holding position in the non-drive mode (see FIG. 34).

Therefore, the second nut member 34 disengages from the receiving surfaces 65b, 65b of the nut holding portion 61, and a predetermined gap T is formed between the second nut member 34 and the receiving surfaces 65b, 65b. The size of the gap T, for example, ranges from 0.05 to 0.1 mm.

As described above, in the lens barrel 8, in the non-drive mode, the second nut member 34 disengages from the receiving surfaces 65b, 65b of the nut holding portion 61, and a predetermined gap T is formed between the second nut member 34 and the receiving surfaces 65b, 65b.

Therefore, in the non-drive mode, when a large impact force is applied to the second movable unit 53, for example, when the imaging apparatus 1 falls, the impact force is unlikely transmitted from the second lens holder 57 to the second nut member 34, and hence the impact force is unlikely applied to the second drive motor 32. It is therefore possible to prevent the second drive motor 32 from malfunctioning.

As described above, the first movable unit 43 and the first nut member 28 have a configuration similar to that of the second movable unit 53 and the second nut member 34. Therefore, when a large impact force is applied to the first movable unit 43, the impact fore is unlikely transmitted from the first lens holder 45 to the first nut member 28, and hence the impact force is unlikely applied to the first drive motor 27. It is therefore possible to prevent the first drive motor 27 from malfunctioning.

Further, since the second lead screw 32 rotates to move the second nut member 34 downward after the second movable unit 53 stops at the end of movement, the second nut member 34 reliably disengages from the receiving surfaces 65b, 65b of the nut holding portion 61.

When the lens barrel 8 is energized and the non-drive mode is set, the second nut member 34 is moved upward to the point where it comes into contact with the receiving surfaces 65b, 65b of the nut holding portion 61 (see FIG. 33), and the first nut member 28 is moved downward to the point where it comes into contact with the receiving surfaces 52b, 52b of the nut holding portion 48.

Therefore, the position where the first movable unit 43 and the second movable unit 53 start moving in the drive mode is the position where the second nut member 34 abuts the receiving surfaces 65b, 65b of the nut holding portion 61 and the first nut member 28 abuts the receiving surfaces 52b, 52b of the nut holding portion 48.

The above movement start positions of the first nut member 28 and the second nut member 34 are apart from the receiving surfaces 65b, 65b and the receiving surfaces 52b, 52b, respectively, but close to the positions where the first nut member 28 and the second nut member 34 are held in the non-drive mode. Therefore, when the non-drive mode is switched to the drive mode, the first nut member 28 and the second nut member 34 are moved by a small distance from the positions where they are held to the positions where they start moving.

Therefore, since the amounts of movement of the first movable unit 43 and the second movable unit 53 are small when the non-drive mode is switched to the drive mode, it is possible to reduce the time necessary to start operation when the non-drive mode is switched to the drive mode.

Figure 35:
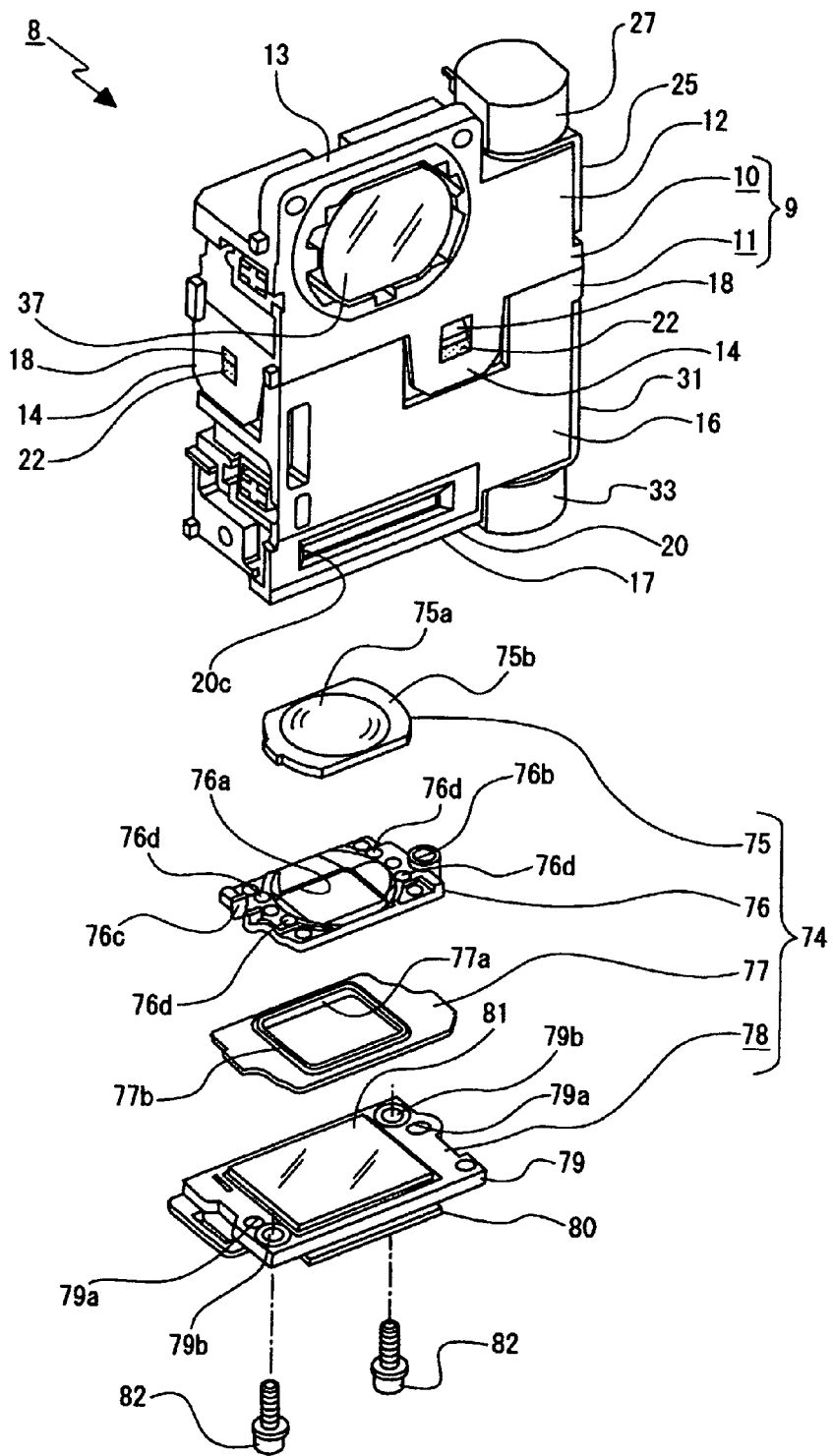
FIG. 35 is a perspective view showing the lens barrel with an imaging unit disassembled.
Figure 36:
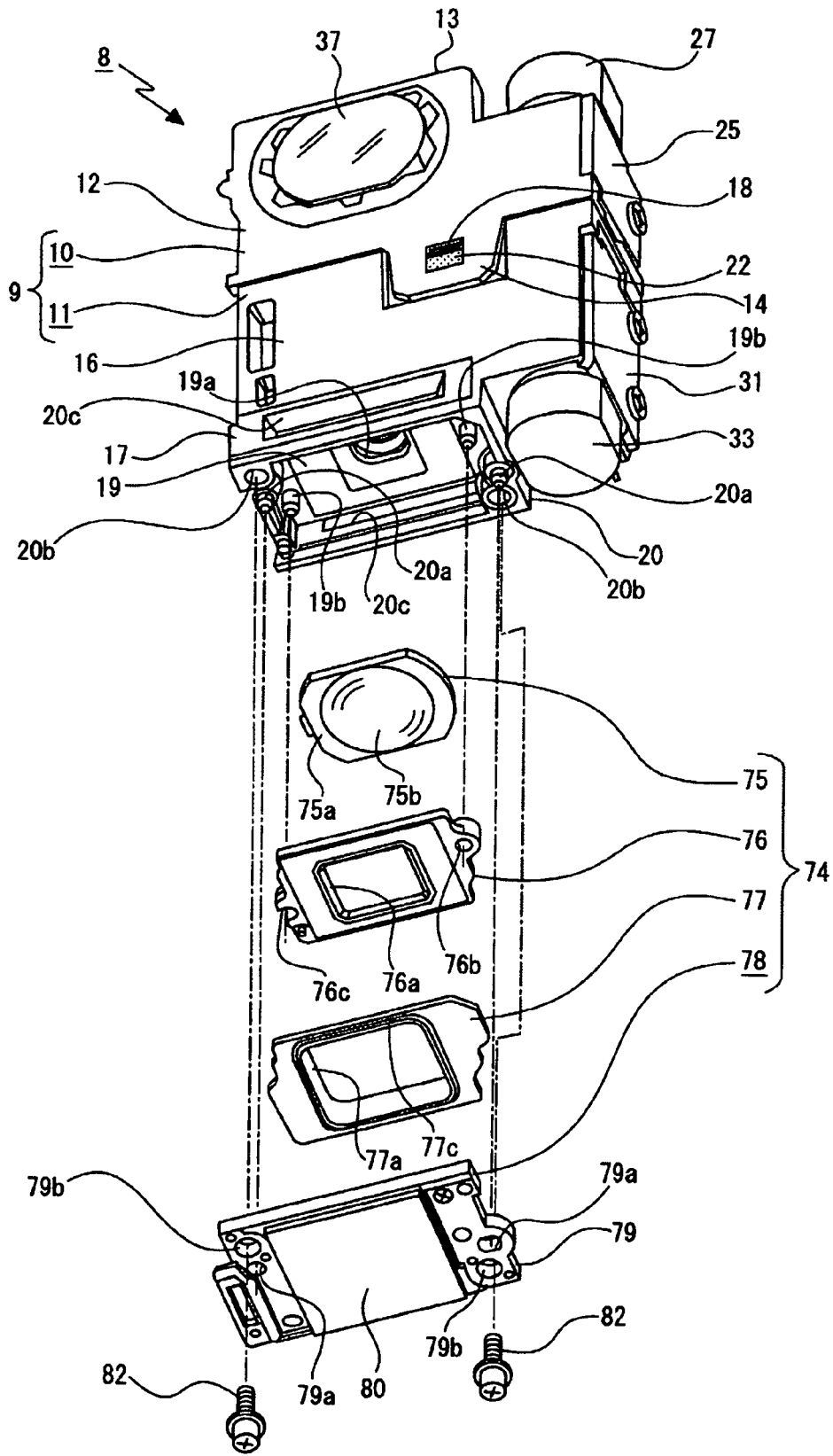
FIG. 36 is a perspective view showing the lens barrel with the imaging unit disassembled and viewed from a direction different from the viewing direction in FIG. 35.

An imaging unit 74 is disposed in the unit assembling portion 17 of the lower half portion 11 of the outer enclosure 9 (see FIG. 14). The imaging unit 74 includes a centering lens 75, a pressing plate 76, a packing 77, and an imaging module 78 disposed in this order from above, as shown in FIGS. 35 and 36.

The centering lens 75 is provided as a second fixed lens and formed of a lens portion 75a and a flat-plate-shaped flange portion 75b disposed at the periphery of the lens portion 75a. The centering lens 75 is disposed at the bottom portion 19 of the unit assembling portion 17.

The pressing plate 76 has a light transmission hole 76a formed in the portion other than the periphery. A positioning hole 76b and a positioning groove 76c, spaced apart from each other in the right-left direction, are formed at the periphery of the pressing plate 76. A plurality of pressing protrusions 76d, 76d . . . that press the flange portion 75b of the centering lens 75 from below are provided on the upper surface of the pressing plate 76.

The packing 77 is made of, for example, a rubber material and has a transmission hole 77a formed in the portion other than the periphery. Annular upper and lower pushing portions 77b and 77c protruding upward and downward respectively are provided at the opening edges of the transmission hole 77a in the packing 77.

The imaging module 78 includes a base plate 79, an imaging device 80 assembled to the base plate 79, and a glass plate 81 that covers the imaging device 80 from above.

Holes to be held 79a, 79a, spaced apart from each other in the right-left direction, are formed at the periphery of the base plate 79. Screw insertion holes 79b, 79b, spaced apart from each other in the right-left direction, are formed at the periphery of the base plate 79. The base plate 79 has a transmission hole 79c for transmitting image capturing light formed in the portion other than the periphery.

The imaging device 80 is attached onto the lower side of the base plate 79 and blocks the transmission hole 79c.

The glass plate 81 is a member that protects the imaging device 80 and prevents dust from being deposited on the imaging device 80. The glass plate 81 is attached onto the upper side of the base plate 79 and blocks the transmission hole 79c. Therefore, the upper surface of the glass plate 81 is located at a level higher than the upper surface of the base plate 79.

Figure 37:
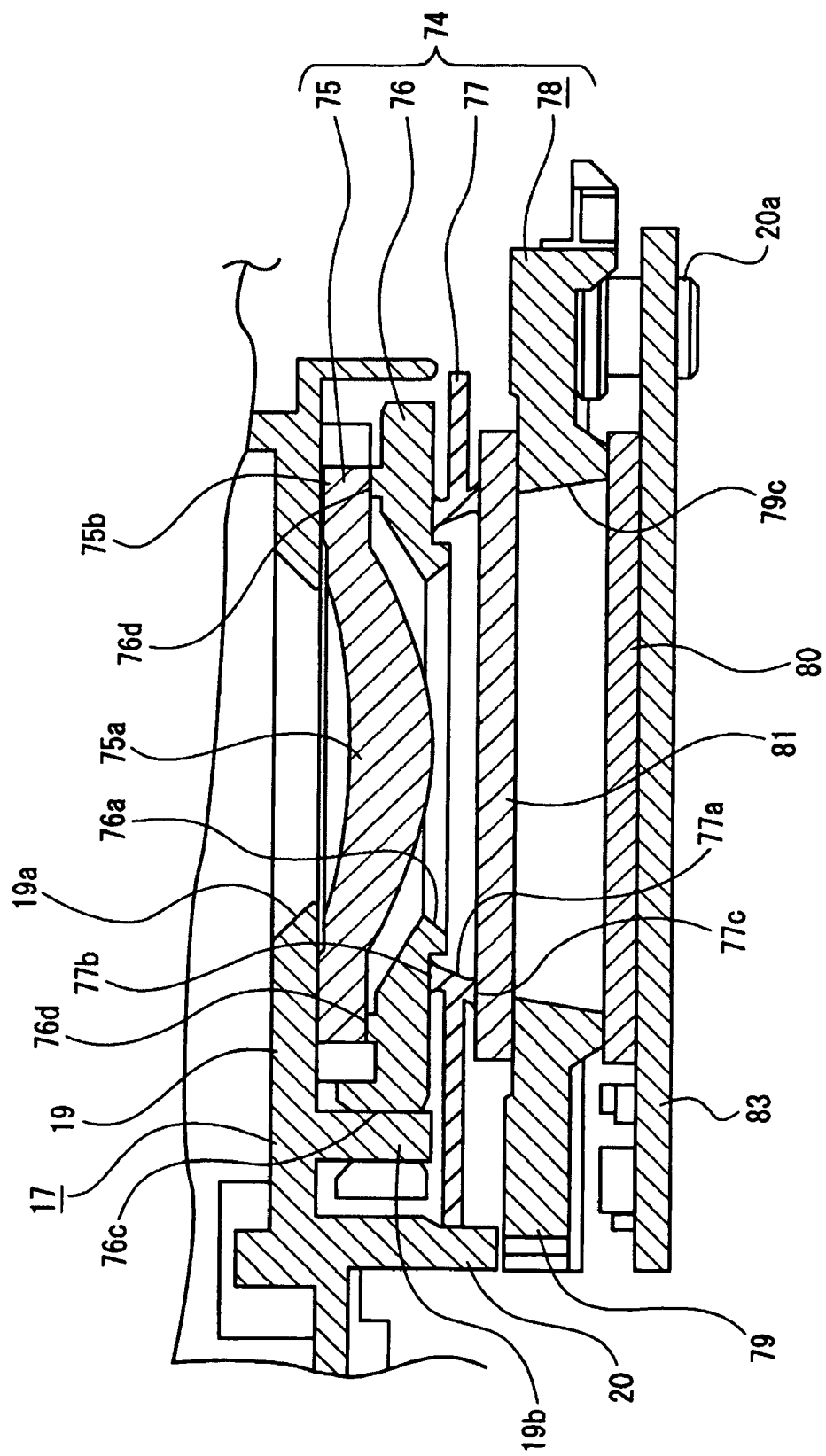
FIG. 37 is an enlarged cross-sectional view showing a state in which the imaging unit is disposed in the unit assembling portion in the lower half portion.

As shown in FIG. 37, the imaging unit 74 is attached to the unit assembling portion 17 in the following manner: The centering lens 75 is disposed at the bottom portion 19. The attachment pins 19b, 19b protruding from the bottom portion 19 are inserted into the positioning hole 76b and the positioning groove 76c in the pressing plate 76, so that the pressing plate 76 is disposed under the centering lens 75. The holding pins 20a, 20a provided at the peripheral side portion 20 of the unit assembling portion 17 are inserted into the holes to be held 79a, 79a in the imaging module 78, so that the imaging module 78 is disposed under the packing 77. The packing 77 is disposed under the pressing plate 76. Attachment screws 82, 82 inserted into the screw insertion holes 79b, 79b in the imaging module 78 (see FIGS. 35 and 36) engage threaded holes 20b, 20b formed in the peripheral side portion 20.

With the imaging unit 74 disposed in the unit assembling portion 17, as shown in FIG. 37, the flange portion 75b of the centering lens 75 is pressed by the pressing protrusions 76d, 76d, . . . of the pressing plate 76 from below. The upper pushing portion 77b of the packing 77 is pressed against the lower surface of the pressing plate 76 from below and elastically deformed. The glass plate 81 in the imaging module 78 is pressed against the lower pushing portion 77c of the packing 77 from below, so that the lower pushing portion 77c is elastically deformed. In this state, the centering lens 75 is pressed against the bottom portion 19 of the unit assembling portion 17 by the glass plate 81 in the imaging module 78 from below via the pressing plate 76 and the packing 77, and the centering lens 75 pressed from below can move in an arbitrary direction in a plane perpendicular to the optical axis.

A circuit substrate 83 is attached to the imaging module 78 from below.

With the imaging unit 74 disposed in the unit assembling portion 17 as described above, the centering lens 75 is centered. The centering operation is carried out to balance the change in spatial frequency of the entire optical system (MTF) across the range from a wide-angle end to a telescopic end, the spatial frequency varying in accordance with the position of the second movable unit 53 when it moves between the wide-angle end and the telescopic end.

Figure 38:
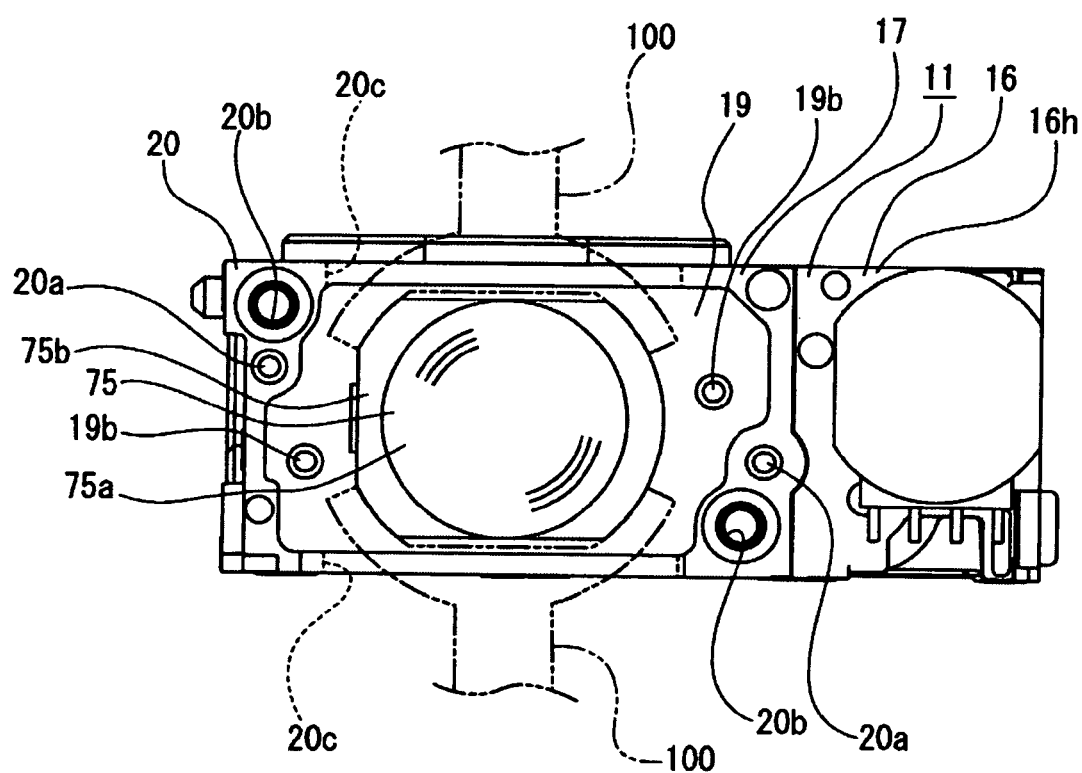
FIG. 38 is an enlarged bottom view showing a centering lens being centered with respect to the optical axis.

The centering operation is carried out, as shown in FIG. 38, by inserting adjustment jigs 100, 100 that hold the centering lens 75 through the working holes 20c, 20c formed in the peripheral side portion 20 so as to hold the centering lens 75, and moving the adjustment jigs 100, 100 while detecting the spatial frequency of the entire optical system during the movement of the second movable unit 53 between the wide-angle end and the telescopic end. The position of the centering lens 75 is thus adjusted. The centering operation is carried out as described above with the centering lens 75 pressed against the bottom portion 19 of the unit assembling portion 17 by the glass plate 81 in the imaging module 78 via the pressing plate 76 and the packing 77.

When the positional adjustment of the centering lens 75 is completed, that is, the centering operation is completed, an adhesive is applied to the periphery of the flange portion 75b of the centering lens 75 to secure the centering lens 75 to the bottom portion 19 of the unit assembling portion 17. After the adhesive has been applied, sealing members 84, 84 that block the working holes 20c, 20c are glued onto the outer surface of the lower half portion 11 in order to prevent dust from entering the working holes 20c, 20c in the unit assembling portion 17 (see FIG. 5).

As described above, securing the centering lens 75 to the unit assembling portion 17 after the position of the centering lens 75 has been adjusted can prevent the position of the centering lens 75 from shifting and ensure excellent optical characteristics of the centering lens 75 even when an impact force is applied to the centering lens 75 and the unit assembling portion 17, for example, when the imaging apparatus 1 falls.

Securing the centering lens 75 to the unit assembling portion 17 can also prevent the position of the centering lens 75 from shifting and ensure excellent optical characteristics of the centering lens 75 even when the packing 77 is degraded, for example, due to aging.

Further, since the working holes 20c, 20c in the unit assembling portion 17 can also be used as working holes through which the adhesive applying nozzles are inserted, it is not necessary to form dedicated holes for inserting the adhesive applying nozzles into the unit assembling portion 17.

Figure 39:
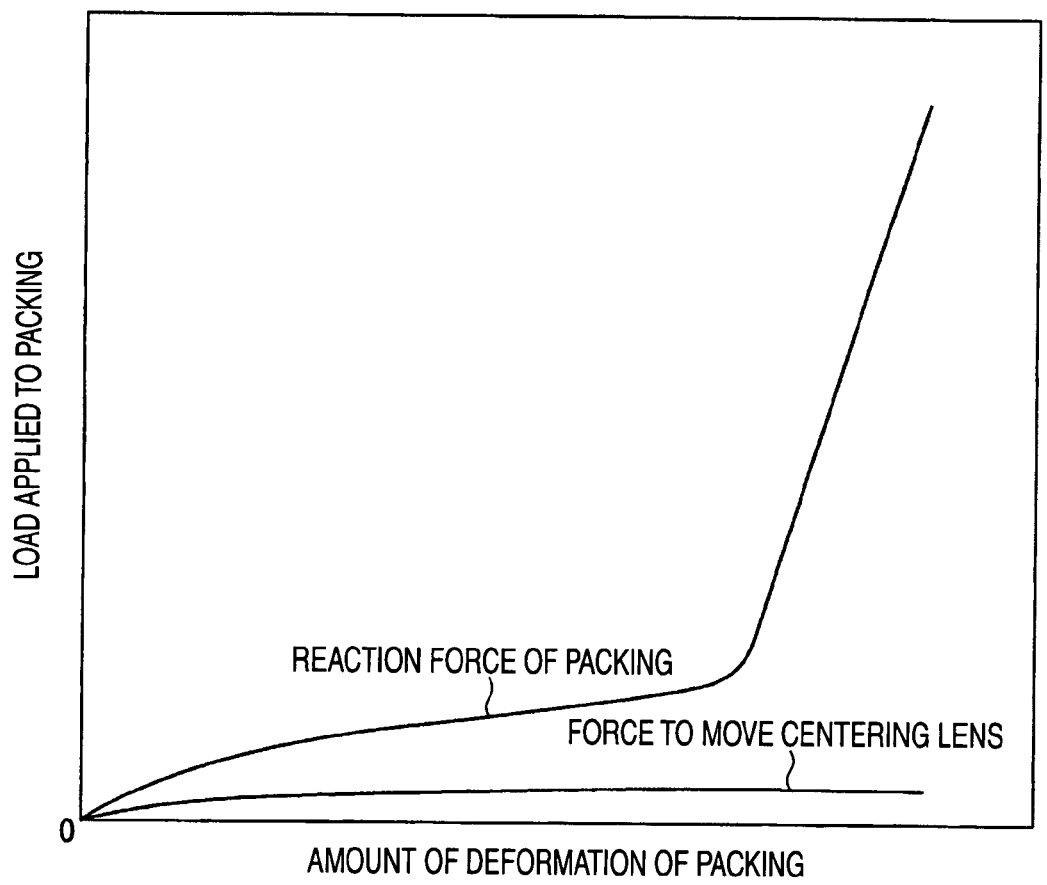
FIG. 39 shows graphs illustrating the relationship between the amount of deformation of a packing and the load applied to the packing.

FIG. 39 shows graphs illustrating the relationship between the load applied to the packing 77 (load from below) and the amount of deformation of the packing 77. FIG. 39 shows that the force for moving the centering lens 75 in the direction perpendicular to the optical axis may be smaller than the load applied to the packing 77.

As described above, in the lens barrel 8, the centering operation is carried out by providing the imaging unit 74 including the centering lens 75 that is pressed against the bottom portion 19 of the unit assembling portion 17 and adjusted in terms of position with respect to the optical axis, the pressing plate 76 that presses the centering lens 75, the packing 77 disposed on the opposite side of the pressing plate 76 to the centering lens 75 and pressed against the pressing plate 76, and the imaging module 78 disposed on the opposite side of the packing 77 to the pressing plate 76 and pressing the packing 77 against the pressing plate 76, and forming the working holes 20c, 20c, through which the adjustment jigs 100, 100 for adjusting the position of the centering lens 75 with respect to the optical axis, in the peripheral side portion 20 of the unit assembling portion 17.

Therefore, part of the imaging unit 74 is used as a mechanism for pressing the centering lens 75 to carry out the centering operation instead of independently disposing the imaging unit 74 and a mechanism for pressing the centering lens 75 spaced apart from each other. The assembling space in the optical axis direction can be reduced accordingly. The size of the lens barrel 8 can thus be reduced and the centering lens 75 can be readily centered at the same time.

Further, the light transmission hole 76a in the pressing plate 76 can be used as a diaphragm opening that limits the amount of image capturing light incident on the imaging device 80. Using the light transmission hole 76a as a diaphragm opening can prevent unwanted light among the incident image capturing light from being incident on the imaging device 80. It is thus possible to prevent so-called ghosts, which are light rings and balls, from being generated in an image due to repetitive light reflection when unnecessarily intense light is incident.

Further, since the packing 77 is made of a rubber material, compressing the packing 77 allows the centering lens 75 to be pressed against the bottom portion 19 of the unit assembling portion 17. It is thus possible to absorb variation in the distance between the lower surface of the pressing plate 76 and the upper surface of the glass plate 81 and press the centering lens 75 at an appropriate pressure.

Moreover, since the glass plate 81 provided to protest the imaging device 80 and prevent dust from being deposited on the imaging device 80 is used to press the centering lens 75 via the pressing plate 76 and the packing 77, the number of parts can be reduced.

In addition, since the flange portion 75b of the centering lens 75 is pressed by a plurality of pressing protrusions 76d, 76d, . . . of the pressing plate 76, the centering lens 75 is pressed at a plurality of locations on the periphery of the lens portion 75a. Therefore, the pressing force against the bottom portion 19 is distributed thereacross to ensure stable pressing.

Since the peripheral portion of the glass plate 81 is in tight contact with the lower pushing portion 77c of the packing 77, the packing 77 can prevent dust from being deposited on the portion of the glass plate 81 through which image capturing light passes and prevent black dots from being imaged or smears and the like from being produced in an image due to deposited dust.

Figure 40:
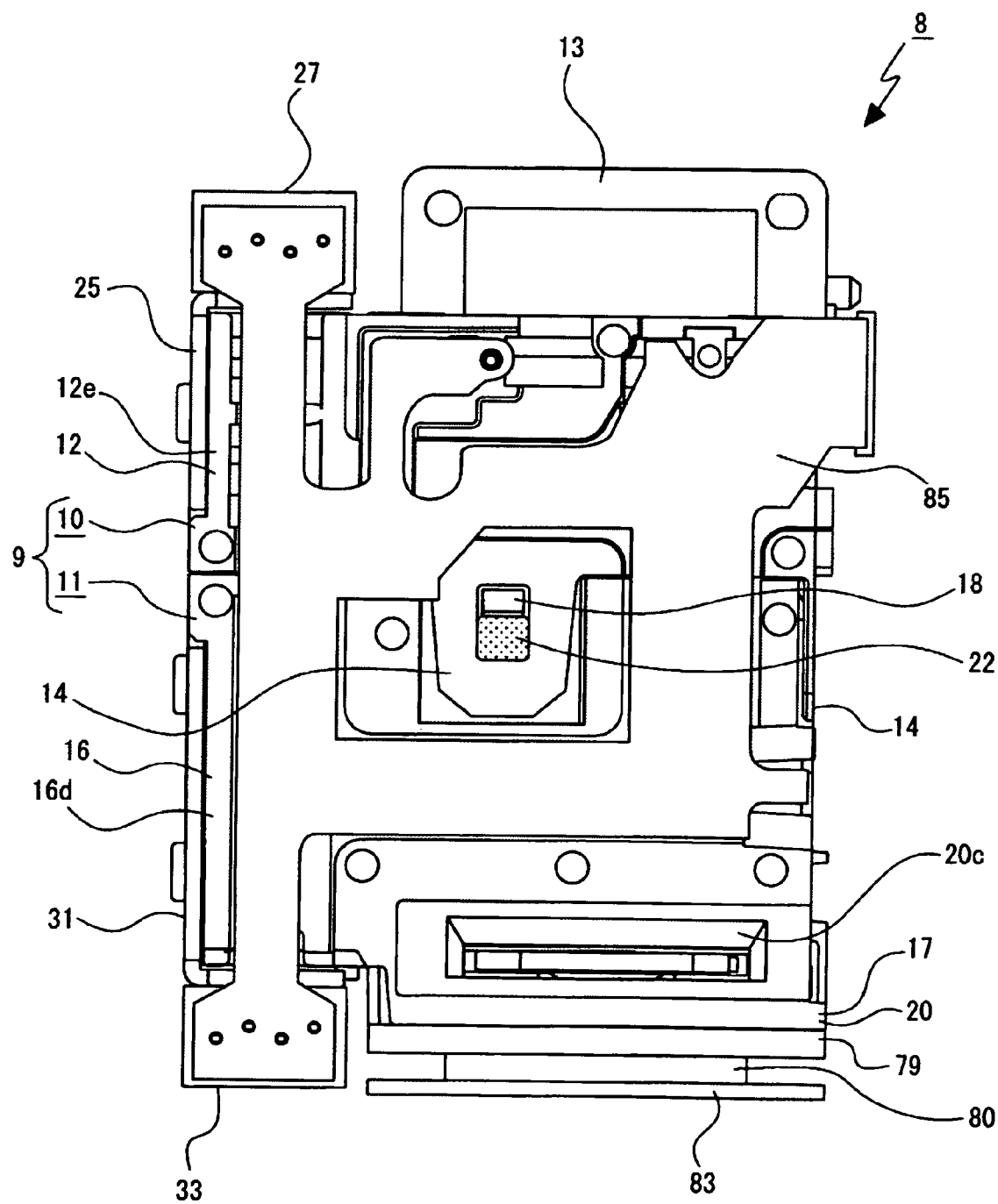
FIG. 40 is an enlarged rear view of the lens barrel.

A flexible printed wiring board 85 is provided to energize necessary portions in the lens barrel 8, and most part of the flexible printed wiring board 85 is glued and attached to the outer surface of the outer enclosure 9 (see FIGS. 5 and 40). The flexible printed wiring board 85 energizes the first drive motor 27, the second drive motor 33, the position detection sensors 73, 73, and other electric components.

Since the flexible printed wiring board 85, excluding part thereof, is glued to the outer surface of the outer enclosure 9, almost no dedicated assembling space for the flexible printed wiring board 85 is necessary, and hence the size of the lens barrel 8 can be reduced.

In the outer enclosure 9, a flexible printed wiring board 86 for energizing the joining member 55 provided as a shutter or diaphragm device is extended from the joining member 55 (see FIGS. 25 and 26). The flexible printed wiring board 86 is formed into an elongated shape, and one end of the flexible printed wiring board 86 is extended out of the outer enclosure 9 and connected to the flexible printed wiring board 85.

The flexible printed wiring board 86 is disposed along the first guide shaft 40, and bent when the second movable unit 53 moves in the up-down direction.

Since the flexible printed wiring board 86 has an elongated shape and is disposed along the first guide shaft 40, the assembling space for the flexible printed wiring board 86 is advantageously very small, whereby the size of the lens barrel 8 can be reduced.

In the thus configured lens barrel 8, operating the imaging key 4f disposed on the first housing 2 activates the drive mode in which images can be captured, and the user is ready to image a subject.

When a subject is imaged, image capturing light is introduced as an image capturing signal through the objective lens 37 in the optical axis direction P1 (see FIG. 19). The image capturing light introduced through the objective lens 37 is bent off the prism 38 by 90 degrees along the optical axis P2 perpendicular to the optical axis P1 (see FIG. 19) and incident on the imaging device 80 in the imaging module 78 through the first fixed lens 39, the focus lens 44 in the first movable unit 43, the zoom lens 56 in the second movable unit 53, and the centering lens 75 provided as the second fixed lens. The image capturing light as an image capturing signal incident on the imaging device 80 is photoelectrically converted into an image signal in the imaging device 80.

In this process, the first drive motor 27 is driven to rotate the first lead screw 26 so as to move the first nut member 28, and the first movable unit 43 is guided along the first guide shaft 40 and the guiding shaft 42 and moved in the optical axis direction P2 for autofocusing.

When the user initiates zooming operation, the second drive motor 33 is driven to rotate the second lead screw 32 so as to move the second nut member 34, and the second movable unit 53 is guided along the second guide shaft 41 and the guiding shaft 42 and moved in the optical axis direction P2 for zooming. The zooming operation is carried out by moving the second movable unit 53 in the optical axis direction P2 between the wide-angle end (see FIG. 41) and the telescopic end (see FIG. 42).

The second movable unit 53, when moved upward, approaches the telescopic end, whereas the second movable unit 53, when moved downward, approaches the wide-angle end. The area over which the second movable unit 53 moves on the telescopic end side overlaps with the area over which the first movable unit 43 moves in the focusing operation. However, the first movable unit 43 and the second movable unit 53 are controlled not to interfere with each other when they are in motion.

As described above, in the lens barrel 8, the first lead screw 26 and the second lead screw 32 are disposed in such a way that they are spaced apart in the up-down direction, and part of the area over which the first movable unit 43 moves overlaps with part of the area over which the second movable unit 53 moves.

Therefore, disposing the first lead screw 26 and the second lead screw 32 in such a way that they are spaced apart in the up-down direction prevents the first nut member 28 and the second nut member 34 from interfering with each other, and setting part of the area over which the first movable unit 43 moves to overlap with part of the area over which the second movable unit 53 moves allows reduction in size of the lens barrel 8 in the optical axis direction P2.

In the thus configured lens barrel 8, the first nut member 28 and second nut member 34, when made of a rigid material, have higher resistance to impact, whereby any of the teeth of the first nut member 28 and the second nut member 34 will unlikely be chipped or scraped by the first lead screw 26 and the second lead screw 32. It is thus possible to improve reliability of the operation of the first movable unit 43 and the second movable unit 53 and the size of the lens barrel 8 is reduced in the optical axis direction P2 at the same time.

Figure 41:
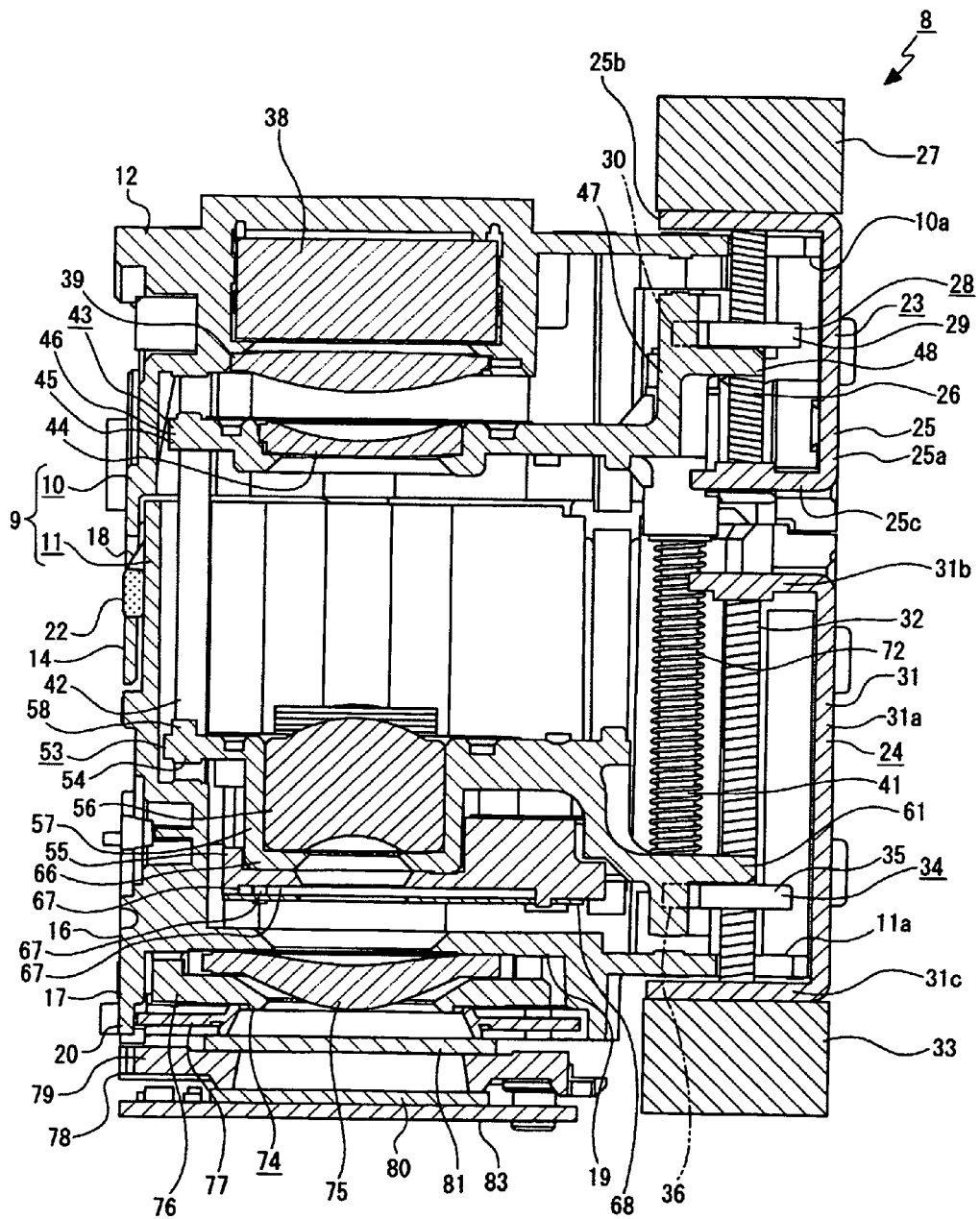
FIG. 41 is an enlarged cross-sectional view of the lens barrel operating at the wide-angle end.
Figure 42:
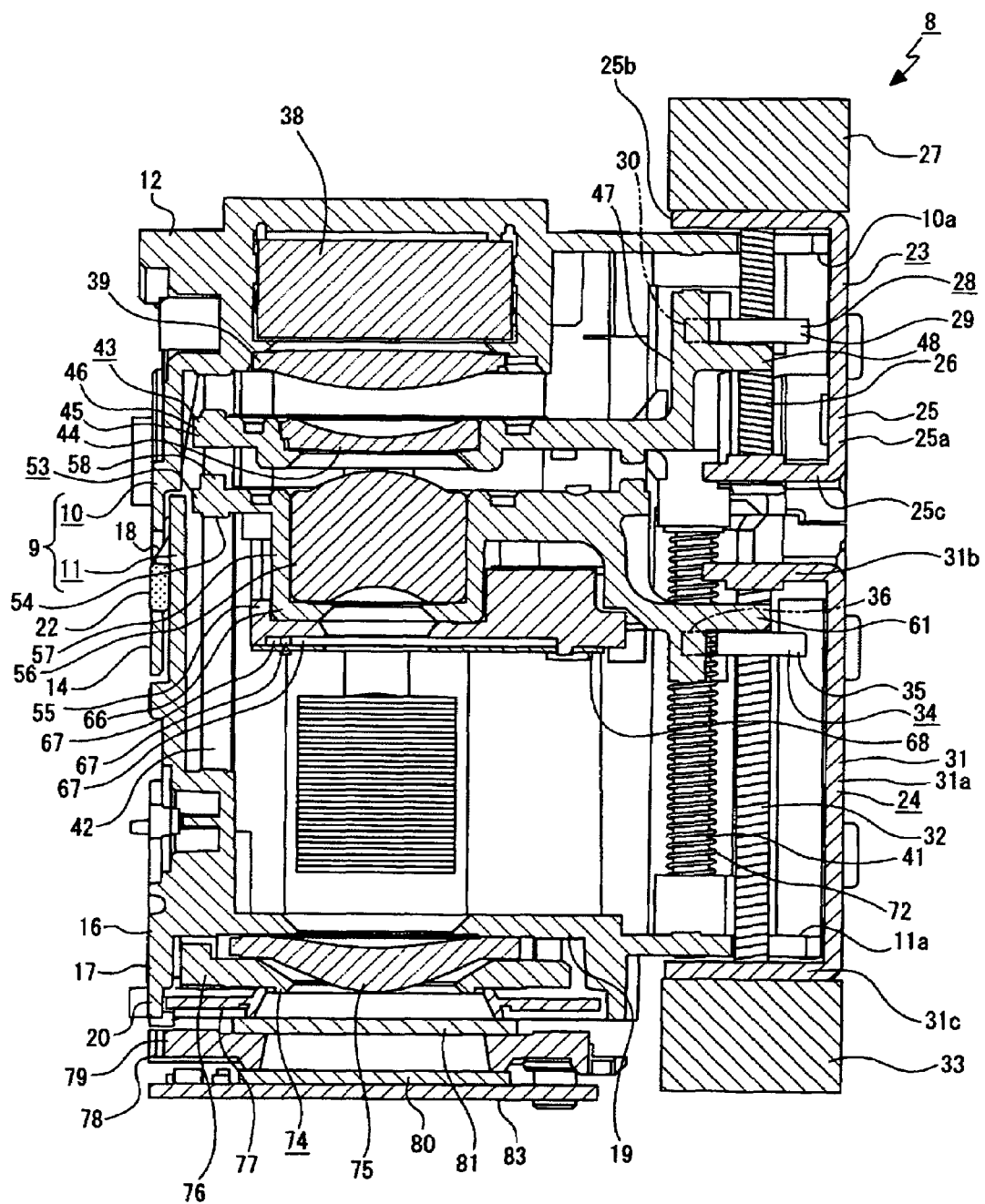
FIG. 42 is an enlarged cross-sectional view of the lens barrel operating at the telescopic end.

Further, in the lens barrel 8, as described above, since the central axis M1 of the first lead screw 26 is aligned with the central axis M2 of the second lead screw 32, the first drive unit 23 and the second drive unit 24 that form the drive system are disposed in the left end portion in a compact manner, as shown in FIGS. 41 and 42, and the first movable unit 43, the second movable unit 53, and other components that form the optical system are disposed on the right side in a compact manner.

Therefore, the assembling space in the outer enclosure 9 can be effectively used, and the size of the lens barrel 8 can be reduced accordingly.

Further, in the lens barrel 8, since the guiding shaft 42 for guidance in the optical axis direction is shared by the first movable unit 43 and the second movable unit 53 as described above, reduction in the number of parts and reduction in the assembling space can contribute to size reduction.

Figure 43:
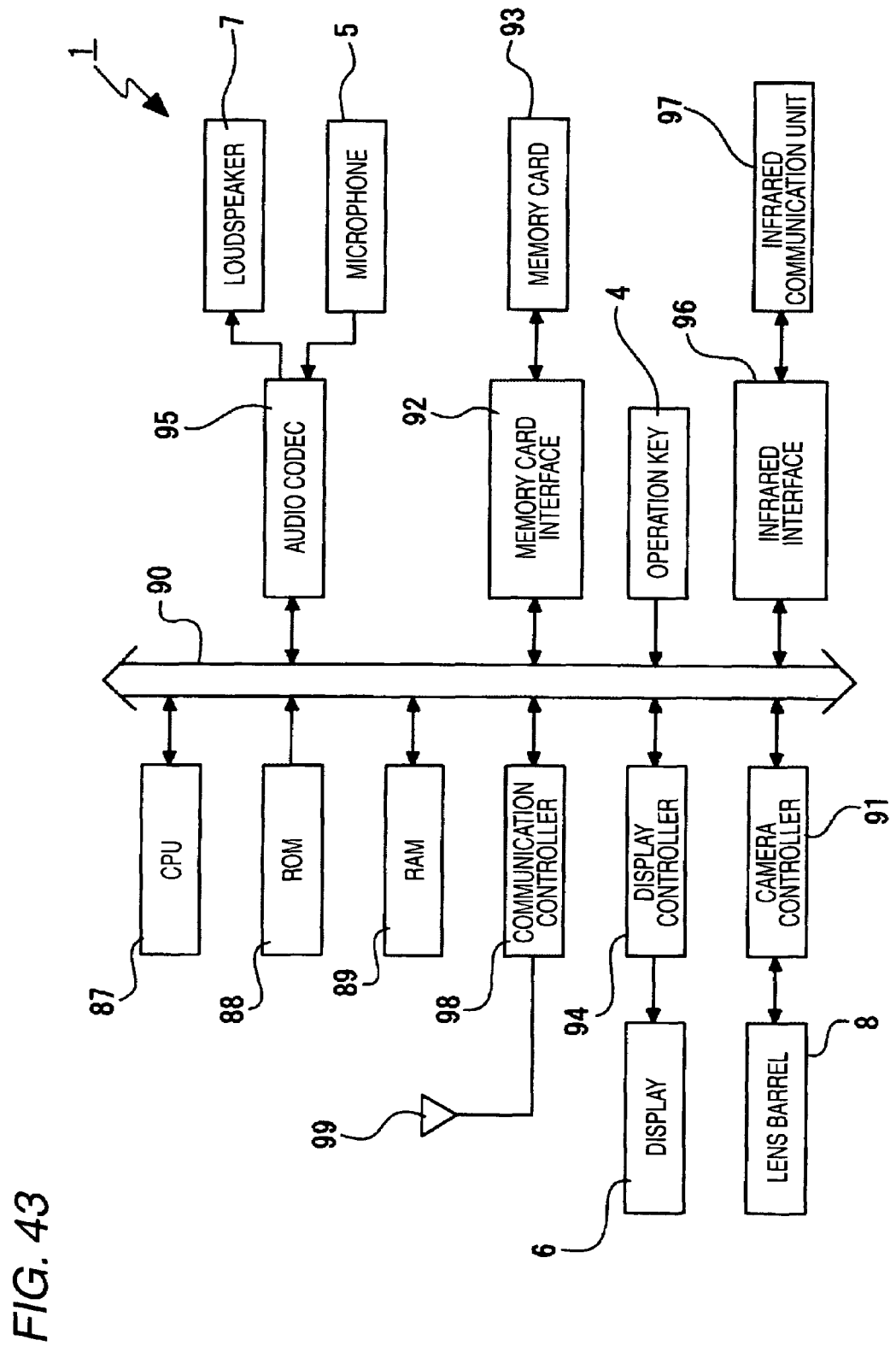
FIG. 43 is a block diagram showing the overall configuration of the imaging apparatus.

The overall configuration of the imaging apparatus 1 will be described below with reference to the block diagram shown in FIG. 43.

The imaging apparatus 1 includes a CPU (Central Processing Unit) 87, and the CPU 87 controls the overall operation of the imaging apparatus 1. Specifically, the CPU 87 allocates a control program stored in a ROM (Read Only Memory) 88 onto a RAM (Random Access Memory) 89 and controls the operation of the imaging apparatus 1 via a bus 90.

A camera controller 91 has a capability of controlling the lens barrel 8 to capture still images and video images. The camera controller 91, for example, compresses an image signal (image information) formed by photoelectric conversion performed in the imaging device 80 using JPEG (Joint Photographic Experts Group), MPEG (Moving Picture Experts Group), or other formats and sends the compressed data to the bus 90. The image information sent over the bus 90 is temporality stored in the RAM 89, and outputted to a memory card interface 92 and stored in a memory card 93 through the memory card interface 92, or displayed on the display 6 via a display controller 94 as required.

When an image is captured, an audio signal (audio information) inputted from the microphone 5 is temporarily stored in the RAM 89 or stored in the memory card 93 via an audio codec 95 along with the image information. The audio information is outputted from the loudspeaker 7 via the audio codec 95 concurrently with the image information displayed on the display 6.

The image information and the audio information described above are outputted to an infrared interface 96 as required, outputted by the infrared interface 96 through an infrared communication unit 97, and transmitted to an external apparatus equipped with an infrared communication unit, such as a mobile phone, a personal computer, and a PDA (Personal Digital Assistant). When video images or a still image is displayed on the display 6 based on the image information stored in the RAM 89 or the memory card 93, the camera controller 91 decodes or uncompresses a file stored in the RAM 89 or the memory card 93, and the resultant image data are sent to the display controller 94 via the bus 90.

A communication controller 98 sends and receives radio waves to and from a base station via an antenna 99. In a calling mode, received audio information is processed, and the processed audio information is outputted to the loudspeaker 7 via the audio codec 95. Further, audio information inputted from the microphone 5 is received via the audio codec 95, undergoes predetermined processing, and is transmitted.

The specific shapes and structures of the components shown in the best mode for carrying out the invention described above are only an example for embodying the invention. The technical extent of the invention should not be construed in a limited sense by these specific shapes and structures.

It should be understood by those skilled in the art that various modifications, combinations, sub-combinations and alterations may occur depending on design requirements and other factors insofar as they are within the scope of the appended claims or the equivalents thereof.

What is claimed is:

1. A lens barrel in which energizing and deenergizing the lens barrel to allow switching between a drive mode in which an image can be captured and a non-drive mode in which no image can be captured, the lens barrel comprising:

a plurality of lenses disposed in an outer enclosure;
   an imaging device that converts image light introduced through the plurality of lenses into an image signal;
   a movable unit including a movable lens and a lens holder that holds the movable lens;
   a lead screw rotated by a drive motor;
   a nut member made of a metal material threadably engaging the lead screw and selectively in contact with the lens holder, the nut member being moved by the rotation of the lead screw in the optical axis direction moving the movable unit in the optical axis direction while being in contact with the lens holder;
   a guide shaft that guides the movable unit in the optical axis direction, both axial ends of the guide shaft held by the outer enclosure; and
   an urging spring that presses part of the lens holder against the nut member when the movable unit moves in the optical axis direction,
   wherein the outer enclosure has a restricting portion that comes into contact with the lens holder and restricts the movement of the movable unit when the movable unit moves to the end of movement in the optical axis direction, and
   when the non-drive mode is activated after the movable unit has moved to the end of movement and the lens holder has come into contact with the restricting portion, the nut member continues to move in order to disengage from contact with the lens holder so that the nut member is disposed between the lens holder and the restricting portion in a manner that the nut member is spaced apart from both the lens holder and the restricting portion.

2. The lens barrel according to claim 1,
   wherein when the non-drive mode is activated after the movable unit has moved to the end of movement and the lens holder has come into contact with the restricting portion, the nut member is held between the lens holder and the restricting portion with the nut member spaced apart from the lens holder and the restricting portion by rotating the lead screw by a predetermined angle.

3. The lens barrel according to claim 1,
   wherein the position of the nut member when the movable unit starts moving in the drive mode is set to be close to the position of the nut member in the non-drive mode.

4. An imaging apparatus comprising a lens barrel incorporated in a housing, the lens barrel configured in such a way that energizing and deenergizing the lens barrel to allow switching between a drive mode in which an image can be captured and a non-drive mode in which no image can be captured, the lens barrel including a plurality of lenses disposed in an outer enclosure,
   an imaging device that converts image light introduced through the plurality of lenses into an image signal,
   a movable unit including a movable lens and a lens holder that holds the movable lens,
   a lead screw rotated by a drive motor,
   a nut member made of a metal material threadably engaging the lead screw and selectively in contact with the lens holder, the nut member being moved by the rotation of the lead screw in the optical axis direction moving the movable unit in the optical axis direction while being in contact with the lens holder,
   a guide shaft that guides the movable unit in the optical axis direction, both axial ends of the guide shaft held by the outer enclosure, and
   an urging spring that presses part of the lens holder against the nut member when the movable unit moves in the optical axis direction,
   wherein the outer enclosure has a restricting portion that comes into contact with the lens holder and restricts the movement of the movable unit when the movable unit moves to the end of movement in the optical axis direction, and when the non-drive mode is activated after the movable unit has moved to the end of movement and the lens holder has come into contact with the restricting portion, the nut member continues to move in order to disengage from contact with the lens holder so that the nut member is disposed between the lens holder and the restricting portion in a manner that the nut member is spaced apart from both the lens holder and the restricting portion.

* * * * *